(12) United States Patent
Tsuzuki et al.

(10) Patent No.: US 11,242,913 B2
(45) Date of Patent: Feb. 8, 2022

(54) CELLULOSE-CONTAINING GEAR

(71) Applicant: Asahi Kasei Kabushiki Kaisha, Tokyo (JP)

(72) Inventors: Junichi Tsuzuki, Tokyo (JP); Sara Kusumoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/049,910

(22) PCT Filed: Apr. 22, 2019

(86) PCT No.: PCT/JP2019/017076
§ 371 (c)(1),
(2) Date: Oct. 22, 2020

(87) PCT Pub. No.: WO2019/208514
PCT Pub. Date: Oct. 31, 2019

(65) Prior Publication Data
US 2021/0231196 A1 Jul. 29, 2021

(30) Foreign Application Priority Data

Apr. 23, 2018 (JP) .............................. JP2018-082242
Jan. 7, 2019 (JP) .............................. JP2019-000674

(51) Int. Cl.
*F16H 1/16* (2006.01)
*F16H 55/06* (2006.01)
(Continued)

(52) U.S. Cl.
CPC .............. *F16H 1/16* (2013.01); *B62D 5/0409* (2013.01); *C08J 5/045* (2013.01); *C08L 1/02* (2013.01);
(Continued)

(58) Field of Classification Search
CPC ...... F16H 1/16; F16H 55/06; F16H 2055/065; F16H 57/0464; F16H 57/0498; B62D 5/0409; B62D 5/0424
See application file for complete search history.

(56) References Cited

U.S. PATENT DOCUMENTS

2004/0226396 A1* 11/2004 Noguchi ............. B29C 45/0025
74/431
2004/0241276 A1* 12/2004 Miyasaka ............. B29D 15/00
425/543
(Continued)

FOREIGN PATENT DOCUMENTS

EP 1609694 A1 12/2005
EP 1908991 A 4/2008
(Continued)

OTHER PUBLICATIONS

International Search Report issued in corresponding International Patent Application No. PCT/JP2019/017076 dated Jun. 25, 2019.
(Continued)

*Primary Examiner* — Tony H Winner
*Assistant Examiner* — Michael R Stabley
(74) *Attorney, Agent, or Firm* — Morgan, Lewis & Bockius LLP

(57) ABSTRACT

A gear is provided that has excellent continuous moldability for practical use, and both high slidability and high durability. The provided gear is a molded resin constructed of a resin composition comprising a thermoplastic resin (A) and cellulose nanofibers (B) with an average fiber diameter of 1000 nm or smaller, and having a number average molecular weight of the thermoplastic resin (A) in the range of 10,000 to 150,000, wherein a sliding surface of the gear with another gear teeth has an arithmetic mean surface roughness Sa of 3.0 μm or lower.

13 Claims, 2 Drawing Sheets

(51) Int. Cl.
| | |
|---|---|
| *B62D 5/04* | (2006.01) |
| *C08J 5/04* | (2006.01) |
| *C08L 1/02* | (2006.01) |
| *C08L 59/04* | (2006.01) |
| *C08L 77/06* | (2006.01) |
| *F16H 19/04* | (2006.01) |
| *F16H 55/22* | (2006.01) |
| *F16H 57/04* | (2010.01) |

(52) U.S. Cl.
CPC .............. *C08L 59/04* (2013.01); *C08L 77/06* (2013.01); *F16H 19/04* (2013.01); *F16H 55/06* (2013.01); *F16H 55/22* (2013.01); *F16H 57/0464* (2013.01); *F16H 57/0498* (2013.01); *B62D 5/0424* (2013.01); *C08J 2329/14* (2013.01); *C08J 2377/00* (2013.01); *C08J 2401/02* (2013.01); *C08L 2205/16* (2013.01); *F16H 2055/065* (2013.01)

(56) References Cited

U.S. PATENT DOCUMENTS

| | | | |
|---|---|---|---|
| 2006/0154831 A1* | 7/2006 | Iwano | C10M 159/24 508/390 |
| 2006/0175123 A1* | 8/2006 | Yabe | B62D 5/0409 180/444 |
| 2007/0293607 A1 | 12/2007 | Arakawa et al. | |
| 2008/0168854 A1* | 7/2008 | Iwano | B62D 5/0409 74/388 PS |
| 2009/0065287 A1* | 3/2009 | Kuwabara | C10M 169/00 180/444 |
| 2012/0328877 A1 | 12/2012 | Shiramizu et al. | |
| 2014/0242345 A1* | 8/2014 | Park | H01B 1/24 428/172 |
| 2016/0047453 A1 | 2/2016 | Ohmi et al. | |
| 2016/0298050 A1 | 10/2016 | Kunishima et al. | |
| 2017/0362530 A1* | 12/2017 | Hirooka | C10M 143/12 |
| 2018/0022920 A1 | 1/2018 | Nakai et al. | |
| 2019/0169431 A1 | 6/2019 | Kurihara et al. | |
| 2020/0340529 A1 | 10/2020 | Noguchi et al. | |

FOREIGN PATENT DOCUMENTS

| | | | |
|---|---|---|---|
| EP | 3447085 A1 | 2/2019 | |
| JP | S58-025005 A | 2/1983 | |
| JP | H07-018176 A | 1/1995 | |
| JP | 2001-289309 A | 10/2001 | |
| JP | 2002-096366 A | 4/2002 | |
| JP | 2006-312688 A | 11/2006 | |
| JP | 2009-202754 A | 9/2009 | |
| JP | 2011-184816 A | 9/2011 | |
| JP | 2013-248824 * | 12/2013 | .............. B32B 5/02 |
| JP | 2013-248824 | 12/2013 | |
| JP | 2014-136745 A | 7/2014 | |
| JP | 2015-030833 A | 2/2015 | |
| JP | 2016-61002 A | 4/2016 | |
| JP | 2016-200185 A | 12/2016 | |
| JP | 2017-171698 A | 9/2017 | |
| JP | 2020-108958 A | 7/2020 | |
| WO | 2006/054774 A1 | 5/2006 | |
| WO | 2016/140240 A1 | 9/2016 | |
| WO | 2018/008611 A1 | 1/2018 | |
| WO | 2018/123150 A1 | 7/2018 | |
| WO | 2019/098210 A1 | 5/2019 | |

OTHER PUBLICATIONS

International Preliminary Report on Patentability and Written Opinion issued in corresponding International Patent Application No. PCT/JP2019/017076 dated Oct. 27, 2020.
Argument of Japanese Patent Application No. 2019-80946 dated Oct. 7, 2019.
Ito, Chemical Engineering, 6: 32-36 (2017) (see partial English translation).
Japanese Industrial Standards B 0601 dated Mar. 31, 1994.
Toagosei Group Annual Research Report Trend, No. 11, 14-19 (2008).
Research Report, No. 8, 1-7 (2018) (see partial English translation).
Semba et al., "Biocomposites Composed of Polyamide 11 and Cellulose Nanofibers Pretreated with a Cationic Reagents," Journal of the Society of Rheology, 45 (1): 39-47(2017).
Notice of reasons for rejection issued in related Japanese Patent Application No. 2019-080946 dated Aug. 3, 2019.
Supplementary European Search Report issued in corresponding European Patent Application No. 19792233.9 dated Mar. 1, 2021.

* cited by examiner (A)

(B)

(A)

(B)

CELLULOSE-CONTAINING GEAR

FIELD

The present invention relates to a cellulose-containing gear (especially an EPS (Electric Power Steering) gear), and to a gear system (especially an EPS system) comprising it.

BACKGROUND

Thermoplastic resins are light and have excellent processing characteristics, and are therefore widely used for a variety of purposes including automobile members, electrical and electronic parts, business machine housings, precision parts and the like. With resins alone, however, the mechanical properties, slidability, thermal stability and dimensional stability are often inadequate, and it is common to use composites of resins with different types of inorganic materials.

Resin compositions comprising thermoplastic resins reinforced with reinforcing materials consisting of inorganic fillers such as glass fibers, carbon fibers, talc or clay have high specific gravity, and therefore the obtained molded resins have had higher weights. When a resin composition containing glass fibers is used for round bar extrusion followed by cutting for shaping into a specific shape, or for shaping into thick parts by injection molding, one issue that arises is that the orientation of the glass fibers may produce stress concentration at certain sites, resulting in inferior durability. For example, in resin gears that are widely employed, when the composition includes glass fibers, some problems that result are that the surface roughness increases or the roundness is lowered at the sliding portions, producing abnormal noise when engaged, while parts of certain teeth are also subjected to high load and undergo deformation damage. In addition, because glass fibers are thick and oriented in a molded article, when they are continuously used in injection molding even under the same conditions, it has been a problem that significant deviation of the molded article dimensions occurs between articles. Another issue is that when a resin composition containing glass fibers is used for round bar extrusion followed by cutting for shaping into specific shapes, or for shaping into thick parts by injection molding, interior voids (vacuum cavities) can form, leading to concentration of stress and inferior durability. This occurs because the formation of voids (vacuum cavities) inside the molded article is due to the difference between the external cooling rate and the internal cooling rate. In recent years, therefore, cellulose has come to be used as a new reinforcing material for resins, because of its lower environmental burden.

In terms of simple properties, cellulose is known to have a high elastic modulus similar to aramid fibers, and a lower linear expansion coefficient than glass fibers. In addition, it exhibits a low true density of 1.56 $g/cm^3$, which is overwhelmingly lighter than glass (density: 2.4 to 2.6 $g/cm^3$) or talc (density: 2.7 $g/cm^3$), which is used as a common reinforcing material for thermoplastic resins.

Cellulose is obtained from a variety of sources, including trees as starting materials, as well as from hemp, cotton, kenaf and cassava starting materials. Bacterial celluloses are also known, typical of which is nata de coco. These natural resources that can serve as starting materials for cellulose are abundant throughout the Earth, and a great deal of attention has been focused on techniques for exploiting cellulose as a filler in resins so that they can be effectively utilized.

CNF (cellulose nanofibers) are obtained using pulp or the like as starting material, hydrolyzing the hemicellulose portion to weaken the pulp, and then defibrating it using a pulverizing method with a high-pressure homogenizer, microfluidizer, ball mill or disk mill, and in water they form a very finely dispersed state known as a "nanodispersion", which is also a network.

For distribution of CNF in a resin it is necessary to dry the CNF into a powder form, but with CNF it has been a problem that they change from a microdispersed state to strong aggregates during the course of separation from water, making their redispersion difficult. The aggregating force is exhibited due to hydrogen bonding by the hydroxyl groups of the cellulose, and is considered to be extremely strong.

In order to exhibit adequate performance, therefore, it is necessary to relax hydrogen bonding by the hydroxyl groups of the cellulose. Even when relaxation of hydrogen bonding is achieved, however, it is difficult to maintain a disentangled state (nanometer size (<1 μm)) in the resin.

A composition has been proposed in the prior art that is composited with different resins using cellulose nanofibers (hereunder, "CNF"), glass fibers or clay as filler.

PTL 1, for example, describes a composition using glass fibers and a polyamide resin. PTL 2 describes a slidable resin composition using cellulose with the surface hydroxyl groups replaced with hydrophobic groups. PTL 3 describes a resin gear using an apatite-type compound and a polyamide.

CITATION LIST

Patent Literature

[PTL 1] International Patent Publication No. WO2006/054774
[PTL 2] Japanese Unexamined Patent Publication No. 2017-171698
[PTL 3] Japanese Unexamined Patent Publication No. 2001-289309

SUMMARY

Technical Problem

Although PTL 1 mentions the heat deformation temperature and limiting PV value of the composition of glass fibers and the polyamide, it says nothing about the slidability during intermittent sliding of the molded article, and high torque gear durability. In PTL 2, the slidability of compounds of cellulose with polyoxymethylene, polypropylene or polyethylene is evaluated in a pin-on-disk test and journal bearing test, which are relatively common sliding tests, but the publication does not mention the durability of high-torque gear molded pieces under practical use. PTL 3 mentions the tensile strength and tensile elongation of a polyamide resin gear using a nano material, but the durability and continuous moldability of the gear (especially a high-torque gear) under practical use is not mentioned.

Gears that are to be used under high-torque conditions (such as EPS gears) must generally exhibit high slidability, abrasion resistance and durability under high-torque conditions, but PTLs 1 to 3 do not provide gears satisfying these properties to the desired level.

Since it has been difficult in the prior art to fabricate gears (especially EPS gears) having excellent continuous moldability (that is, low variation in dimensions when multiple gears are molded in a continuous manner) and exhibiting both high slidability and high durability, it has been a goal to improve these properties. According to one aspect of the invention it is an object to provide a gear (especially an EPS gear) that solves this problem, as well as a gear system (especially an EPS system) comprising it. According to another aspect of the invention it is an object to provide a gear (especially an EPS gear) that has reduced voids in thick molded article interiors and has improved gear durability and silent properties, and that exhibits both sufficient durability and silent properties with actual use, as well as a gear system (especially an EPS system) comprising it.

Solution to Problem

The present inventors conducted diligent research with the aim of solving the problem described above, and this led to the finding that the problem can be solved by a gear (especially an EPS gear) which is a molded resin constructed of a resin composition comprising a thermoplastic resin with a specific molecular weight and a specific cellulose, and which has an arithmetic mean surface roughness Sa of 3.0 μm or lower, and the present invention was completed on the basis of this finding.

Specifically, the present invention encompasses the following aspects.

[1] A gear which is a molded resin constructed of a resin composition comprising a thermoplastic resin (A) and cellulose nanofibers (B) with an average fiber diameter of 1000 nm or smaller, and having a number average molecular weight of the thermoplastic resin (A) in the range of 10,000 to 150,000, wherein a sliding surface of the gear with another gear teeth has an arithmetic mean surface roughness Sa of 3.0 μm or lower.

[2] An EPS (electric power steering) gear which is a molded resin constructed of a resin composition comprising a thermoplastic resin (A) and cellulose nanofibers (B) with an average fiber diameter of 1000 nm or smaller, and having a number average molecular weight of the thermoplastic resin (A) in the range of 10,000 to 150,000, wherein a sliding surface of the gear with another gear teeth has an arithmetic mean surface roughness Sa of 3.0 μm or lower.

[3] The gear according to aspect 1 or 2, wherein the resin composition has a thixotropic index of 1 to 10 at a temperature of 25° C. higher than the melting point of the thermoplastic resin (A).

[4] The gear according to any one of aspects 1 to 3, wherein the resin composition includes the thermoplastic resin (A) at 45 to 95 mass % and the cellulose nanofibers (B) at 5 to 50 mass %.

[5] The gear according to any one of aspects 1 to 4, wherein the thermoplastic resin (A) is one or more resins selected from the group consisting of polyolefin-based resins, polyamide-based resins, polyester-based resins, polyacetal-based resins, polyacrylic-based resins, polyphenylene ether-based resins and polyphenylene sulfide-based resins.

[6] The gear according to aspect 4, wherein the thermoplastic resin (A) is at least one resin selected from the group consisting of polyamides and polyacetals.

[7] The gear according to any one of aspects 1 to 6, wherein the resin composition further includes a surface treatment agent (C).

[8] The gear according to aspect 7, wherein the number average molecular weight of the surface treatment agent (C) is 200 to 10,000.

[9] The gear according to aspect 7 or 8, wherein the resin composition includes the surface treatment agent (C) at 1 to 50 parts by mass with respect to 100 parts by mass of the cellulose nanofibers (B).

[10] The gear according to any one of aspects 1 to 9, wherein the resin composition further includes a metal ion component (D).

[11] The gear according to aspect 10, wherein the resin composition includes the metal ion component (D) at 0.005 to 5 parts by mass with respect to 100 parts by mass of the thermoplastic resin (A).

[12] The gear according to any one of aspects 1 to 11, which further includes a sliding agent component (E).

[13] The gear according to aspect 12, wherein the resin composition includes the sliding agent component (E) at 0.01 to 5 parts by mass with respect to 100 parts by mass of the thermoplastic resin (A).

[14] The gear according to aspect 12 or 13, wherein the melting point of the sliding agent component (E) is 40 to 150° C.

[15] The gear according to any one of aspects 1 to 14, wherein the resin composition has a flexural modulus of 3000 MPa or higher when measured according to ISO179.

[16] The gear according to any one of aspects 1 to 15 wherein, for a frictional coefficient measured at a linear speed of 50 mm/sec, a reciprocal distance of 50 mm, a temperature of 23° C., a humidity of 50% and a load of 19.8 N using a multipurpose test piece fabricated according to ISO 294-3, a reciprocating dynamic friction wear tester, and a SUS304 test sphere with a diameter of 5 mm as a partner material, a frictional coefficient ratio (II/I) is 0.8 or lower, as a ratio of a value (II) for the resin composition with respect to a value (I) of a composition with the same composition as the resin composition except for containing no cellulose nanofibers (B).

[17] The gear according to any one of aspects 1 to 16, wherein a dimensional change with water absorption is no greater than 3% after exposure for 24 hours in hot water at 80° C. followed by holding for 120 hours under conditions of 80° C., 57% relative humidity.

[18] The gear according to any one of aspects 1 to 17, having a roundness of 400 μm or smaller.

[19] The gear according to any one of aspects 1 to 18, wherein the voids in the gear have a maximum size of 1.0 μm or smaller.

[20] The gear according to any one of aspects 1 to 19, having a module of 2.0 or lower.

[21] A gear which is a molded resin constructed of a resin composition comprising a thermoplastic resin (A) and cellulose nanofibers (B) with an average fiber diameter of 1000 nm or smaller, wherein:
the gear has a roundness of 400 μm or smaller,
the thermoplastic resin (A) includes a polyamide resin, and
the resin composition has a thixotropic index of 2 to 10 at a temperature of 25° C. higher than the melting point of the thermoplastic resin (A).

[22] An EPS (electric power steering) gear which is a molded resin constructed of a resin composition comprising a thermoplastic resin (A) and cellulose nanofibers (B) with an average fiber diameter of 1000 in or smaller, wherein:
the gear has a roundness of 400 μm or smaller,
the thermoplastic resin (A) includes a polyamide resin, and
the resin composition has a thixotropic index of 2 to 10 at a temperature of 25° C. higher than the melting point of the thermoplastic resin (A).

[23] The gear according to any one of aspects 1 to 22, which is an injection molded article.

[24] The gear according to any one of aspects 1 to 22, which is a machined article.

[25] The gear according to aspect 24, which is an article cut from a molded round bar.

[26] A gear system comprising:
a gear mechanism constructed of a driven gear and a driving gear that engages with the driven gear, and
a driving source that drives the driving gear,
wherein the driven gear and/or the driving gear are gears according to any one of aspects 1 to 25.

[27] An EPS (electric power steering) gear system comprising:
a gear mechanism constructed of a driven gear and a driving gear that engages with the driven gear, and
a driving source that drives the driving gear,
wherein the driven gear and/or the driving gear is a gear according to any one of aspects 1 to 25.

[28] The gear system according to aspect 26 or 27, wherein:
the gear mechanism is a rack and pinion mechanism constructed of a rack and pinion, or a worm gear mechanism constructed of a worm and worn wheel, and
the pinion or worm wheel is a gear according to any one of aspects 1 to 25.

[29] The gear system according to aspect 28, wherein the pinion or worm wheel has a gear tooth total tooth depth/circular pitch ratio of 1.0 to 20.

[30] The gear system according to aspect 28 or 29, wherein the pinion or worm wheel has a gear tooth total tooth depth/tooth width ratio of 1.0 to 3.0.

[31] The gear system according to any one of aspects 28 to 30, wherein a torque on the pinion or worm wheel is 5 N·m to 100 N·m.

[32] A gear system comprising:
a gear mechanism constructed of a driven gear and a driving gear that engages with the driven gear, and
a driving source that drives the driving gear, wherein:
the gear mechanism is a worm gear mechanism constructed of a worn and worn wheel,
the worm wheel is a gear which is an injection molded compact of a resin composition comprising a thermoplastic resin (A) and cellulose nanofibers (B) with an average fiber diameter of 1000 nm or smaller,
the worm wheel has a roundness of 400 μm or smaller,
the thermoplastic resin (A) includes a polyamide resin, and
the resin composition has a thixotropic index of 2 to 10 at a temperature of 25° C. higher than the melting point of the thermoplastic resin (A).

[33] An EPS (electric power steering) gear system comprising:
a gear mechanism constructed of a driven gear and a driving gear that engages with the driven gear, and
a driving source that drives the driving gear, wherein:
the gear mechanism is a worn gear mechanism constructed of a worn and worn wheel,
the worm wheel is a gear which is an injection molded compact of a resin composition comprising a thermoplastic resin (A) and cellulose nanofibers (B) with an average fiber diameter of 1000 nm or smaller,
the worm wheel has a roundness of 400 m or smaller,
the thermoplastic resin (A) includes a polyamide resin, and
the resin composition has a thixotropic index of 2 to 10 at a temperature of 25° C. higher than the melting point of the thermoplastic resin (A).

[34] The gear system according to any one of aspects 26 to 33, wherein:
the driven gear and the driving gear engage each other via grease, where the grease comprises:
a base oil containing 80 mass % or greater of at least one selected from the group consisting of mineral oils, poly α-olefin oils and alkylpolyphenyl ethers,
a thickener, and
3 to 10 mass % of a hydrocarbon-based wax with a melting point or softening point in the range of 70 to 130° C.

[35] The gear system according to any one of aspects 26 to 34, wherein the driving source is a motor with an operating rotational speed of 800 rpm or greater.

[36] The gear system according to any one of aspects 26 to 35, wherein the driving source is a motor with an operating rotational speed of 10,000 rpm or lower.

[37] The gear system according to any one of aspects 26 to 36, wherein a torque on the gear is 3 N/m or greater.

[38] The gear system according to aspect 37, wherein a torque on the gear is 5 N·m or greater.

[39] The gear system according to aspect 38, wherein a torque on the gear is 10 N/m or greater.

Advantageous Effects of Invention

According to one aspect of the invention there is provided a gear (especially an EPS gear) with excellent continuous moldability with actual use, and exhibiting both high slidability and high durability, as well as a gear system (especially an EPS system) comprising it. According to another aspect of the invention it is possible to provide a gear (especially an EPS gear) that has reduced voids in thick molded article interiors and has improved gear durability and silent properties, and that exhibits both sufficient durability and silent properties with actual use, as well as a gear system (especially an EPS system) comprising it.

DESCRIPTION OF EMBODIMENTS

Figure 1:
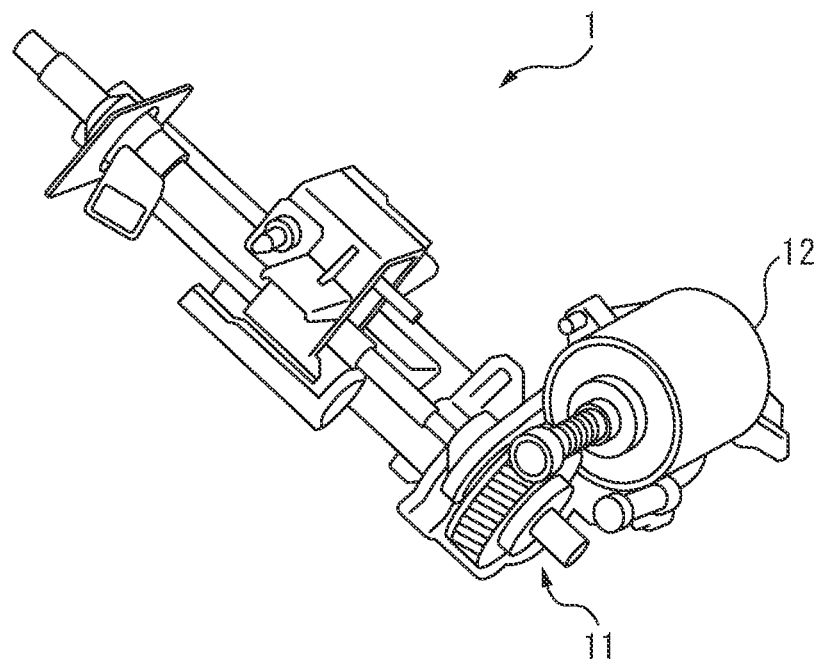
FIG. 1 is a diagram showing an example of a gear system according to one aspect of the invention.
Figure 1:
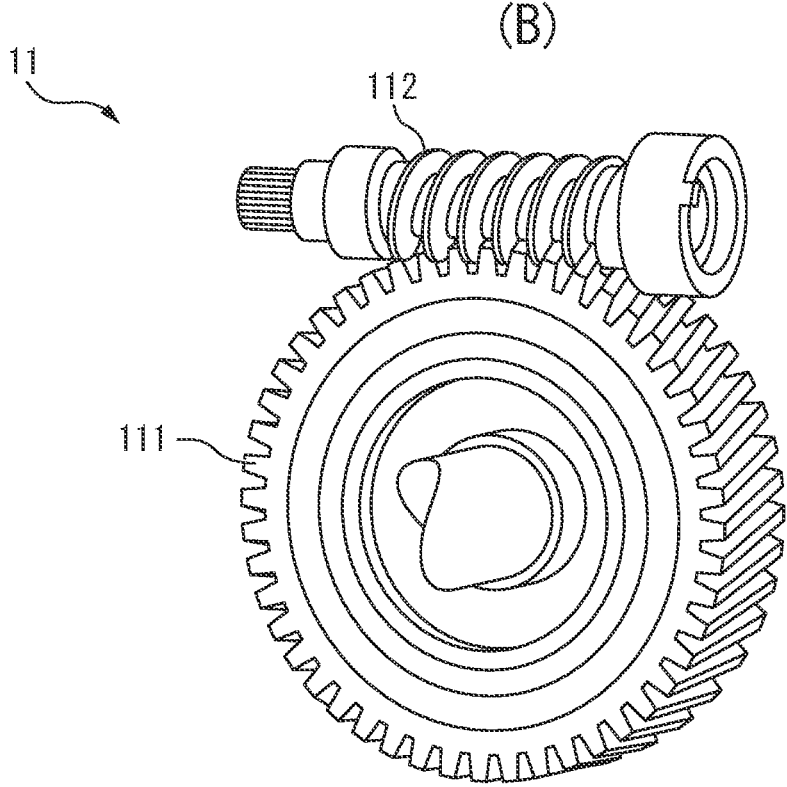

Exemplary modes of the present invention will now be described in detail, with the understanding that they are not limitative on the invention.

The gear (especially an EPS gear) according to one aspect of this embodiment is a molded resin constructed of a resin composition comprising a thermoplastic resin (A) and cellulose nanofibers (B) with the average fiber diameter of 1000 nm or smaller, and having the number average molecular weight of the thermoplastic resin (A) in the range of 10,000 to 150,000. According to one aspect, the arithmetic mean surface roughness Sa of the sliding surface of the gear with other gear teeth is 3.0 μm or lower.

<Thermoplastic Resin (A)>

The number average molecular weight of the thermoplastic resin (A) which may be used for the invention is in the range of 10,000 to 150,000, and especially 20,000 to 150,000. The number average molecular weight for the purpose of the present disclosure is the value measured in terms of standard polymethyl methacrylate, using GPC (gel permeation chromatography). The lower limit for the number average molecular weight is more preferably 22,000, even more preferably 25,000 and most preferably 30,000. The upper limit is more preferably 120,000, even more preferably 100,000 and most preferably 80,000. The number average molecular weight is preferably above this lower limit from the viewpoint of improving the gear durability, and preferably it does not exceed the upper limit from the viewpoint of the flow property of the resin composition during gear molding.

The thermoplastic resin (A) may be a crystalline resin with a melting point in the range of 100° C. to 350° C., or an amorphous resin with a glass transition temperature in the range of 100 to 250° C. The thermoplastic resin (A) may be constructed of one or more different polymers, which may be homopolymers or copolymers.

The melting point of the crystalline resin referred to here is the peak top temperature of the endothermic peak appearing when the temperature is increased from 23° C. at a temperature-elevating rate of 10° C./min using a differential scanning calorimeter (DSC). When two or more endothermic peaks appear, it represents the peak top temperature of the endothermic peak that is furthest at the high-temperature end. The enthalpy of the endothermic peak is preferably 10 J/g or greater and more preferably 20 J/g or greater. During the measurement, preferably the sample is heated once to temperature conditions of melting point+20° C. or higher, and after the resin has been melted, it is cooled to 23° C. at a temperature-lowering rate of 10° C./min and used as the sample. According to a preferred aspect, the melting point of the thermoplastic resin (A) is 150° C. or higher, 180° C. or higher, 200° C. or higher or 230° C. or higher, for example, and 500° C. or lower, 400° C. or lower or 300° C. or lower, for example.

The glass transition temperature of the amorphous resin referred to here is the peak top temperature of the peak with high reduction in storage modulus and maximum loss modulus, during measurement with an applied frequency of 10 Hz while increasing the temperature from 23° C. at a temperature-elevating rate of 2° C./min, using a dynamic viscoelasticity measuring apparatus. When two or more loss modulus peaks appear, it represents the peak top temperature of the peak that is furthest at the high-temperature end. The measuring frequency during this time is preferably one or more times in at least 20 seconds, in order to increase the measuring precision. The method of preparing the measuring sample is not particularly restricted, but from the viewpoint of eliminating the effect of molding strain it is preferred to use a strip cut out from a hot press molded article, the size (width or thickness) of the cut out strip preferably being as small as possible, from the viewpoint of heat conduction. According to a preferred aspect, the glass transition temperature of the thermoplastic resin (A) is −130° C. or higher, −60° C. or higher or −10° C. or higher, for example, and 300° C. or lower, 200° C. or lower or 150° C. or lower, for example.

The thermoplastic resin (A) may be a polyamide-based resin, polyester-based resin, polyacetal-based resin, polycarbonate-based resin, polyacrylic-based resin, polyphenylene ether-based resin (including modified polyphenylene ethers modified by blending or graft polymerization of polyphenylene ether with other resins), polyallylate-based resin, polysulfone-based resin, polyphenylene sulfide-based resin, polyethersulfone-based resin, polyketone-based resin, polyphenylene ether ketone-based resin, polyimide-based resin, polyamideimide-based resin, polyetherimide-based resin, polyurethane-based resin, polyolefin-based resin (such as an α-olefin (co)polymer), or any of various ionomers.

Specific examples that are preferred for the thermoplastic resin (A) include high-density polyethylene, low-density polyethylene (such as linear low-density polyethylene), polypropylene, polymethylpentene, cyclic olefin-based resins, poly 1-butene, poly 1-pentene, polymethylpentene, ethylene/α-olefin copolymer, ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene terpolymer), ionomers, α-olefin copolymers, modified IR (isoprene rubber), modified SEBS (styrene-ethylene-butylene-styrene copolymer), isobutylene-paramethylstyrene halide copolymer, ethylene-acrylic acid-modified polymer, ethylene-vinyl acetate copolymer and its acid-modified forms, copolymers of (ethylene and/or propylene) and (unsaturated carboxylic acids and/or unsaturated carboxylic acid esters), polyolefins obtained by forming metal salts with at least some of the carboxyl groups of copolymers of (ethylene and/or propylene) and (unsaturated carboxylic acids and/or unsaturated carboxylic acid esters), block copolymers of conjugated dienes and vinylaromatic hydrocarbons, hydrogenated forms of block copolymers of conjugated dienes and vinylaromatic hydrocarbons, copolymers of other conjugated diene compounds with nonconjugated olefins, natural rubber, various butadiene rubbers, various styrene-butadiene copolymer rubbers, isoprene rubber, butyl rubber, bromides of isobutylene and p-methylstyrene copolymers, butyl halide rubber, acrylonitrilobutadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluorine rubber, urethane rubber, polyvinyl chloride, polystyrene, acrylic polymers such as polyacrylic acid esters and polymethacrylic acid esters, acrylonitrile-based copolymers composed mainly of acrylonitrile, acrylonitrile-butane diene-styrene (ABS) resins, acrylonitrile-styrene (AS) resins, cellulosic resins such as cellulose acetate, and saponification products of vinyl chloride/ethylene copolymer, vinyl chloride/vinyl acetate copolymer, ethylene/vinyl acetate copolymer and ethylene/vinyl acetate copolymer.

These may be used alone or in combinations of two or more. When two or more are used in combination, they may be used as a polymer alloy. The thermoplastic resin used may be modified with one or more compounds selected from among unsaturated carboxylic acids and their acid anhydrides or derivatives.

From the viewpoint of heat resistance, moldability, design properties and mechanical properties, it is preferred to select one or more resins from the group consisting of polyolefin-based resins, polyamide-based resins, polyester-based resins, polyacetal-based resins, polyacrylic-based resins, polyphenylene ether-based resins and polyphenylene sulfide-based resins.

More preferred, from the viewpoint of handleability and cost, are one or more resins selected from the group consisting of polyolefin-based resins, polyamide-based resins, polyester-based resins, polyacetal-based resins, polyacrylic-based resins, polyphenylene ether-based resins and polyphenylene sulfide-based resins, and especially one or more resins selected from the group consisting of polyamide-based resins and polyacetal-based resins. As a more preferred aspect, the thermoplastic resin (A) includes a polyamide resin.

The polyolefin-based resin is a polymer obtained by polymerizing a monomer unit that includes an olefin (such as an α-olefin). Specific examples of polyolefin-based resins include, but are not limited to, ethylene-based (co)polymers such as low-density polyethylene (for example, linear low-density polyethylene), high-density polyethylene, ultralow-density polyethylene and ultrahigh molecular weight polyethylene, polypropylene-based (co)polymers such as polypropylene, ethylene-propylene copolymer and ethylene-propylene-diene copolymer, and copolymers of α-olefin s with other monomer units, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of between 0.1 g/10 min and 30 g/10 min, inclusive, as measured at 230° C. with a load of 21.2 N, according to ISO1133. The lower limit for the MFR is more preferably 0.2 g/10 min, 0.4 g/10 min, 0.5 g/10 min, 3 g/10 min or 5 g/10 min. The upper limit is more preferably 25 g/10 min, 20 g/10 min, 18 g/10 min, 15 g/10 min, 10 g/10 min or 5 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating the resin to above the melting point in the presence of or in the absence of a peroxide, for melt kneading. The polyolefin resin to be acid modified may be any of the aforementioned polyolefin-based resins, but polypropylene is most suitable for use.

The acid-modified polyolefin-based resin may be used alone, but it is preferably used in admixture with a non-modified polyolefin-based resin in order to adjust the modification rate of the composition. For example, when using a mixture of a non-modified polypropylene and an acid-modified polypropylene, the proportion of the acid-modified polypropylene is preferably 0.5 mass % to 50 mass % with respect to the total polypropylene. A more preferred lower limit is 1 mass %, even more preferably 2 mass %, yet more preferably 3 mass %, even yet more preferably 4 mass % and most preferably 5 mass %. A more preferred upper limit is 45 mass %, even more preferably 40 mass %, yet more preferably 35 mass %, even yet more preferably 30 mass % and most preferably 20 mass %. In order to maintain interfacial strength with the cellulose it is preferably higher than the lower limit, and in order to maintain ductility as a resin it is preferably lower than the upper limit.

The melt mass-flow rate (MFR) of the acid-modified polypropylene as measured at 230° C. with a load of 21.2 N according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of residing more easily at the interface between the cellulose and the resin.

Examples of preferred polyamide-based resins for the thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,1, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-,5-pentanediamine, 1,7-heptanediamine, 2-methyl-1-6-hexanediamine, 1,8-octanediamidine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 μmol/g and more preferably 30 μmol/g. The upper limit for the terminal carboxyl group concentration is preferably 150 μmol/g, more preferably 100 μmol/g and even more preferably 80 μmol/g.

For the polyamide-based resin, the carboxyl terminal group ratio with respect to the total terminal groups ([COOH]/[total terminal groups]) is more preferably 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (B) in the composition, and it is preferably no greater than 0.95 from the viewpoint of the color tone of the obtained composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from among acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decyl amine, stearylamine, cyclohexylamine and aniline.

The concentration of the amino terminal groups and carboxyl terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by 1H-NMR.

The intrinsic viscosity [η] of the polyamide-based resin, measured in concentrated sulfuric acid at 30° C., is preferably 0.6 to 2.0 dL/g, more preferably 0.7 to 1.4 dL/g, even more preferably 0.7 to 1.2 dL/g and most preferably 0.7 to 1.0 dL/g. If the aforementioned polyamide-based resin having intrinsic viscosity in the preferred range, or the particularly preferred range, is used, it will be possible to provide an effect of drastically increasing the flow property of the resin composition in the die during injection molding, and improving the outer appearance of molded pieces.

Throughout the present disclosure, "intrinsic viscosity" is synonymous with the viscosity commonly known as the limiting viscosity. The specific method for determining the viscosity is a method in which the ηsp/c of several measuring solvents with different concentrations is measured in 96% concentrated sulfuric acid under temperature conditions of 30° C., the relational expression between each ηsp/c and the concentration (c) is derived, and the concentration is extrapolated to zero. The value extrapolated to zero is the intrinsic viscosity. The details are described in Polymer Process Engineering (Prentice-Hall, Inc 1994), p. 291-294.

The number of measuring solvents with different concentrations is preferably at least 4, from the viewpoint of precision. The concentrations of the recommended measuring solutions with different viscosities are preferably at least four: 0.05 g/dL, 0.1 g/dL, 0.2 g/dL and 0.4 g/dL.

Preferred polyester-based resins as thermoplastic resins include, but are not limited to, one or more selected from among polyethylene terephthalate (PET), polybutylene terephthalate (PBT), polyethylene naphthalate (PEN), polybutylene succinate (PBS), polybutylene succinate adipate (PBSA), polybutylene adipate terephthalate (PBAT), polyallylate (PAR), polyhydroxyalkanoic acid (PHA) (a polyester resin composed of 3-hydroxyalkanoic acid), polylactic acid (PLA) and polycarbonate (PC). Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and preferably the carboxyl terminal group ratio with respect to the total terminal groups of the polyester-based resin ([[COOH]/[total terminal groups]) is 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (B) in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. A more preferred upper limit is 3.5 mol %, even more preferably 3.0 mol %, yet more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

<Cellulose Nanofibers (B) with Average Fiber Diameter of 1000 nm or Smaller>

The cellulose nanofibers (B) with an average fiber diameter of 1000 nm or smaller (hereunder also referred to as "cellulose nanofibers (B)") that may be used for the invention will now be described in greater detail.

Preferred examples of cellulose nanofibers (B) with an average fiber diameter of 1000 nm or smaller include, but are not limited to, one or more types from among cellulose fibers obtained using cellulose pulp starting materials, and modified forms of such cellulose. From the viewpoint of stability and performance, it is preferable to use one or more types of modified cellulose.

The method of producing the cellulose nanofibers is not particularly restricted, and for example, it may be treatment of cut starting pulp with hot water at 100° C. or above, hydrolysis of the hemicellulose portion to weaken it, and then defibrating by a pulverizing method using a high-pressure homogenizer, microfluidizer, ball mill or disk mill.

The average fiber diameter of the cellulose nanofibers (B) is 1000 nm or smaller, preferably 500 run or smaller and more preferably 200 nm or smaller, from the viewpoint of obtaining satisfactory mechanical strength (especially tensile modulus) for the molded resin. While a smaller average fiber diameter is preferred, it is preferably 10 run or greater, more preferably 20 nm or greater and even more preferably 30 nm or greater from the viewpoint of easier processing. The average fiber diameter is the value determined to be the equivalent spherical diameter (volume-average particle diameter) of the particles at a cumulative volume of 50% using a laser diffraction/scattering method-based particle size distribution meter.

The average fiber diameter can be measured by the following method. The cellulose nanofibers (B) at a solid content of 40 mass % are kneaded for 30 minutes in a planetary mixer (for example, a 5DM-03-R by Shinagawa Machinery Works Co., Ltd., hook-type stirring blade) at 126 rpm, room temperature, ordinary pressure, and then a purified water suspension is prepared to 0.5 mass %, a high-shear homogenizer (for example, an "Excel ED-7 Autohomogenizer", trade name of Nippon Seiki Co., Ltd., processing conditions) is used for dispersion at rotational speed: 15,000 rpm×5 minutes, a centrifugal separator (for example, a "Model 6800 Centrifugal Separator", trade name of Kubota Corp., Rotor type Model RA-400) is used for centrifugation under conditions with a centrifugal force of 39,200 m$^2$/s for 10 minutes, the resulting supernatant is obtained, the supernatant is centrifuged at 116,000 m$^2$/s for 45 minutes, and the centrifugation supernatant is obtained. The supernatant liquid is used to measure the 50% cumulative particle diameter, as the volume-average particle diameter (specifically, the equivalent spherical diameter of particles at a cumulative volume of 50% with respect to the total volume of the particles), in the volume frequency particle size distribution obtained by a laser diffraction/scattering method-based particle size distribution meter (for example, an "LA-910" or "LA-950", trade names of Horiba, Ltd., ultrasonic treatment for 1 minute, refractive index: 1.20).

According to a typical aspect, the L/D ratio of the cellulose nanofibers (B) with an average fiber diameter of 1000 nm or smaller is 20 or greater. The lower limit for L/D of the cellulose nanofibers is preferably 30, more preferably 40, even more preferably 50 and yet more preferably 100. The upper limit is not particularly restricted but is preferably 10,000 or lower from the viewpoint of handleability. The L/D ratio of the cellulose nanofibers is preferably within this range to exhibit satisfactory mechanical properties for the gear of the present disclosure using a small amount of cellulose nanofibers.

For the present disclosure, the length, diameter and L/D ratio of the cellulose nanofibers are determined by preparing aqueous dispersions of the cellulose nanofibers, each aqueous dispersion being dispersed using a high-shear homogenizer (for example, an "Excel ED-7 Autohomogenizer", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with an optical microscope or a high-resolution scanning microscope (SEM) or atomic force microscope (AFM). Specifically, the length (L) and diameter (D) of 100 randomly selected cellulose nanofibers are measured in an observation field with the magnification adjusted so as to observe at least 100 cellulose nanofibers, and the ratio (L/D) is calculated. The lengths and diameters of the cellulose nanofibers of the present disclosure are the number average values for the 100 cellulose fibers.

The length, diameter and L/D ratio of the cellulose fibers in the resin composition or molded article can be confirmed by dissolving the resin component in the composition in an organic or inorganic solvent capable of dissolving the resin component of the composition, separating the cellulose, thoroughly rinsing it with the solvent, and then replacing the solvent with purified water or a dispersible organic solvent to form an aqueous dispersion, diluting the cellulose concentration to 0.1 to 0.5 mass % with purified water, casting the dispersion onto mica, and performing measurement by the measuring method described above using the air-dried product as the measuring sample. The cellulose is measured using 100 randomly selected fibers.

Modified cellulose for the present disclosure may be one modified using one or more modifying agents selected from among esterifying agents, silylating agents, isocyanate compounds, alkylating halide agents, alkylene oxides and/or glycidyl compounds.

An esterifying agent used as a modifying agent includes any organic compound having at least one functional group capable of reacting with the hydroxyl groups on the surface of cellulose to esterify them. The esterification may be carried out by the method described in paragraph [0108] of International Patent Publication No. WO2017/159823. The esterifying agent used may be a commercially available reagent or product.

Preferred examples of esterifying agents include, but are not limited to, aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any arbitrarily selected among these, as well as symmetrical anhydrides (acetic anhydride, maleic anhydride, cyclohexane-carboxylic anhydride, benzene-sulfonic acid anhydride), mixed acid anhydrides ((butyric acid-valeric acid anhydride), cyclic anhydrides (succinic anhydride, phthalic anhydride, naphthalene-1,8:4,5-tetracarboxylic dianhydride, cyclohexane-1,2,3,4-tetracarboxylic acid-3,4-anhydride) and ester acid anhydrides (acetic acid 3-(ethoxycarbonyl)propanoic anhydride, benzoylethyl carbonate).

Preferred for use among these from the viewpoint of reactivity, stability and cost are acetic acid, propionic acid, butyric acid, valeric acid, caproic acid, caprylic acid, lauric acid, tridecanoic acid, myristic acid, palmitic acid, stearic acid, benzoic acid, acetic anhydride, maleic anhydride, succinic anhydride and phthalic anhydride.

A silylating agent used as a modifying agent includes any Si-containing compound having at least one reactive group that can react with the hydroxyl groups on the surface of the cellulose, or groups remaining after their hydrolysis. The silylating agent may be a commercially available reagent or product.

Preferred examples of silylating agents include, but are not limited to, chlorodunethylisopropylsilane, chlorodinethylbutylsilane, chlorodimethyloctylsilane, chlorodinethyldodecylsilane, chlorodimethyloctadecylsilane, chlorodimethylphenylsilane, chloro(1-hexenyl)dimethylsilane, dichlorohexyhnethylsilane, dichloroheptylmethylsilane, trichlorooctylsilane, hexanethyldisilazane, 1,3-divinyl-1,1,3,3-tetramethyldisilazane, 1,3-divinyl-1,3-diphenyl-1,3-dimethyl-disilazane, 1,3-N-dioctyltetramethyl-disilazane, diisobutyltetranethyldisilazane, diethyltetramethyldisilazane, N-dipropyltetramethyldisilazane, N-dibutyltetraiethyldisilazane or 1,3-di(para-t-butylphenethyl)tetramethyldisilazane, N-trimethylsilylacetamide, N-methyldiphenylsilylacetamide, N-triethylsilylacetamide, t-butyldiphenylmethoxysilane, octadecyldimethyhnethoxysilane, dinethyloctylmethoxysilane, octyhnethyldimnethoxysilane, octyltrimethoxysilane, trimethylethoxysilaneand octyltriethoxysilane.

Preferred for use among these from the viewpoint of reactivity, stability and cost are hexamethyldisilazane, octadecyldimethylmethoxysilane, dimethyloctylmethoxysilane and trimethylethoxysilane.

An alkylating halide agent used as a modifying agent includes any organic compound having at least one functional group capable of reacting with the hydroxyl groups on the surface of cellulose to form an alkylated halide. The alkylating halide agent used may be a commercially available reagent or product.

Preferred examples of alkylating halide agents include, but are not limited to, chloropropane, chlorobutane, bromopropane, bromohexane, bromoheptane, iodomethane, iodoethane, iodooctane, iodooctadecane and iodobenzene. Preferred for use among these from the viewpoint of reactivity, stability and cost are bromohexane and iodooctane.

An isocyanate compound used as a modifying agent includes any organic compound having at least one isocyanate group capable of reacting with the hydroxyl groups on the surface of cellulose. The isocyanate compound may be a blocked isocyanate compound that allows the blocking groups to dissociate at a specific temperature to regenerate isocyanate groups, or a polyisocyanate dimer or trimer, or a modified isocyanate biuret or polymethylene polyphenyl polyisocyanate (polymeric MDI). These may be commercially available reagents or products.

Preferred examples of isocyanate compounds include, but are not limited to, aliphatic polyisocyanates, alicyclic polyisocyanates, aromatic polyisocyanates, aromatic-aliphatic polyisocyanates, blocked isocyanate compounds and polyisocyanates. Examples include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane), tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate), dialkyldiphenylmethane diisocyanates, tetraalkyldiphenylmethane diisocyanates, α,α,α,α-tetramethylxylylene diisocyanate, and blocked isocyanate compounds obtained by reacting these isocyanate compounds with oxime-based blocking agents, phenol-based blocking agents, lactam-based blocking agents, alcohol-based blocking agents, activated methylene-based blocking agents, amine-based blocking agents, pyrazole-based blocking agents, bisulfite-based blocking agents or imidazole-based blocking agents.

Preferred for use among these from the viewpoint of reactivity, stability and cost are TDI, MDI, hexamethylene diisocyanate, and blocked isocyanates obtained using hexamethylene diisocyanate-modified compounds and hexamethylene diisocyanate as starting materials.

The dissociation temperature of the blocking groups of these blocked isocyanate compounds is at maximum preferably 210° C., more preferably 190° C. and even more preferably 150° C., from the viewpoint of reactivity and stability. The minimum is preferably 70° C., more preferably 80° C. and even more preferably 110° C. Blocking agents with blocking group dissociation temperatures in this range include methyl ethyl ketone oxine, ortho-secondary butylphenol, caprolactam, sodium bisulfite, 3,5-dimethylpyrazole and 2-methylimidazole.

An alkylene oxide and/or glycidyl compound used as a modifying agent includes any organic compound having at least one alkylene oxide, glycidyl and/or epoxy group capable of reacting with the hydroxyl groups on the surface of cellulose. The alkylene oxide and/or glycidyl compound may be a commercially available reagent or product.

Preferred examples of alkylene oxide and/or glycidyl compounds include, but are not limited to, glycidyl ethers such as methyl glycidyl ether, ethyl glycidyl ether, butyl glycidyl ether, 2-ethylhexyl glycidyl ether, 2-methyloctyl glycidyl ether, phenyl glycidyl ether, p-tertiary butylphenyl glycidyl ether, sec-butylphenyl glycidyl ether, n-butylphenyl glycidyl ether, phenylphenol glycidyl ether, cresyl glycidyl ether and dibromocresyl glycidyl ether; glycidyl esters such as glycidyl acetate and glycidyl stearate; and polyhydric alcohol glycidyl ethers such as ethyleneglycol diglycidyl ether, propyleneglycol diglycidyl ether, 1,4-butanediol diglycidyl ether, hexamethyleneglycol diglycidyl ether, resorcinol diglycidyl ether, bisphenol A diglycidyl ether, polyethyleneglycol diglycidyl ether, polypropyleneglycol diglycidyl ether, polybutyleneglycol diglycidyl ether, glycerol triglycidyl ether, trimethylolpropane-triglycidyl ether, pentaerythritol tetraglycidyl ether, sorbitol polyglycidyl ether, sorbitan polyglycidyl ether, polyglycerol polyglycidyl ether and diglycerol polyglycidyl ether.

Preferred for use among these from the viewpoint of reactivity, stability and cost are 2-methyloctyl glycidyl ether, hexamethyleneglycol diglycidyl ether and pentaerythritol tetraglycidyl ether.

Modified cellulose nanofibers can be confirmed by dissolving the resin component of the composition in an organic or inorganic solvent capable of dissolving the resin component of the resin composition or molded article, centrifuging or filtering the solution to separate the cellulose and thoroughly rinsing it with the solvent, and then subjecting the separated modified cellulose nanofibers to thermal decomposition or hydrolysis. Alternatively, they can be confirmed by direct $^1$H-NMR or 13C-NMR measurement.

From the viewpoint of satisfactory mechanical properties, thermal stability and durability, the content of the cellulose nanofibers (B) with respect to 100 parts by mass of the thermoplastic resin (A) is preferably 5 parts by mass or greater, more preferably 8 parts by mass or greater and even more preferably 10 parts by mass or greater, while from the viewpoint of obtaining sufficient moldability it is 50 parts by mass or less, preferably 40 parts by mass or less and more preferably 30 parts by mass or less.

The resin composition preferably includes 45 to 95 mass % of the thermoplastic resin (A) and 5 to 50 mass % of the cellulose nanofibers (B), or 50 to 90 mass % of the thermoplastic resin (A) and 10 to 45 mass % of the cellulose nanofibers (B), or 60 to 80 mass % of the thermoplastic resin (A) and 20 to 40 mass % of the cellulose nanofibers (B).

<Surface Treatment Agent (C)>

The resin composition may include a surface treatment agent (C) as an additional component. According to one aspect, the surface treatment agent (C) is a water-soluble polymer. For the purpose of the present disclosure, "water-soluble" means dissolving to 0.1 g or greater in 100 g of water at 23° C. According to another aspect, the surface treatment agent (C) has a hydrophilic segment and a hydrophobic segment (i.e. it is an amphiphilic molecule). Amphiphilic molecules include those having carbon atoms as the basic backbone, and with a functional group comprising elements selected from among carbon, hydrogen, oxygen, nitrogen, chlorine, sulfur and phosphorus. As long as the aforementioned structure is in the molecule, inorganic compounds with the aforementioned functional groups chemically bonded are also suitable. When the surface treatment agent (C) is a mixture of two or more substances, the property values for the disclosure (such as molecular weight, HLB value, static surface tension, dynamic surface tension and SP value) are the values for the mixture. According to one aspect, the surface treatment agent (C) is a surfactant. According to another aspect, the surface treatment agent (C) is a nonionic surfactant. According to yet another aspect, the surface treatment agent (C) is a low molecular thermoplastic resin. The surface treatment agent (C) differs from the thermoplastic resin (A) (being, for example, a modified form (such as an acid-modified polymer or a copolymer) of the same polymer as the thermoplastic resin (A) of the disclosure, or a polymer of a different type than the thermoplastic resin (A)). According to one aspect, the surface treatment agent (C) is a polymer having a different molecular weight, repeating structure and/or block structure from the thermoplastic resin (A). According to another aspect, the surface treatment agent (C) and the thermoplastic resin (A) are the same polymer with different molecular weights, in which case surface treatment agent (C) has the smaller molecular weight.

According to a typical aspect, the thermoplastic resin (A) is not water-soluble while the surface treatment agent (C) is water-soluble. The surface treatment agent (C) may be mixed with the cellulose nanofibers (B) in the form of an aqueous dispersion that contains the surface treatment agent (C) at high concentration, for example. The surface treatment agent (C) may be a commercially available reagent or product.

When the surface treatment agent (C) has a hydrophilic segment and a hydrophobic segment (i.e. it is an amphiphilic molecule), the hydrophilic segment has satisfactory affinity with the cellulose surface. The hydrophobic segment can inhibit aggregation between the cellulose molecules through the hydrophilic segments. Therefore, the hydrophilic segment and hydrophobic segment in the surface treatment agent (C) must be present in the same molecule.

According to a typical aspect, the hydrophilic segment includes a hydrophilic structure (for example, one or more hydrophilic groups selected from among hydroxyl, carboxy, carbonyl, amino, ammonium, amide and sulfo groups), and it is therefore a portion exhibiting satisfactory affinity with the cellulose nanofibers (B). Examples of hydrophilic segments include polyethylene glycol segments (i.e. segments with multiple oxyethylene units) (PEG block), segments with repeating units containing quaternary ammonium salt structures, polyvinyl alcohol segments, polyvinylpyrrolidone segments, polyacrylic acid segments, carboxyvinyl polymer segments, cationized guar gum segments, hydroxyethyl cellulose segments, methyl cellulose segments, carboxymethyl cellulose segments and polyurethane soft segments (specifically, diol segments). According to a preferred aspect, the hydrophilic segment includes an oxyethylene unit.

Examples of hydrophobic segments include segments having alkylene oxide units of 3 or more carbon atoms (such as PPG blocks), and segments containing any of the following polymer structures:

an acrylic polymer, styrene-based resin, vinyl chloride-based resin, vinylidene chloride-based resin, polyolefin-based resin, a polycondensate of an organic dicarboxylic acid of 4 to 12 carbon atoms and an organic diamine of 2 to 13 carbon atoms, such as polyhexamethyleneadipamide (nylon 6,6), polyhexamethylene azeramide (nylon 6,9), polyhexamethylene sebacamnide (nylon 6,10), polyhexamethylenedodecanoamide (nylon 6,12) or polybis(4-aminocyclohexyl)methanedodecane, a polycondensate of ω-amino acid (for example, ω-announdecanoic acid) (such as polyundecaneamide (nylon 11)), an amino acid lactam containing a lactain ring-opening polymer, such as the ε-aminocaprolactam ring-opening polymer polycapramide (nylon 6) or the ε-aminolaurolactam ring-opening polymer polylauric lactam (nylon 12), a polymer composed of a diamine and a dicarboxylic acid, a polyacetal-based resin, polycarbonate-based resin, polyester-based resin, polyphenylene sulfide-based resin, polysulfone-based resin, polyether ketone-based resin, polyimide-based resin, fluorine-based resin, hydrophobic silicone-based resin, melamine-based resin, epoxy-based resin or phenol-based resin.

The carbon number of the alkylene oxide unit in the hydrophobic segment is preferably 3 or greater, 5 or greater, 10 or greater or 15 or greater. A longer chain length increases affinity between the surface treatment agent (C) and cellulose nanofibers (B), but from the viewpoint of balance between affinity and coating properties (that is, localization at the interface between the thermoplastic resin (A) and cellulose nanofibers (B)), the carbon number is preferably 60 or smaller, 50 or smaller, 40 or smaller, 30 or smaller or 20 or smaller.

According to a preferred aspect, the surface treatment agent (C) has a PEG block as the hydrophilic group and a PPG block as the hydrophobic group in the molecule.

The surface treatment agent (C) may have a graft copolymer structure and/or a block copolymer structure. These structures may exist alone, or two or more may exist in combination. In the case of two or more structures, they may form a polymer alloy. Partial modified forms or terminal modified (acid-modified) forms of these copolymers may also be used.

The structure of the surface treatment agent (C) is not particularly restricted, and if the hydrophilic segment is represented as A and the hydrophobic segment as B, it may be an AB block copolymer, ABA block copolymer, BAB block copolymer, ABAB block copolymer, ABABA block copolymer or BABAB copolymer, a 3-branch copolymer containing A and B, a 4-branch copolymer containing A and B, a star-shaped copolymer containing A and B, a monocyclic copolymer containing A and B, a polycyclic copolymer containing A and B, or a semicircular copolymer containing A and B.

The structure of the surface treatment agent (C) is preferably an AB block copolymer, ABA triblock copolymer, a 3-branch copolymer containing A and B or a 4-branch copolymer containing A and B, and more preferably an ABA triblock copolymer, a 3-branch structure (3-branch copolymer containing A and B) or a 4-branch structure (4-branch copolymer containing A and B). The structure of the surface treatment agent (C) is preferably a structure as described above in order to ensure satisfactory affinity with the cellulose nanofibers (B).

Preferred examples for the surface treatment agent (C) include copolymers obtained using one or more from among compounds that provide hydrophilic segments (for example, polyethylene glycol) and compounds that provide hydrophobic segments (for example, polypropylene glycol, poly (tetramethylene ether) glycol (PTMEG) and polybutadienediol) (for example, block copolymers of propylene oxide and ethylene oxide or block copolymers of tetrahydrofuran and ethylene oxide). Such surface treatment agents may be used alone or in combinations of two or more. When two or more are used in combination, they may be used as a polymer alloy. A modified copolymer may also be used (for example, modified with one or more compounds selected from among unsaturated carboxylic acids and their acid anhydrides or derivatives).

Preferred among these, from the viewpoint of heat resistance (odor) and mechanical properties, are copolymers of polyethylene glycol and polypropylene glycol, copolymers of polyethylene glycol and poly(tetramethylene ether) glycol (PTMEG), and mixtures thereof, with copolymers of polyethylene glycol and polypropylene glycol being more preferred from the viewpoint of handleability and cost.

According to a typical aspect, the surface treatment agent (C) has a cloud point. This is a phenomenon in which increasing the temperature of a transparent or semi-transparent aqueous solution of a nonionic surfactant solution having a polyether chain such as a polyoxyethylene chain as the hydrophilic site, causes the solution to become opaque at a certain temperature (called the cloud point). Specifically, heating the transparent or semi-transparent aqueous solution at low temperature results in rapid reduction in the solubility of the nonionic surfactant around a borderline temperature, causing the previously dissolved surfactant to aggregate and become cloudy, separating from the water. This is thought to occur because high temperature results in loss of hydrating power by the nonionic surfactant (the hydrogen bonds between the polyether chains and water are broken, rapidly lowering the solubility in water). The cloud point tends to be lower with longer polyether chains. Since dissolution in water occurs in an arbitrary proportion at temperatures below the cloud point, the cloud point is a reference for the hydrophilicity of the surface treatment agent (C).

The cloud point of the surface treatment agent (C) can be measured by the following method. A tuning fork oscillating viscometer (such as SV-10A by A&D Co., Ltd.) is used for measurement in a temperature range of 0 to 100° C., adjusting the aqueous solution of the surface treatment agent (C) to 0.5 mass %, 1.0 mass % and 5 mass %. The cloud point is the part at each concentration exhibiting an inflection point (the point at which the viscosity increase changes, or the aqueous solution becomes clouded).

From the viewpoint of handleability, the lower limit for the cloud point of the surface treatment agent (C) is preferably 10° C., more preferably 20° C. and most preferably 30° C. The upper limit for the cloud point is not particularly restricted but is preferably 120° C., more preferably 110° C., even more preferably 100° C. and most preferably 60° C. In order to ensure satisfactory affinity with the cellulose nanofibers (B), the cloud point of the surface treatment agent (C) is preferably in the range specified above.

From the viewpoint of plasticization of the resin composition, the lower limit for the melting point of the surface treatment agent (C) is preferably −35° C., more preferably −10° C. and most preferably 0° C., and from the viewpoint of operability the upper limit is preferably 70° C., more preferably 30° C. and most preferably 10° C.

The lower limit for the mass ratio of the hydrophilic segment and hydrophobic segment of the surface treatment agent (C) (hydrophobic segment molecular weight/hydrophilic segment molecular weight) is not particularly restricted but is preferably 0, more preferably 0.1, even more preferably 0.5 and most preferably 1. From the viewpoint of solubility in water, the upper limit for the mass ratio of the hydrophilic segment and hydrophobic segment (hydrophobic segment molecular weight/hydrophilic segment molecular weight) is preferably 199, more preferably 100, even more preferably 50 and most preferably 20. In order to ensure satisfactory affinity with the cellulose nanofibers (B), this ratio for the surface treatment agent (C) is preferably in the range specified above.

From the viewpoint of improving the odor property during preparation of the resin composition and the moldability during molding, the lower limit for the number average molecular weight of the surface treatment agent (C) is preferably 100, more preferably 200, even more preferably 250, yet more preferably 300 and most preferably 500. From the viewpoint of handleability, the upper limit for the number average molecular weight is preferably 50,000, more preferably 30,000, even more preferably 25,000, yet more preferably 23,000, even yet more preferably 20,000, even further yet more preferably 10,000 and most preferably 5000. In order to ensure satisfactory affinity with the cellulose nanofibers (B), the number average molecular weight of the surface treatment agent (C) is preferably in the range specified above.

From the viewpoint of affinity with the cellulose nanofibers the lower limit for the molecular weight of the hydrophilic segment of the surface treatment agent (C) is preferably 100, more preferably 150 and most preferably 200, and from the viewpoint of solubility in water the upper limit is preferably 20,000, more preferably 15,000 and most preferably 10,000.

From the viewpoint of dispersibility of the cellulose nanofibers in the resin, the lower limit for the molecular weight of the hydrophobic segment of the surface treatment agent (C) is preferably 100, more preferably 150 and most preferably 200, and from the viewpoint of solubility in water the upper limit is preferably 10,000, more preferably 5000 and most preferably 4000.

The preferred amount of the surface treatment agent (C) in the resin composition is in the range of 0.1 to 10 mass % of the surface treatment agent (C) with respect to the total resin composition. The upper limit is preferably 8 mass %, more preferably 5 mass %, even more preferably 4 mass % and most preferably 3 mass %. There is no particular restriction on the lower limit, but it is preferably 0.1 mass %, more preferably 0.2 mass % and most preferably 0.5 mass %. Such an upper limit on the surface treatment agent (C) will inhibit plasticization of the resin composition and can maintain satisfactory strength. Such a lower limit on the surface treatment agent (C) can increase the dispersibility of the cellulose nanofibers (B) in the thermoplastic resin (A).

The preferred amount of surface treatment agent (C) in the resin composition is an amount of surface treatment agent (C) in the range of 0.1 to 50 parts by mass with respect to 100 parts by mass of the cellulose nanofibers (B). The upper limit is preferably 30 parts by mass, more preferably 20 parts by mass, even more preferably 10 parts by mass, yet more preferably 5 parts by mass and most preferably 3 parts by mass. There is no particular restriction on the lower limit, but it is preferably 0.1 part by mass, more preferably 0.5 part by mass and most preferably 1 part by mass. Such an upper limit for the amount of surface treatment agent (C) will inhibit plasticization of the resin composition and molded resin and can maintain satisfactory strength. Such a lower limit on the surface treatment agent (C) can increase the dispersibility of the cellulose nanofibers (B).

The amount of surface treatment agent (C) in the resin composition can be easily confirmed by a method commonly known to those skilled in the art. The confirmation method is not restricted, but the following is an example. When the resin composition is dissolved in a solvent that dissolves the thermoplastic resin (A), using a fragment of the molded resin obtained by molding the resin composition, a soluble portion 1 (resin, surface treatment agent and antioxidant) and an insoluble portion 1 (cellulose and surface treatment agent) separate. The soluble portion 1 is reprecipitated with a solvent that does not dissolve the resin but dissolves the surface treatment agent, separating an insoluble portion 2 (resin) and soluble portion 2 (surface treatment agent, antioxidant). The insoluble portion 1 is dissolved in a solvent that dissolves the surface treatment agent, separating a soluble portion 3 (surface treatment agent, antioxidant) and an insoluble portion 3 (cellulose). The soluble portion 2 and soluble portion 3 are concentrated (drying, air-drying, reduced pressure drying) to allow quantitation of the surface treatment agent (C). Identification and molecular weight measurement of the concentrated surface treatment agent (C) can be carried out by the methods described above.

The surface treatment agent (C) of the disclosure preferably has an HLB value of 0.1 or greater and less than 12. According to the disclosure, the HLB value can be determined by the following formula based on the Griffin method. In the following formula 1, the "sum of formula weights of hydrophilic groups/molecular weight" is the mass % of the hydrophilic group.

Griffin method:HLB value=20×(sum of formula weights of hydrophilic groups/molecular weight)   Formula 1)

From the viewpoint of easier solubility in water, the lower limit for the HLB value of the surface treatment agent (C) of the disclosure is not particularly restricted but is preferably 0.1, more preferably 0.2 and most preferably 1. From the viewpoint of dispersibility of the cellulose nanofibers (B) in the resin composition, the upper limit for the HLB value is preferably less than 12, more preferably 10, even more preferably 8, yet more preferably 7.5 and most preferably 7. The HLB value of the surface treatment agent (C) is preferably within this range for excellent dispersibility in water and organic solvents (re-dispersibility, for example, when a mixture comprising the cellulose nanofibers (B) and surface treatment agent (C) is prepared during production of the resin composition, and redispersed in water or an organic solvent). Excellent dispersibility in organic solvents means excellent dispersibility in resins. The HLB value is a value representing the balance between hydrophobicity and hydrophilicity of the surfactant, being represented as a value of 1 to 20, with a smaller value indicating stronger hydrophobicity and a larger value indicating stronger hydrophilicity.

More preferably, the surface treatment agent (C) used (especially an amphiphilic molecule) has a solubility parameter (SP value) of 7.25 or greater. If the surface treatment agent (C) has an SP value in this range, the dispersibility of the cellulose nanofibers (B) with an average fiber diameter of 1000 nm or smaller in the resin will increase.

According to a publication by Foders (R. F. Foders: Polymer Engineering & Science, vol. 12(10), p. 2359-2370 (1974)), the SP value depends on both the cohesive energy density and the molar molecular weight of the substance, which in turn are believed to depend on the type and number of substituents of the substance, and SP values $(cal/cm^3)^{1/2}$ for the major existing solvents used in the examples described below have been publicly disclosed, as published by Ueda et al. (Toryo no Kenkyu, No. 152, October 2010).

The SP value of the surface treatment agent (C) can be experimentally determined from the soluble/insoluble boundary obtained when the surface treatment agent (C) has been dissolved in different solvents with known SP values. For example, it can be judged based on whether or not total dissolution takes place when 1 mL of the surface treatment agent (C) has been dissolved for a period of 1 hour at room temperature while stirring with a stirrer, in various solvents (10 mL) having different SP values shown in the tables indicated in the Examples. When the surface treatment agent (C) is soluble in diethyl ether, for example, the SP value of the surface treatment agent (C) is 7.25 or greater.

The static surface tension of the surface treatment agent (C) (especially an amphiphilic molecule) is preferably 20 mN/m or greater. The static surface tension is the surface tension measured by the Wilhelmy method. When a liquid surface treatment agent (C) is to be used at room temperature, the value measured at 25° C. is used. When a surface treatment agent (C) that is solid or semi-solid at room temperature is to be used, the surface treatment agent (C) is heated to the melting point or higher and measurement is performed in the molten state, using the value corrected for a temperature of 25° C. According to the present disclosure, "room temperature" means 25° C. For the purpose of facilitating addition, the surface treatment agent (C) may be dissolved or diluted with an organic solvent or water. The static surface tension, in such cases, is the static surface tension of the surface treatment agent (C) itself If the static surface tension of the surface treatment agent (C) is within the range specified by the present disclosure, the effect exhibited is that of surprisingly increasing the dispersibility of the cellulose nanofibers (B) with an average fiber diameter of 1000 nm or smaller in the resin. While the reason for this is not fully understood, it is believed to be that the hydrophilic functional groups in the surface treatment agent (C) (especially an amphiphilic molecule) cover the surfaces of the cellulose nanofibers (B) with an average fiber diameter of 1000 nm or smaller by hydrogen bonding with the hydroxyl groups or reactive groups on the surfaces of the cellulose nanofibers (B) with an average fiber diameter of 1000 nm or smaller, thus inhibiting formation of interfacial surfaces with the resin. By having the hydrophilic groups distributed in the cellulose nanofibers (B) with an average fiber diameter of 1000 nm or smaller, a hydrophobic atmosphere is formed on the resin side, so that affinity with the resin side also increases.

The preferred lower limit for the static surface tension of the surface treatment agent (C) is 23 mN/m, more preferably 25 mN/m, even more preferably 30 mN/r, yet more preferably 35 mN/m and most preferably 39 mN/m. The preferred upper limit for the static surface tension of the surface treatment agent (C) is 72.8 mN/m, more preferably 60 mN/m, even more preferably 50 mN/m and most preferably 45 mN/m.

The static surface tension of the surface treatment agent (C) is preferably within a specific range from the viewpoint of obtaining both affinity of the surface treatment agent (C) with the thermoplastic resin and affinity with the cellulose nanofibers (B) with an average fiber diameter of 1000 nm or smaller, and exhibiting improved properties including microdispersibility of the cellulose nanofibers (B) with an average fiber diameter of 1000 nm or smaller in the resin, fluidity of the resin composition, and strength and elongation of the molded resin.

The static surface tension of the surface treatment agent (C) of the present disclosure can be measured using a commercially available surface tension measuring apparatus. As a specific example, measurement may be carried out by the Wilhelmy method using an automatic surface tension measuring apparatus (for example, a "Model CBVP-Z", trade name of Kyowa Interface Science Co., Ltd., with use of accessory glass cell). During this time, when the surface treatment agent (C) is a liquid at room temperature, it is charged in to a height of 7 mm to 9 mm from the bottom of the accessory stainless steel dish to the liquid level, and after adjusting the temperature to 25° C. 1° C., measurement is performed and calculation is by the following formula.

$$\gamma = (P - mg + sh\mu g)/L \cos\theta$$

Here, γ: static surface tension, P: balancing force, m: plate mass, g: gravitational constant, L: plate circumferential length, θ: contact angle between plate and liquid, s: plate cross-sectional area, h: sunken depth from liquid level (until forces balanced), ρ: liquid density.

Since a solid at room temperature cannot have its surface tension measured by this method, the surface tension measured at a temperature of melting point+5° C. is used for convenience. For an unknown substance, the melting point can be measured by first measuring the melting point by a visual melting point measuring method (JIS K6220), heating to the melting point or above to cause melting, and then adjusting the temperature to the melting point+5° C. and measuring the surface tension by the aforementioned Wilhelmy method.

The dynamic surface tension of the surface treatment agent (C) (especially an amphiphilic molecule) is preferably 60 mN/m or lower. A more preferred upper limit for the dynamic surface tension is 55 mN/m, more preferably 50 mN/m, even more preferably 45 mN/m and most preferably 40 mN/m. A preferred lower limit for the dynamic surface tension of the surface treatment agent (C) is 10 mN/m. A more preferred lower limit is 15 mN/m, with 20 mN/m being most preferred.

The dynamic surface tension referred to here is the surface tension measured by the maximum bubble pressure method (a method of running air through a tubule ("probe") inserted into a liquid to generate air bubbles, measuring the maximum pressure (maximum bubble pressure) when air bubbles are generated, and calculating the surface tension). Specifically, the dynamic surface tension of the invention is the value of the surface tension measured by preparing a measuring solution of the surface treatment agent (C) dissolved or dispersed in ion-exchanged water to 5 mass %, adjusting the temperature to 25° C., and then using a dynamic surface tension meter (for example, a Theta Science Model t-60, product name of Eko Instruments, probe (capillary TYPE I (made of PEEK resin), single mode)), for measurement with an air bubble generation cycle of 10 Hz. The dynamic surface tension at each cycle is calculated by the following formula.

$$\sigma = \Delta P \cdot r/2$$

Here, σ: dynamic surface tension, ΔP: differential pressure (maximum pressure−minimum pressure), r: capillary radius.

The dynamic surface tension measured by the maximum bubble pressure method is the dynamic surface tension of the surfactant at its location of fastest movement. The surface treatment agent (C) will usually form micelles in water. A low dynamic surface tension indicates a rapid diffusion rate of the surfactant molecules from the micelle state, while a high dynamic surface tension indicates a slow diffusion rate of the molecules.

It is advantageous for the dynamic surface tension of the surface treatment agent (C) to be within the range specified above, from the standpoint of exhibiting an effect of notably increasing dispersion of the cellulose nanofibers (B) with an average fiber diameter of 1000 nm or smaller in the resin composition. While the reason for the increased dispersion is not understood in detail, it is believed that a surface treatment agent (C) with low dynamic surface tension has excellent diffusibility in the extruder, allowing it to be localized at the interface between the cellulose nanofibers (B) with an average fiber diameter of 1000 nm or smaller and the resin and to satisfactorily cover the surfaces of the cellulose nanofibers (B) with an average fiber diameter of 1000 nm or smaller, thus contributing to an effect of increasing the dispersibility. The effect of improved dispersibility of the cellulose nanofibers (B) with an average fiber diameter of 1000 nm or smaller, obtained by limiting the dynamic surface tension of the surfactant to below a specified value, also exhibits a notable effect of eliminating strength defects in the molded article.

The surface treatment agent (C) (especially an amphiphilic molecule) preferably has a higher boiling point than water. Having a higher boiling point than water means having a boiling point that is higher than the boiling point of water at each pressure on a vapor pressure curve (100° C. at below 1 atmosphere, for example).

If a surface treatment agent (C) having a higher boiling point than water is selected, then in the step of drying the cellulose nanofibers (B) with an average fiber diameter of 1000 nm or smaller that have been dispersed in water in the presence of the surface treatment agent (C) to obtain a preparation of cellulose nanofibers (B) with an average fiber diameter of 1000 nm or smaller, for example, the water and surface treatment agent (C) will be exchanged during the course of water evaporation, causing the surface treatment agent (C) to remain on the surfaces of the cellulose nanofibers (B) with an average fiber diameter of 1000 nm or smaller, so that an effect can be exhibited of greatly inhibiting aggregation of the cellulose nanofibers (B) with an average fiber diameter of 1000 nm or smaller.

From the viewpoint of handleability, the surface treatment agent (C) that is used is preferably a liquid at room temperature (i.e. 25° C.). A surface treatment agent (C) that is a liquid at ordinary temperature is advantageous in that it will have better affinity with the cellulose nanofibers (B) with an average fiber diameter of 1000 nm or smaller, and will also penetrate more easily into the resin.

When the surface treatment agent (C) is a surfactant, the surfactant used may be any anionic surfactant, nonionic surfactant, zwitterionic surfactant or cationic surfactant, but from the viewpoint of affinity with the cellulose nanofibers (B), it is preferably an anionic surfactant or nonionic surfactant, and more preferably a nonionic surfactant. The surfactant used may be one that is commonly utilized for edible or industrial purposes. According to a particularly preferred aspect, the surfactant is one having the dynamic surface tension specified above.

Anionic surfactants include fatty acid-based (anionic) ones such as sodium fatty acid salts, potassium fatty acid salts and sodium alpha-sulfo fatty acid esters, straight-chain alkylbenzene-based ones include straight-chain sodium alkylbenzene sulfonates, higher alcohol-based (anionic) ones include sodium alkylsulfuric acid esters and sodium alkylether sulfuric acid esters, alpha-olefin-based ones include alpha-sodium olefin sulfonates, and normal paraffinic ones include sodium alkylsulfonates, any of which may be used either alone or in combinations of two or more.

Nonionic surfactants include fatty acid-based (nonionic) ones such as glycolipids including sucrose fatty acid esters, sorbitan fatty acid esters and polyoxyethylenesorbitan fatty acid esters, and fatty acid alkanolamides, higher alcohol-based (nonionic) ones such as polyoxyethylenealkyl ethers, and alkylphenol-based ones such as polyoxyethylenealkylphenyl ethers, any of which may be used either alone or in combinations of two or more.

Zwitterionic surfactants include amino acid-based ones such as alkylamino fatty acid sodium salts, betaine-based ones such as alkyl betaines, and amine oxide-based ones such as alkylamine oxides, any of which may be used either alone or in combinations of two or more.

Cationic surfactants include quaternary ammonium salt-based ones such as alkyltrimethylammonium salts and dialkyldimethylammonium salts, any of which may be used either alone or in combinations of two or more.

The surfactant may be a fat or oil derivative. The fat or oil may be an ester of a fatty acid and glycerin, and this normally refers to one in the form of a triglyceride (tri-O-acylglycerin). Fatty oils are categorized as drying oils, semidrying oils or non-drying oils, in order of their tendency to be oxidized and harden, and any ones utilized for a variety of purposes including consumption and industrial use may be used, such as one or more of the following, for example.

Examples of animal or vegetable oils, as fats or oils, include terpin oil, tall oil, rosin, refined oil, corn oil, soybean oil, sesame oil, rapeseed oil (canola oil), rice bran oil, rice bran oil, camellia oil, safflower oil (safflower oil), coconut oil (palm kernel oil), cottonseed oil, sunflower oil, perilla oil (perilla oil), linseed oil, olive oil, peanut oil, almond oil, avocado oil, hazelnut oil, walnut oil, grapeseed oil, mustard oil, lettuce oil, fish oil, whale oil, shark oil, liver oil, cacao butter, peanut butter, palm oil, lard (pig fat), tallow (beef tallow), chicken fat, rabbit fat, mutton tallow, horse fat, schmaltz, milk fat (butter, ghee and the like), hydrogenated oils (margarine, shortening and the like), castor oil (vegetable oil), and the like.

Particularly preferred among these animal or vegetable oils are terpin oils, tall oils and rosins, from the viewpoint of affinity with the surfaces of the cellulose nanofibers (B), and homogeneouscoatability.

Terpin oil is an essential oil obtained by steam distillation of chips from trees of the pine family, or pine rosin obtained from such trees, and it is also referred to as pine essential oil or turpentine. Examples of terpin oils include gum turpentine oil (obtained by steam distillation of pine rosin), wood turpentine oil (obtained by steam distillation or dry distillation of chips from trees of the pine family), sulfate turpentine oils (obtained by distillation during heat treatment of chips during sulfate pulp production) and sulfite turpentine oils (obtained by distillation during heat treatment of chips during sulfite pulp production), and these are essentially colorless to pale yellow liquids, with α-pinene and β-pinene as major components in addition to sulfite turpentine oil. Sulfite turpentine oil, unlike other turpentine oils, is composed mainly of p-cymene. So long as it has the aforementioned component, any derivative included in terpin oil, either alone or as a mixture of more than one, may be used as the surfactant of the invention.

Tall oil is an oil composed mainly of resin and fatty acids, obtained as a by-product in the manufacture of Kraft pulp using pine wood as the starting material. The tall oil used may be tall fat composed mainly of oleic acid and linoleic acid, or it may be tall rosin composed mainly of a C20 diteipenoid compound such as abietic acid.

A rosin is a natural resin composed mainly of a rosinic acid (abietic acid, palustric acid, isopimaric acid or the like), as the residue remaining after collecting balsams such as pine rosin as sap from plants of the pine family and distilling off the turpentine essential oil. It is also known as colophony or colophonium. Among these, tall rosin, wood rosin and gum rosin are preferred for use. Rosin derivatives that have been obtained by stabilizing treatment, esterification treatment or purifying treatment of these rosins may be used as surfactants. Stabilizing treatment is hydrogenation, disproportionation, dehydrogenation or polymerization of the rosins. Esterification treatment is reaction of the rosins or the stabilized rosins with alcohols to form rosin esters. Various known alcohols or epoxy compounds may be used for production of the rosin esters. Examples of alcohols include monohydric alcohols such as n-octyl alcohol, 2-ethylhexyl alcohol, decyl alcohol and lauryl alcohol; dihydric alcohols such as ethylene glycol, diethylene glycol, triethylene glycol, propylene glycol and neopentyl glycol; trihydric alcohols such as glycerin, trimethylolethane, trimethylolpropane and cyclohexanedimethanol; and tetrahydric alcohols such as pentaerythritol and diglycerin. There may also be used polyhydric alcohols such as isopentyldiol, ethylhexanediol, erythrulose, ozonized glycerin, caprylyl glycol, glycol, (C15-18)glycol, (C20-30)glycol, glycerin, diethylene glycol, diglycerin, dithiaoctanediol, DPG, thioglycerin, 1,10-decanediol, decylene glycol, triethylene glycol, trimethylhydroxymethylcyclohexanol, phytantriol, phenoxypropanediol, 1,2-butanediol, 2,3-butanediol, butylethylpropanediol, BG, PG, 1,2-hexanediol, hexylene glycol, pentylene glycol, methylpropanediol, menthanediol and lauryl glycol. Polyhydric alcohols also include those classified as sugar alcohols, such as inositol, erythritol, xylitol, sorbitol, maltitol, mannitol and lactitol.

Alcoholic water-soluble polymers may be used as alcohols as well. Alcoholic water-soluble polymers include polysaccharides and mucopolysaccharides, those classified as starches, those classified as polysaccharide derivatives, those classified as natural resins, those classified as cellulose and its derivatives, those classified as proteins and peptides, those classified as peptide derivatives, those classified as synthetic homopolymers, those classified as acrylic (methacrylic) acid copolymers, those classified as urethane-based polymers, those classified as laminates, those classified as cationization polymers and those classified as other synthetic polymers, while polymers that are water-soluble at ordinary temperature may also be used. More specifically, they include cationic polymers such as sodium polyacrylate, cellulose ether, calcium alginate, carboxyvinyl polymers, ethylene/acrylic acid copolymers, vinylpyrrolidone-based polymers, vinyl alcohol/vinylpyrrolidone copolymers, nitrogen-substituted acrylamide-based polymers, polyacrylamide and cationized guar gum, dimethylacrylammonium-based polymers, acrylic (methacrylic) acid-acrylic copolymers, POE/POP copolymers, polyvinyl alcohol, pullulan, agar, gelatin, tamarind seed polysaccharides, xanthan gum, carrageenan, high-methoxyl pectin, low-methoxyl pectin, guar gum, gum arabic, cellulose whiskers, arabinogalactan, karaya gum, tragacanth gum, alginic acid, albumin, casein, curdlan, gellan gum, dextran, cellulose (other than the cellulose fibers and cellulose whiskers of the present disclosure), polyethyleneimine, polyethylene glycol and cationized silicone polymers.

Among the different rosin esters mentioned above, esterified rosins and water-soluble polymers are preferred, and rosin and polyethylene glycol ester compounds (also known as rosin-ethylene oxide addition products, polyoxyethylene glycol resin acid esters or polyoxyethylene rosinic acid esters) are particularly preferred, as they tend to further promote coating onto the surfaces of the cellulose nanofibers (B) and the dispersibility of the cellulose formulation in the resin.

Examples of hydrogenated castor oil-type surfactants include compounds having hydrogenated hydrophobic groups, and having in the structure hydroxyl groups covalently bonded with hydrophilic groups such as PEO chains, which are obtained using castor oil as a type of vegetable oil obtained from seeds of castor beans of *Euphorbia helioscopia* as the starting material. The components of castor oil are glycerides of unsaturated fatty acids (87% ricinolic acid, 7% oleic acid and 3% linolic acid), and small amounts of saturated fatty acids (3% palmitic acid, stearic acid and the like). Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20.

Examples of mineral oil derivatives include greases such as calcium soap-based grease, calcium composite soap-based grease, sodium soap-based grease, aluminum soap-based grease and lithium soap-based grease.

The surfactant may be an alkylphenyl-type compound, examples of which include alkylphenol ethoxylates, i.e. compounds obtained by ethoxylation of alkylphenols with ethylene oxide. Alkylphenol ethoxylates are nonionic surfactants. They are also referred to as poly(oxyethylene) alkylphenyl ethers, because they have hydrophilic polyoxyethylene (POE) chains linked with hydrophobic alkylphenol groups by ether bonds. Mixtures of multiple compounds with different alkyl chain lengths and POE chain lengths exist as product series with different average chain lengths that are generally available on the market. Alkyl chain lengths of 6 to 12 carbon atoms (excluding phenyl groups) are commercially available, and the structures of the typical alkyl groups include nonylphenol ethoxylate and octylphenol ethoxylate. Typical POE group structures include those with 5 to 40, and typically 15 to 30 ethylene oxide (EO) residues. The number of EO residues of nonylphenol ethoxylate is preferably 15 to 30, more preferably 15 to 25 and most preferably 15 to 20.

The surfactant may be a β-naphthyl-type compound, examples of which include β-monosubstituted compounds including naphthalene in part of the chemical structure and having the carbon at the 2-, 3-, 6- or 7-position of the aromatic ring covalently bonded with a hydroxyl group, and compounds with covalent bonding of hydrophilic groups such as PEO chains. Typical POE group structures include those with 4 to 40, and typically 15 to 30 ethylene oxide (EO) residues. The number of EO residues is preferably 15 to 30, more preferably 15 to 25 and most preferably 15 to 20.

The surfactant may be a bisphenol A-type compound, examples of which include compounds having bisphenol A (chemical formula: $(CH_3)_2C(C_6H_4OH)_2$) in the chemical structure, with the two phenol groups in the structure covalently bonded with hydrophilic groups such as PEO chains. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

The surfactant may be a styrenated phenyl-type compound, examples of which include compounds having a styrenated phenyl group in the chemical structure, with the phenol group in the structure covalently bonded with hydrophilic groups such as PEO chains. A styrenated phenyl group has a structure with 1 to 3 styrene molecules added to the benzene ring of a phenol residue. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

Examples of specific preferred surfactants include anionic surfactants, among which are acylamino acid salts such as acylglutamic acid salts, higher alkylsulfates such as sodium laurate, sodium palmitate, sodium lauryl sulfate and potassium lauryl sulfate, higher alkyl ether sulfates such as polyoxyethylenetriethanolamine lauryl sulfate and polyoxyethylene sodium lauryl sulfate, and N-acyl sarcosine acid salts such as lauroyl sarcosine sodium; cationic surfactants, among which are alkyltrimethylammonium salts such as stearyltrimethylarmnonium chloride and lauryltrimethylammonium chloride, alkylpyridinium salts such as distearyldinethylammonium chloride dialkyldimethylammonium salts, (N,N'-dimethyl-3,5-methylenepiperidinium) chloride and cetylpyridinium chloride, alkyl quaternary ammonium salts, alkylamine salts such as polyoxyethylenealkylamines, polyamine fatty acid derivatives and amyl alcohol fatty acid derivatives; amphoteric surfactants, among which are imidazoline-based amphoteric surfactants such as 2-undecyl-N, N,N-(hydroxyethylcarboxymethyl)2-imidazoline sodium and 2-cocoyl-2-imidazoliniumhydroxide-1-carboxyethyloxy-2-sodium salt and betaine-based amphoteric surfactants such as 2-heptadecyl-N-carboxymethyl-N-hydroxyethyl imidazolinium betaine, betaine lauryldimethylaninoacetate, alkylbetaines, amidobetaines and sulfobetaines; and nonionic surfactants, among which are sorbitan fatty acid esters such as sorbitan monooleate, sorbitan monoisostearate, sorbitan monolaurate, sorbitan monopalmitate, sorbitan monostearate, sorbitan sesquioleate, sorbitan trioleate, pent-diglycerolsorbitan 2-ethylhexanoate and tetra-diglycerolsorbitan 2-ethylhexanoate, glycerin polyglycerin fatty acids such as glycerin monostearate, glycerin α,α'-pyroglutamine oleate and glycerin malate monostearate, propyleneglycol fatty acid esters such as propyleneglycol monostearate, hydrogenated castor oil derivatives, glycerin alkyl ethers, polyoxyethylene-sorbitan fatty acid esters such as polyoxyethylene-sorbitan monostearate, polyoxyethylene-sorbitan monooleate and polyoxyethylene-sorbitan tetraoleate, polyoxyethylene-glycerin fatty acid esters such as polyoxyethylene-sorbitol monolaurate, polyoxyethylene-sorbitol monooleate, polyoxyethylene-sorbitol pentaoleate, polyoxyethylene-sorbitol monostearate, polyoxyethylene-glycerin monoisostearate and polyoxyethylene-glycerin triisostearate, polyoxyethylene fatty acid esters such as polyoxyethylene monooleate, polyoxyethylene distearate, polyoxyethylene monodioleate and ethyleneglycol distearate, and polyoxyethylene castor oil hydrogenated castor oil derivatives such as polyoxyethylene fatty acid esters, polyoxyethylene hydrogenated castor oil, polyoxyethylene castor oil, polyoxyethylene hydrogenated castor oil monoisostearate, polyoxyethylene hydrogenated castor oil triisostearate, polyoxyethylene hydrogenated castor oil monopyroglutamic acid monoisostearic acid diester and polyoxyethylene hydrogenated castor oil malate.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater. When the resin is a polyolefin, the upper limit is not established since a greater number of carbon atoms will increase affinity with the resin, but it is preferably 30 and more preferably 25.

Among these hydrophobic groups there are preferred those having a cyclic structure, or having a bulky polyfunctional structure, those with a cyclic structure including alkylphenyl ether-type, rosin ester-type, bisphenol A-type, β-naphthyl-type and styrenated phenyl-type groups, and especially those with a polyfunctional structure including hydrogenated castor oil-type groups. Most preferred among these are rosin ester types and hydrogenated castor oil types.

Therefore, according to a particularly preferred aspect, the surfactant is one or more selected from the group consisting of rosin derivatives, alkylphenyl derivatives, bisphenol A derivatives, β-naphthyl derivatives, styrenated phenyl derivatives and hydrogenated castor oil derivatives.

According to one aspect, the surface treatment agent (C) is a low molecular thermoplastic resin. Specific examples of low molecular thermoplastic resins include polyamide-based resins, polyester-based resins, polyacetal-based resins, polycarbonate-based resins, polyacrylic-based resins, polyphenylene ether-based resins (including modified polyphenylene ethers modified by blending or graft polymerization of polyphenylene ether with other resins), polyallylate-based resins, polysulfone-based resins, polyphenylene sulfide-based resins, polyethersulfone-based resins, polyketone-based resins, polyphenylene ether ketone-based resins, polyimide-based resins, polyamideimide-based resins, polyetherimide-based resins, polyurethane-based resins (for example, thermoplastic polyurethanes), polyolefin-based resins (such as α-olefin copolymers), and various ionomers.

Specific examples that are preferred for the low molecular thermoplastic resin include high-density polyethylene, low-density polyethylene (such as linear low-density polyethylene), polypropylene, polymethylpentene, cyclic olefin-based resins, poly 1-butene, poly 1-pentene, polymethylpentene, ethylene/α-olefin copolymer, ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene terpolymer), modified IR (isoprene rubber), modified SEBS (styrene-ethylene-butylene-styrene copolymer), isobutylene-paramethylstyrene halide copolymer, ethylene-acrylic acid-modified polymer, ethylene-vinyl acetate copolymer and its acid-modified forms, copolymers of (ethylene and/or propylene) and (unsaturated carboxylic acids and/or unsaturated carboxylic acid esters), polyolefins obtained by forming metal salts with at least some of the carboxyl groups of copolymers of (ethylene and/or propylene) and (unsaturated carboxylic acids and/or unsaturated carboxylic acid esters), block copolymers of conjugated dienes and vinylaromatic hydrocarbons, hydrogenated forms of block copolymers of conjugated dienes and vinylaromatic hydrocarbons, copolymers of other conjugated diene compounds with nonconjugated olefins, natural rubber, various butadiene rubbers, various styrene-butadiene copolymer rubbers, isoprene rubber, butyl rubber, bromides of isobutylene and p-methylstyrene copolymers, butyl halide rubber, acrylonitrilobutadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluorine rubber, urethane rubber, polyvinyl chloride, polystyrene, acrylic polymers such as polyacrylic acid esters and polymethacrylic acid esters, acrylonitrile-based copolymers composed mainly of acrylonitrile, acrylonitrile-butane diene-styrene (ABS) resins, acrylonitrile-styrene (AS) resins, cellulosic resins such as cellulose acetate, and saponification products of vinyl chloride/ethylene copolymer, vinyl chloride/vinyl acetate copolymer, ethylene/vinyl acetate copolymer and ethylene/vinyl acetate copolymer. According to one aspect, the low molecular thermoplastic resin is a compound having the aforementioned hydrophilic segment and hydrophobic segment.

Preferable among these, from the viewpoint of heat resistance, moldability, design property and mechanical properties, are polyolefin-based resins, polyamide-based resins, polyester-based resins, polyacetal-based resins, polyethylene glycol-based resins, polypropylene glycol-based resins, and mixtures of two or more of them, among which polyolefin-based resins, polyamide-based resins, polyester-based resins, polyethylene glycol-based resins and polypropylene glycol-based resins are especially preferred from the viewpoint of handleability and cost.

Polyolefin-based resins that are preferred as low molecular thermoplastic resins are polymers obtained by polymerizing monomer units containing olefin s (such as α-olefins). Specific examples of polyolefin-based resins include, but are not limited to, ethylene-based (co)polymers such as low-density polyethylene (for example, linear low-density polyethylene), high-density polyethylene, ultralow-density polyethylene and ultrahigh molecular weight polyethylene, polypropylene-based (co)polymers such as polypropylene, ethylene-propylene copolymer and ethylene-propylene-diene copolymer, and copolymers of α-olefins such as ethylene with other monomer units, including ethylene-acrylic acid copolymer, ethylene-methyl methacrylate copolymer and ethylene-glycidyl methacrylate copolymer. The most preferred polyolefin-based resin is polypropylene.

An acid-modified polyolefin-based resin may also be suitably used to increase affinity with the cellulose nanofibers (B) with an average fiber diameter of 1000 nm or smaller. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating the resin to above the melting point in the presence of or in the absence of a peroxide, for melt kneading. The polyolefin-based resin to be acid modified may be any of the aforementioned polyolefin-based resins, but polypropylene is most suitable for use.

The acid-modified polypropylene may be used alone, but it is preferably used in admixture with a non-modified polypropylene in order to adjust the modification rate. The proportion of acid-modified polypropylene with respect to the total polypropylene is preferably 0.5 mass % to 50 mass %. A more preferred lower limit is 1 mass %, even more preferably 2 mass %, yet more preferably 3 mass %, even yet more preferably 4 mass % and most preferably 5 mass %. A more preferred upper limit is 45 mass %, even more preferably 40 mass %, yet more preferably 35 mass %, even yet more preferably 30 mass % and most preferably 20 mass %. The proportion is preferably above the lower limit in order to maintain satisfactory interfacial strength with the cellulose nanofibers (B), while it is preferably below the upper limit in order to maintain satisfactory ductility with gears.

Examples of preferred polyamide-based resins for the low molecular thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,I, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin that may be used as the low molecular thermoplastic resin, but the lower limit is preferably 20 µmol/g and more preferably 30 µmol/g. The upper limit for the terminal carboxyl group concentration is preferably 150 µmol/g, more preferably 100 µmol/g and even more preferably 80 µmol/g.

For a polyamide as the low molecular thermoplastic resin, the carboxyl terminal group ratio with respect to the total terminal groups ([COOH]/[total terminal groups]) is more preferably 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (B) in the composition, and it is preferably no greater than 0.95 from the viewpoint of the color tone of the obtained composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from among acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decyl amine, stearylamine, cyclohexylamine and aniline.

The concentration of the amino terminal groups and carboxyl terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by $^1$H-NMR.

Preferred polyester-based resins as thermoplastic resins include, but are not limited to, one or more selected from among polyethylene terephthalate (PET), polybutylene succinate (PBS), polybutylene succinate adipate (PBSA), polybutylene adipate terephthalate (PBAT), polyallylate (PAR), polyhydroxyalkanoic acid (PHA), polylactic acid (PLA), polybutylene terephthalate (PBT), polyethylene naphthalate (PEN) and polycarbonate (PC).

Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and preferably the carboxyl terminal group ratio with respect to the total terminal groups of the polyester-based resin ([COOH]/[total terminal groups]) is 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (B) in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. A more preferred upper limit is 3.5 mol %, even more preferably 3.0 mol %, yet more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

The method of adding the surface treatment agent (C) during preparation of the resin composition is not particularly restricted, and it may be a method of premixing and melt kneading the thermoplastic resin (A), cellulose nanofibers (B) and surface treatment agent (C), a method of first adding the surface treatment agent (C) to the thermoplastic resin (A) and pre-kneading if necessary and then adding the cellulose nanofibers (B) and melt kneading, a method of premixing the cellulose nanofibers (B) and surface treatment agent (C) and then melt kneading the mixture with the thermoplastic resin (A), or a method of adding the surface treatment agent (C) into a dispersion comprising the cellulose nanofibers (B) dispersed in water, drying the mixture to prepare dry cellulose, and then adding the dried product to the thermoplastic resin (A).

<Metal Ion Component (D)>

The resin composition may include a metal ion component (D) as an additional component. The metal ion component (D) may be a commercially available reagent or product. For the metal ion component (D) there may be mentioned copper compounds, metal (copper or non-copper) halides, alkali metal salts and alkaline earth metal salts.

The upper limit for the metal ion component (D) content in the resin composition of the embodiment is preferably 5 parts by mass, more preferably 2 parts by mass and even more preferably 0.5 part by mass with respect to 100 parts by mass of the thermoplastic resin (A). The lower limit for the metal ion component (D) content is preferably 0.005 part by mass, more preferably 0.01 part by mass and even more preferably 0.015 part by mass with respect to 100 parts by mass of the thermoplastic resin (A). If the amount of the metal ion component (D) is within this range, the abrasion resistance in a gear sliding test for this embodiment will improve. While the reason why such excellent abrasion resistance is exhibited is not fully understood, it is surmised that the metal ion component (D) is present at the interface between the surfaces of the cellulose nanofibers (B) and the surface treatment agent (C), or between the surfaces of the cellulose nanofibers (B) and the thermoplastic resin (A), thereby increasing the adhesiveness.

Copper compounds include, but are not limited to, the following examples: copper halides such as copper chloride, copper bromide and copper iodide; copper carboxylates such as copper acetate, copper propionate, copper benzoate, copper adipate, copper terephthalate, copper isophthalate, copper salicylate, copper nicotinate, copper stearate; and copper complex salts having copper coordinated with a chelating agent such as ethylenediamine or ethylenediaminetetraacetic acid. These copper compounds may be used alone or in combinations of two or more. The copper compound is preferably copper iodide (Cu), cuprous bromide (CuBr), cupric bromide ($CuBr_2$), cuprous chloride (CuCl) or copper acetate, with copper iodide and copper acetate being more preferred, from the viewpoint of more excellent heat aging resistance, and inhibiting metal corrosion of the screw or cylinder parts during molding and extrusion (hereunder also referred to simply as "metal corrosion").

The upper limit for the copper compound content is preferably 0.6 part by mass, more preferably 0.4 part by mass and even more preferably 0.3 part by mass with respect to 100 parts by mass of the thermoplastic resin (A). The lower limit for the copper compound content is preferably 0.005 part by mass, more preferably 0.01 part by mass and even more preferably 0.015 part by mass with respect to 100 parts by mass of the thermoplastic resin (A). Having the lower limit for the copper compound content in this range will further improve the heat aging resistance. Having the upper limit for the copper compound content in this range can help further inhibit copper deposition and metal corrosion.

The resin composition of the embodiment may also contain one or more metal halides selected from the group consisting of alkali metal halides and alkaline earth metal halides. A metal halide may be used alone, or two or more may be used in combination.

Metal halides include, but are not limited to, the following examples: potassium iodide, potassium bromide, potassium chloride, sodium iodide and sodium chloride. From the viewpoint of further improving heat aging resistance of the resin composition and further inhibiting metal corrosion, the metal halide is preferably potassium iodide or potassium bromide, and more preferably potassium iodide.

The upper limit for the metal halide content of the resin composition is preferably 0.6 part by mass, more preferably 0.4 part by mass and even more preferably 0.3 part by mass with respect to 100 parts by mass of the thermoplastic resin (A). The lower limit for the metal halide content of the resin composition is preferably 0.005 part by mass, more preferably 0.01 part by mass and even more preferably 0.015 part by mass with respect to 100 parts by mass of the thermoplastic resin (A). Having the lower limit for the metal halide content in this range will further improve the heat aging resistance. Having the upper limit for the metal halide content in this range can help further inhibit copper deposition and metal corrosion.

The metal halide is added so that the molar ratio D3/D4 between the halogen element content D3 from the metal halide and the copper element content D4 from the copper compound and metal halide in the resin composition is preferably 2/1 to 50/1, more preferably 2/1 to 40/1 and even more preferably 5/1 to 30/1. If the molar ratio D3/D4 is 2/1 or greater it will be possible to further inhibit copper deposition and metal corrosion, and if it is 50/1 or lower it will be possible to further inhibit metal corrosion without impairing the mechanical properties such as toughness and rigidity.

There are no particular restrictions on alkali metal salts and alkaline earth metal salts, and examples include hydroxides of sodium, potassium, magnesium, calcium or barium, and carbonic acid salts, phosphoric acid salts, silicic acid salts, boric acid salts and carboxylic acid salts of these metals. Calcium salts in particular are preferred from the viewpoint of improving the thermal stability of the resin composition.

Calcium salts include, but are not limited to, the following examples: calcium hydroxide, calcium carbonate, calcium phosphate, calcium silicate, calcium borate, and calcium salts of fatty acids (such as calcium stearate or calcium myristate). The fatty acid component of a fatty acid calcium salt may be optionally substituted with a hydroxyl group, for example. Fatty acid calcium salts (such as calcium stearate and calcium myristate) are more preferred among the above from the viewpoint of improving the thermal stability of gears.

The upper limit for the alkali metal salt and alkaline earth metal salt content of the resin composition is preferably 0.6 part by mass, more preferably 0.4 part by mass and even more preferably 0.3 part by mass with respect to 100 parts by mass of the thermoplastic resin (A). The lower limit for the alkali metal salt and alkaline earth metal salt content of the resin composition is preferably 0.005 part by mass, more preferably 0.01 part by mass and even more preferably 0.015 part by mass with respect to 100 parts by mass of the thermoplastic resin (A). A lower limit for the alkali metal salt and alkaline earth metal salt content in this range will further improve the heat aging resistance. An upper limit for the alkali metal salt and alkaline earth metal salt content in this range can further inhibit thermal decomposition of the molded resin.

The method of adding the metal ion component (D) in the resin composition may be, for example, a method of adding a copper compound (and if necessary also a metal halide, an alkali metal salt and/or an alkaline earth metal salt) during polymerization of the thermoplastic resin (A) (production method 1), or a method of adding a copper compound (and if necessary also a metal halide, an alkali metal salt and/or an alkaline earth metal salt) to the thermoplastic resin (A) using melt kneading (production method 2).

In the method for producing a resin composition according to this embodiment, the copper compound may be added in solid form, or it may be added in the form of an aqueous solution, for example. The period during polymerization of the thermoplastic resin (A) in production method 1 may be any stage from the starting monomer until polymerization to the polymer is complete. The apparatus used for melt kneading in production method 2 is not particularly restricted and may be a known apparatus, including a melt kneader such as a single-screw or twin-screw extruder, a Banbury mixer or a mixing roll. A twin-screw extruder is preferred used among these.

The temperature for the melt kneading is preferably a temperature of about 1 to 100° C. higher and more preferably about 10 to 50° C. higher than the melting point of the thermoplastic resin (A). The shear speed in the kneader is preferably about 100 sec-1 or higher, and the mean residence time during kneading is preferably about 0.5 to 5 minutes.

<(E) Sliding Component>

According to one aspect, the resin composition may include a sliding agent component (E). The sliding agent component (E) is a different substance from the thermoplastic resin (A) and surface treatment agent (C). According to a typical aspect, the surface treatment agent (C) is water-soluble in the sense defined by the present disclosure, while the sliding agent component (E) is not water-soluble.

The preferred lower limit for the sliding agent component (E) is 0.01 part by mass, preferably 0.5 part by mass and most preferably 1.0 part by mass with respect to 100 parts by mass of the thermoplastic resin (A). The preferred upper limit for the sliding agent component (E) is 5 parts by mass, preferably 4 parts by mass and most preferably 3 parts by mass with respect to 100 parts by mass of the thermoplastic resin (A). If the amount of sliding agent component (E) is within this range it will be possible to inhibit abrasion loss, and the rupture frequency in a repeated fatigue test will improve. When an ordinary filler (such as glass fibers) is used, it often occurs that the sliding agent component (E) becomes maldistributed on the filler surfaces forming a structure with multilayers of the sliding component molecules, such that the filler tends to fall off and the effect is reduced in a prolonged fatigue test. However, since the surface area of nanocellulose with an average fiber diameter (B) is 1000 nm or smaller is significantly larger than glass fibers, the sliding agent component (E) is less likely to be maldistributed on the cellulose surfaces, and sliding agent molecule layers are less likely to form. It is conjectured that this increases the rupture frequency in the fatigue test, and also helps maintain abrasion resistance.

When the amount of sliding agent component (E) is 5 parts by mass or lower with respect to 100 parts by mass of the thermoplastic resin (A), layer detachment and silver streaks in the molded resin are more satisfactorily inhibited. When the amount of sliding agent component (E) is 0.01 part by mass or greater with respect to the thermoplastic resin (A), a more notable effect of reduced abrasion loss can be obtained.

Examples for the sliding agent component (E) include compounds having structures represented by the following formulas (1), (2) and (3).

  (1)

  (2)

  (3)

In formulas (1) and (2), $R_{11}$, $R_{12}$ and $R_{13}$ each independently represent an alkylene group of 1 to 7000 carbon atoms, a substituted alkylene group in which at least one hydrogen atom in a substituted or unsubstituted alkylene group of 1 to 7000 carbon atoms has been replaced with an aryl group of 6 to 7000 carbon atoms, an arylene group of 6 to 7000 carbon atoms, or a substituted arylene group in which at least one hydrogen atom in an arylene group of 6 to 7000 carbon atoms has been replaced with a substituted or unsubstituted alkyl group of 1 to 7000 carbon atoms.

In formula (3), $R_{14}$ is an alkyl group of 1 to 7000 carbon atoms, a substituted alkyl group in which at least one hydrogen atom in a substituted or unsubstituted alkyl group of 1 to 7000 carbon atoms has been replaced with an aryl group of 6 to 7000 carbon atoms, an aryl group of 6 to 7000 carbon atoms, or a substituted aryl group in which at least one hydrogen atom in an aryl group of 6 to 7000 carbon atoms has been replaced with a substituted or unsubstituted alkyl group of 1 to 7000 carbon atoms.

These groups may be groups including double bonds, triple bonds or cyclic structures.

In formula (1), $A_1$ and $A_2$ each independently represent an ester bond, thioester bond, amide bond, thioamide bond, imide bond, ureido bond, imine bond, urea bond, ketoxime bond, azo bond, ether bond, thioether bond, urethane bond, thiourethane bond, sulfide bond, disulfide bond or trisulfide bond.

In formulas (2) and (3), $A_3$, $A_4$ and $A_5$ each independently represent a hydroxyl group, an acyl group (such as an acetyl group), or an aldehyde, carboxyl, amino, sulfo, amidine, azide, cyano, thiol, sulfenic acid, isocyanide, ketene, isocyanate, thioisocyanate, nitro or thiol group.

From the viewpoint of abrasion properties when sliding under small loads, the structures represented by formulas (1), (2) and (3) for the sliding agent component (E) are preferably in the following ranges.

Specifically, the number of carbon atoms for $R_{11}$, $R_{12}$, $R_{13}$ and $R_{14}$ is preferably 2 to 7000, more preferably 3 to 6800 and even more preferably 4 to 6500.

In formula (1), x represents an integer of 1 to 1000 and preferably an integer of 1 to 100. The letter y represents an integer of 1 to 1000 and preferably an integer of 1 to 200.

In formula (1) $A_1$ and $A_2$ preferably each independently represent an ester bond, thioester bond, amide bond, imide bond, ureido bond, imine bond, urea bond, ketoxime bond or ether bond and urethane bond, and more preferably $A_1$ and $A_2$ each independently represent an ester bond, amide bond, imide bond, ureido bond, imine bond, urea bond, ketoxime bond, ether bond or urethane bond.

In formulas (2) and (3), $A_3$, $A_4$ and $A_5$ preferably each independently represent a hydroxyl group, acyl group (such as an acetyl group), or an aldehyde, carboxyl, amino, azide, cyano, thiol, isocyanide, ketene, isocyanate or thioisocyanate group, and more preferably $A_3$, $A_4$ and $A_5$ each independently represent a hydroxyl group or acyl group (such as an acetyl group), or an aldehyde, carboxyl, amino, cyano, isocyanide, ketene or isocyanate group.

Specific examples for the sliding agent component (E) include, but are not particularly limited to, one or more compounds selected from the group consisting of alcohols, amines, carboxylic acids, hydroxy acids, amides, esters, polyoxyalkylene glycols, silicone oils and waxes.

Alcohols are preferably saturated or unsaturated monohydric or polyhydric alcohols of 6 to 7000 carbon atoms. Specific examples include, but are not particularly limited to, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, linoleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, Unilin alcohol, ethylene glycol, diethylene glycol, triethylene glycol, propylene glycol, dipropylene glycol, butanediol, pentanediol, hexanediol, glycerin, diglycerin, triglycerin, threitol, erythritol, pentaerythritol, arabitol, ribitol, xylitol, sorbite, sorbitan, sorbitol and mannitol.

Alcohols of 11 or more carbon atoms are preferred among these from the viewpoint of sliding efficiency. More preferred are alcohols of 12 or more carbon atoms, with alcohols of 13 or more carbon atoms being even more preferred. Saturated alcohols are especially preferred among these.

Preferred for use among those mentioned above are stearyl alcohol, oleyl alcohol, linoleyl alcohol, behenyl alcohol, ethylene glycol, propylene glycol, diethylene glycol and triethylene glycol, with behenyl alcohol, diethylene glycol and triethylene glycol being especially preferred for use.

Amines include, but are not limited to, the following examples: primary amines, secondary amines and tertiary amines.

Examples of primary amines include, but are not particularly limited to, methylamine, ethylamine, propaneamine, butaneamine, pentaneamine, hexaneamine, heptaneamine, octaneamine, cyclohexylamine, ethylenediamine, aniline, mensendiamine, isophorone diamine, xylenediamine, meta-phenylenediamine and diaminodiphenylamine.

Examples of secondary amines include, but are not particularly limited to, dimethylamine, diethylamine, N·methylethylamine, diphenylamine, tetramethylethylenediamine, piperidine and N,N-dimethylpiperazine.

Examples of tertiary amines include, but are not particularly limited to, trimethylamine, triethylamine, hexamethylenediamine, N,N-diisopropylethylamine, pyridine, N,N-dimethyl-4-aminopyridine, triethylenediamine and benzyldimethylamine.

Examples of special amines include, but are not particularly limited to, diethylenetriamine, triethylenetetramine, tetraethylenepentamine, diethylaminopropylamine and N-aminoethylpiperazine. Preferred for use among these are hexaneamine, heptaneamine, octaneamine, tetramethylethylenediamine, N,N-dimethylpiperazine and hexamethylenediamine, among which heptaneamine, octaneamine, tetramethylethylenediamine and hexamethylenediamine are especially preferred for use.

Carboxylic acids are preferably saturated or unsaturated monobasic or polybasic aliphatic carboxylic acids of 6 to 7000 carbon atoms. Specific examples include, but are not particularly limited to, caproic acid, enanthic acid, caprylic acid, undecylic acid, pelargonic acid, lauric acid, tridecylic acid, myristic acid, pentadecylic acid, palmitic acid, margaric acid, stearic acid, nanodecanoic acid, arachic acid, behenic acid, lignoceric acid, cerotic acid, heptaconic acid, montanic acid, adipic acid, pimnelic acid, suberic acid, azelaic acid, sebacic acid, melissic acid, lacceric acid, undecylenic acid, elaidic acid, cetoleic acid, brassidic acid, sorbic acid, palmitoleic acid, oleic acid, vaccenic acid, linoleic acid, linolenic acid, eleostearic acid, arachidonic acid, nervonic acid, erucic acid, propiolic acid and stearolic acid.

Fatty acids of 10 or more carbon atoms are preferred among these from the viewpoint of sliding efficiency. More preferred are fatty acids of 11 or more carbon atoms, with fatty acids of 12 or more carbon atoms being even more preferred. Saturated fatty acids are especially preferred among these. Palmitic acid, stearic acid, behenic acid, montanic acid, adipic acid and sebacic acid are more preferred among these saturated fatty acids because they are also readily available in the industry.

Naturally occurring fatty acids and their mixtures that contain these components may also be used. Such fatty acids may also be substituted with hydroxy groups, or they may be synthetic fatty acids obtained by carboxyl modification of the ends of Unilin alcohols (synthetic aliphatic alcohols).

Hydroxy acids are not particularly restricted and examples include aliphatic hydroxy acids and aromatic hydroxy acids. Examples of aliphatic hydroxy acids include, but are not particularly limited to, glycolic acid, hydroxypropionic acid, hydroxybutanoic acid, hydroxypentanoic acid, hydroxyhexanoic acid, hydroxyheptanoic acid, hydroxynonanoic acid, hydroxydecanoic acid, hydroxyundecanoic acid, hydroxydodecanoic acid, hydroxytridecanoic acid, hydroxytetradecanoic acid, hydroxypentadecanoic acid, hydroxyhexadecanoic acid, hydroxyheptadecanoic acid, hydroxyoctadecanoic acid, hydroxynonadecanoic acid, hydroxyeicosanoic acid, hydroxydocosanoic acid, hydroxytetradocosanoic acid, hydroxyhexadocosanoic acid, hydroxyoctadocosanoic acid, lactic acid, tartronic acid, glyceric acid, hydroxybutyric acid, 2-hydroxybutyric acid, 3-hydroxybutyric acid, γ-hydroxybutyric acid, malic acid, tartaric acid, citramalic acid, citric acid, isocitric acid, leucinic acid, mevalonic acid, pantoic acid, ricinolic acid, ricinelaidic acid, cerebronic acid, quinic acid and shikimnic acid, as well as their isomers.

Examples of aromatic hydroxy acids include, but are not particularly limited to, monohydroxybenzoic acid derivatives such as salicylic acid, creosotic acid (homosalicylic acid, hydroxy(methyl)benzoic acid), vanillic acid and syringic acid, dihydroxybenzoic acid derivatives such as pyrocatechuic acid, resorcylic acid, protocatechuic acid, gentisic acid and orsellinic acid, trihydroxybenzoic acid derivatives such as gallic acid, phenylacetic acid derivatives such as mandelic acid, benzilic acid, atrolactic acid and cinnamic acid, or hydrocinnamic acid derivatives such as melilotic acid, phloretic acid, coumaric acid, umbellic acid, caffeic acid, ferulic acid and sinapic acid, as well as their isomers. Among these, aliphatic hydroxy acids are more preferred, and among aliphatic hydroxy acids, aliphatic hydroxy acids of 5 to 30 carbon atoms are more preferred, and aliphatic hydroxy acids of 8 to 28 carbon atoms are especially preferred.

Amides are preferably saturated or unsaturated monovalent or polyvalent aliphatic amides of 6 to 7000 carbon atoms. Specific examples include, but are not particularly limited to, primary amides which are saturated or unsaturated amides such as heptaneanide, octaneamide, nonaneamide, decaneamide, undecaneamide, laurylamide, tridecylamide, myristylamide, pentadecylamide, cetylamide, heptadecylamide, stearylamide, oleylamide, nonadecylainide, eicosylamide, cerylamide, behenylamide, melissylamide, hexyldecylamide, octyldodecylamide, lauric acid amide, palmitic acid amide, stearic acid amide, behenic acid amide, hydroxystearic acid amide, oleic acid amide or erucic acid anide.

Examples of secondary amides include, but are not limited to, the following: saturated or unsaturated amides such as N-oleylpalmitic acid amide, N-stearylstearic acid amide, N-stearyloleic acid amide, N-oleylstearic acid amide, N-stearylerucic acid amide, methylene bisstearic acid amide, ethylene biscapric acid amide, ethylene bislauric acid amide, ethylene bisstearic acid aumde, ethylene bishydroxystearic acid amide, ethylene bisbehenic acid amide, ethylene bisoleic acid amide, ethylene biserucic acid amide, hexamethylene bisstearic acid amide, hexamethylene bisbehenic acid amide, hexamethylene bisoleic acid amide and hexamethylenehydroxystearic acid amide.

Examples of tertiary amides include, but are not limited to, the following: saturated or unsaturated amides such as N,N-distearyladipic acid amide, N,N-distearylsebacic acid amide, N,N-dioleyladipic acid amide, N,N-dioleylsebacic acid amide and N,N-distearylisophthalic acid amide.

Preferred for use among these are palmitic acid amide, stearic acid amide, behenic acid amide, hydroxystearic acid amide, oleic acid amide, erucic acid amide and N-stearylstearic acid amide.

Preferred for use among these are methylene bisstearic acid amide, ethylenebislauric acid amide, ethylene bisstearic acid amide and ethylene bisbehenic acid amide. Amides of 10 or more carbon atoms are preferred among these from the viewpoint of sliding efficiency. More preferred are amides of 11 or more carbon atoms, with amides of 13 or more carbon atoms being even more preferred. Particularly preferred among these are saturated aliphatic amides.

Preferred esters are reaction products obtained by reacting the aforementioned alcohols and carboxylic acids or hydroxy acids to form ester bonds.

Specific examples include, but are not particularly limited to, butyl stearate, 2-ethylhexyl palmitate, 2-ethylhexyl stearate, behenic acid monoglyceride, cetyl 2-ethylhexanoate, isopropyl myristate, isopropyl palmitate, cholesteryl isostearate, methyl laurate, methyl oleate, methyl stearate, cetyl myristate, myristyl myristate, octyldodecylpentaerythritol monooleate myristate, pentaerythritol monostearate, pentaerythritoltetrapalmitate, stearyl stearate, isotridecyl stearate, 2-ethylhexanoic acid triglyceride, diisodecyl adipate, ethyleneglycol monolaurate, ethyleneglycol dilaurate, ethyleneglycol monostearate, ethyleneglycol distearate, triethyleneglycol monostearate, triethyleneglycol distearate, ethyleneglycol monooleate, ethyleneglycol dioleate, polyethyleneglycol monolaurate, polyethyleneglycol monostearate, polyethyleneglycol distearate, polyethyleneglycol monooleate, glycerin monostearate, glycerin distearate, glycerin monolaurate, glycerin dilaurate, glycerin monooleate and glycerin dioleate.

Preferred for use among these are cetyl myristate, diisodecyl adipate, ethyleneglycol monostearate, ethyleneglycol distearate, triethyleneglycol monostearate, triethyleneglycol distearate, polyethyleneglycol monostearate and polyethyleneglycol distearate, with cetyl myristate, diisodecyl adipate and ethyleneglycol distearate being especially preferred for use.

Polyoxyalkylene glycols include, but are not limited to, the following 3 types, for example.

The first type of polyoxyalkylene glycols are polycondensates with alkylene glycols as monomers. Examples of such polycondensates include, but are not limited to, polyethylene glycol, polypropylene glycol, and blocked copolymers and random copolymers of ethylene glycol and propylene glycol. The preferred range of the degree of polymerization of such polycondensates is 5 to 2500, with 10 to 2300 being a more preferred range.

The second type of polyoxyalkylene glycols are ether compounds of aliphatic alcohols and polycondensates mentioned for the first type of polyoxyalkylene glycols. Examples of such ether compounds include, but are not limited to, polyethyleneglycol oleyl ethers (ethylene oxide polymerization degree: 5 to 500), polyethyleneglycol cetyl ethers (ethylene oxide polymerization degree: 5 to 500), polyethyleneglycol stearyl ethers (ethylene oxide polymerization degree: 5 to 300), polyethyleneglycol lauryl ethers (ethylene oxide polymerization degree: 5 to 300), polyethyleneglycol tridecyl ethers (ethylene oxide polymerization degree: 5 to 300), polyethyleneglycol nonylphenyl ethers (ethylene oxide polymerization degree: 2 to 1000) and polyethylene glycol oxyphenyl ethers (ethylene oxide polymerization degree: 4 to 500).

The third type of polyoxyalkylene glycols are ester compounds of higher fatty acids and the polycondensates mentioned for the first type of polyoxyalkylene glycols. Examples of such ester compounds include, but are not limited to, polyethyleneglycol monolaurate (ethylene oxide polymerization degree: 2 to 300), polyethyleneglycol monostearate (ethylene oxide polymerization degree: 2 to 500) and polyethyleneglycol monooleate (ethylene oxide polymerization degree: 2 to 500).

Waxes are not particularly restricted, and examples include slack wax, beeswax, whale wax, shellac wax, wool wax, carbana wax, wood wax, rice wax, candelilla wax, Japan wax, paraffin wax, microcrystalline wax, montan wax, Fischer-Tropsch wax, polyethylene wax, polypropylene wax and their high-density polymerized forms, low-density polymerized forms, oxidized forms, acid modified forms and special monomer-modified forms.

Preferred for use among these are carnauba wax, rice wax, candelilla wax, paraffin wax, montan wax, polyethylene wax and their high-density polymerized forms, low-density polymerized forms, oxidized forms, acid modified forms and special monomer-modified forms, among which carnauba wax, rice wax, candelilla wax, paraffin wax, polyethylene wax and their high-density polymerized forms, low-density polymerized forms, oxidized forms, acid modified forms and special monomer-modified forms are especially preferred for use.

Preferred among these as the sliding agent component (E) are one or more compounds selected from the group consisting of alcohols, amines, carboxylic acids, esters, amide compounds of monovalent or divalent amines and carboxylic acids, and waxes.

A paraffin wax, a polyethylene wax or a high density polymerized form, low-density polymerized form, oxidized form, acid modified form or special monomer-modified form thereof for the sliding agent component (E) to be used in the polyamide resin composition of this embodiment is not particularly restricted, but it can be obtained by a method of introducing acidic groups by oxidation reaction of the polyolefin wax, oxidatively decomposing a polyolefin, reacting an inorganic acid, organic acid or unsaturated carboxylic acid with a polyolefin wax to introduce polar groups such as carboxyl groups or sulfonic acid groups, or introducing a monomer with an acidic group during polymerization of a polyolefin wax.

These are commercially and readily available under names such as oxidized-modified or acid-modified polyolefin waxes.

Examples of polyolefin waxes include, but are not limited to, paraffin waxes, microcrystalline waxes, montan waxes, Fischer-Tropsch waxes, polyethylene waxes, polypropylene waxes, and their high-density polymerized forms, low-density polymerized forms and special monomer-modified forms.

Examples of polyolefins include polyethylene, polypropylene, ethylene-propylene copolymer, ethylene-butene copolymer, ethylene-octene copolymer, polypropylene-butene copolymer, polybutene, hydrogenated polybutadiene, ethylene-acrylic acid ester copolymer, ethylene-methacrylic acid ester copolymer, ethylene-acrylic acid copolymer and ethylene-vinyl acetate copolymer.

From the viewpoint of an effect of unproved slidability, the sliding agent component (E) is preferably a paraffin wax, polyethylene wax, acid-modified polypropylene wax, polyethylene (high-pressure method low-density polyethylene, linear low-density polyethylene or ultra-low-density polyethylene), polypropylene, ethylene-propylene copolymer or acid-modified ethylene-butene copolymer.

The sliding agent component (E) is preferably a modified wax comprising an acid-modified polyethylene and/or acid-modified polypropylene.

The sliding agent component (E) may be a single one used alone, or a combination of two or more.

For this embodiment, the sliding agent component (E) can be separated from the gear (molded article) for determination of its molecular structure, molecular weight, melting point, acid value and viscosity.

The sliding agent component (E) in the molded article may be isolated by a procedure such as filtration after dissolution of the molded article, followed by purification by a procedure such as recrystallization or reprecipitation of the sliding agent component (E). The sliding agent component (E) can be subjected to measurement by $^1$H-NMR, $^{13}$C-NMR, two-dimensional NMR or MALDI-TOF MS, to determine the molecular structure, such as its repeating structure or branched structure, or positional information relating to its functional groups.

When the sliding agent component (E) is an acid-modified polyethylene and/or acid-modified polypropylene, the acid value is preferably in the range of 0 to 85 mg-KOH/g. The preferred lower limit for the acid value is not particularly restricted but is preferably 0 mg-KOH/g or greater. The preferred upper limit for the acid value is 83 mg-KOH/g, more preferably 80 mg-KOH/g and even more preferably 75 mg-KOH/g. An acid value within this range will tend to inhibit discoloration during drying and result in satisfactory abrasion resistance during high-temperature abrasion under small loads. The acid value of the sliding agent component (E) can be measured by the method according to JIS K0070.

The acid value of the sliding agent component (E) can be controlled by the method described in Example 1 or 2 of Japanese Unexamined Patent Publication No. 2004-75749, for example, or by a method of adjusting or controlling the amount of acidic groups introduced and/or the amount of polar groups introduced, by thermal decomposition of commercially available high-density polyethylene under an oxygen atmosphere. When the sliding agent component (E) is acid-modified polyethylene and/or acid-modified polypropylene, a commercial product may be used.

When the sliding agent component (E) is an acid-modified polyethylene and/or acid-modified polypropylene, the melt viscosity at 140° C. is preferably in the range of 1 to 3000 mPa·s. The lower limit is not particularly restricted, but from the viewpoint of workability during melt kneading of the polyamide resin composition of this embodiment, it is preferably 1 mPa·s, more preferably 20 mPa·s, even more preferably 25 mPa·s, yet more preferably 30 mPa·s and most preferably 50 mPa·s. The preferred upper limit for the melt viscosity at 140° C. is 2850 mPa·s, more preferably 2800 mPa·s, even more preferably 2700 mPa·s, yet more preferably 2650 mPa·s and most preferably 2000 mPa·s.

When the sliding agent component (E) is acid-modified polyethylene and/or acid-modified polypropylene, the melt viscosity at 180° C. is preferably in the range of 100 to 2900 mPa·s. When the sliding agent component (E) is acid-modified polyethylene and/or acid-modified polypropylene, the lower limit for the melt viscosity at 180° C. is preferably 110 mPa·s, more preferably 140 mPa·s, even more preferably 160 mPa·s and most preferably 300 mPa·s. When the sliding agent component (E) is acid-modified polyethylene and/or acid-modified polypropylene, the preferred upper limit for the melt viscosity at 180° C. is 2850 mPa·s, more preferably 2800 mPa·s, even more preferably 2700 mPa·s, yet more preferably 2650 mPa·s, even yet more preferably 2000 mPa·s and most preferably 1600 mPa·s.

Limiting the melt viscosity to within this range when the sliding agent component (E) is acid-modified polyethylene and/or acid-modified polypropylene will tend to result in complete melting of the resin pellets during melt kneading of the resin composition as a constituent material of the gear of this embodiment, and more thorough kneading.

When the sliding agent component (E) is acid-modified polyethylene and/or acid-modified polypropylene, the melt viscosity at 140° C. and 180° C. can be measured using a Brookfield viscometer.

According to one aspect, the sliding agent component (E) is a lubricant oil. Lubricant oils include, but are not limited to, any substances that can improve the abrasion/wear properties of the molded resin, examples being natural oils such as engine oils and cylinder oils, synthetic hydrocarbons including paraffinic oils (such as Diana Process Oil PS32 by Idemitsu Kosan Co., Ltd.), naphthene-based oils (such as Diana Process Oil NS90S by Idemitsu Kosan Co., Ltd.) and aroma oils (such as Diana Process Oil AC12 by Idemitsu Kosan Co., Ltd.), and silicone-based oils (such as G30 Series by Shin-Etsu Chemical Co., Ltd.) (polydimethylsiloxane and other silicone oils, or silicone rubber or modified silicone rubber), appropriately selected among common commercially available lubricant oils, and used either directly or in appropriate combinations as desired. Paraffinic oils and silicone-based oils are preferred because they are superior from the viewpoint of slidability, and are also readily available in the industry. These lubricant oils may be used alone or in combinations.

The lower limit for the molecular weight of the lubricant oil is preferably 100, more preferably 400 and even more preferably 500. The upper limit is preferably 5,000,000, more preferably 2,000,000 and even more preferably 1,000,000. The lower limit for the melting point of the lubricant oil is preferably −50° C., more preferably −30° C. and even more preferably −20° C. The upper limit for the melting point of the lubricant oil is preferably 50° C., more preferably 30° C. and even more preferably 20° C. A molecular weight of 100 or greater will tend to result in satisfactory slidability of the lubricant oil. If the molecular weight is 5,000,000 or lower, and especially 1,000,000 or lower, dispersion of the lubricant oil will tend to be satisfactory and the abrasion resistance will tend to be improved. If the melting point is −50° C. or higher, the fluidity of the lubricant oil on the molded article surface will be maintained and abrasive wear will be reduced, thus tending to improve the abrasion resistance of the molded resin. By limiting the melting point to 50° C. or lower, the kneading with the thermoplastic resin is facilitated and the dispersibility of the lubricant oil tends to be improved. It is from this viewpoint that the molecular weight and melting point of the lubricant oil are preferably within the ranges specified above. According to a preferred aspect, the melting point is a temperature 2.5° C. lower than the pour point of the lubricant oil. The pour point can be measured according to JIS K2269.

The lower limit for the lubricant oil content is not particularly restricted, but it is preferably 0.1 part by mass, more preferably 0.2 part by mass and even more preferably 0.3 part by mass, with respect to 100 parts by mass of the thermoplastic resin (A). The upper limit for the content is not particularly restricted, but it is preferably 5.0 parts by mass, more preferably 4.5 parts by mass and even more preferably 4.2 parts by mass. If the lubricant oil content is within this range, the abrasion resistance of the resin composition will tend to be improved. Particularly when the lubricant oil content is 0.1 part by mass or greater, sufficient slidability can be ensured and the abrasion resistance tends to be improved. If the lubricant oil content is 5.0 pars by mass or lower, softening of the resin can be reduced, and the resin composition tends to be assured of strength allowing it to withstand use in a high-torque gear, for example.

The lubricant oil content in the resin composition of this embodiment is preferably within the range specified above from the viewpoint of improving the wear properties during sliding, and exhibiting excellent stable slidability.

The weight-average molecular weight of the sliding agent component (E) is important because the dispersed state of the sliding agent component near the surface layer has a major effect on the sliding property in a gear. According to one aspect, the preferred lower limit for the weight-average molecular weight of the sliding agent component (E) is 500, preferably 600 and most preferably 700. There is no particularly preferred upper limit for the weight-average molecular weight of the sliding agent component (E), but it will generally be 100,000 for ease of handling. For a gear of this embodiment, limiting the weight-average molecular weight of the sliding agent component (E) to this range can help maintain abrasion resistance for a sliding frequency of more than 10,000 times.

While there is no particular lower limit for the molecular weight distribution of the sliding agent component (E), it will generally be near 1.0 from the viewpoint of stability of the frictional coefficient during sliding. The upper limit for the molecular weight distribution of the sliding agent component (E) is preferably 9.0, more preferably 8.5, even more preferably 8.0 and yet more preferably 7.5.

The weight-average molecular weight of the sliding agent component (E) is measured by liquid chromatography/mass spectrometry for weight-average molecular weights of 1000 and lower, while for weight-average molecular weights of greater than 1000 it is represented as the weight-average molecular weight in terms of standard polystyrene, measured by gel permeation chromatography.

The sliding agent component (E) preferably has a melting point of 40 to 150° C. A melting point of the sliding agent component (E) of 40° C. or higher will tend to allow the abrasion resistance of the molded resin to be improved at higher temperatures, while a melting point of the sliding agent component (E) of 150° C. or lower will facilitate more satisfactory dispersion of the sliding agent component (E) into the resin during processing. A more preferred lower limit for the melting point of the sliding agent component (E) is 45° C., a more preferred lower limit is 50° C., and the most preferred lower limit is 80° C. The upper limit for the melting point of the sliding agent component (E) is more preferably below 150° C., even more preferably 140° C., yet more preferably 135° C. and most preferably 130° C. The melting point of the sliding agent component (E) can be measured by the method according to JIS K 7121 (DSC method).

<Other Components>

Other components that may be used for the invention will now be described in detail. The resin composition of this embodiment may also contain various stabilizers used in thermoplastic resins of the prior art, in addition to the components mentioned above, in ranges that do not interfere with the object of the embodiment. Examples of stabilizers include, but are not limited to, the inorganic fillers, heat stabilizers and lubricant oils mentioned below. These may be used alone, or two or more may be used in combination. They may be commercially available reagents or products.

The inorganic filler may be, but is not particularly limited to, one or more compounds selected from the group consisting of filamentous particles, tabular particles and inorganic pigments. According to one aspect, the filamentous particles and tabular particles may be particles with a mean aspect ratio of 5 or greater.

Filamentous particles are not particularly restricted, and examples include glass fibers, carbon fibers, potassium titanate fibers, asbestos fibers, silicon carbide fibers, silicon nitride fibers, calcium metasilicate fibers and aramid fibers.

Tabular particles are also not particularly restricted, and examples include talc, mica, kaolin, glass flakes and bentonite. Talc, mica and glass fibers are preferred. Using these will tend to result in excellent mechanical strength and economy.

Examples of inorganic pigments include, but are not particularly limited to, zinc sulfide, titanium oxide, zinc oxide, iron oxide, barium sulfate, titanium dioxide, barium sulfate, hydrous chromium oxide, chromium oxide, cobalt aluminate, baryta powder, type I zinc yellow, type II zinc yellow, potassium iron ferrocyanide, kaolin, titanium yellow, cobalt blue, ultramarine blue, cadmium, nickel titanium, lithopone, strontium, amber, sienna, azurite, malachite, azuromalachite, orpiment, realgar, cinnabar, turquoise, rhodochrosite, yellow ochre, terre verte, low sienna, low amber, Cassel earth, chalk, gypsum, burnt sienna, burnt amber, lapis lazuli, azurite, malachite, coral powder, white mica, cobalt blue, cerulean blue, cobalt violet, cobalt green, zinc white, titanium white, light red, chromium oxide green, mars black, viridian, yellow ochre, alumina white, cadmium yellow, cadmium red, vernilion, talc, white carbon, clay, mineral violet, rose cobalt violet, silver white, gold dust, bronze powder, aluminum powder, Prussian blue, aureolin, mica titanium, carbon black, acetylene black, lamp black, furnace black, vegetable black, bone coal, calcium carbonate and Prussian blue.

Preferred among these are zinc sulfide, zinc oxide, iron oxide, titanium dioxide, titanium yellow, cobalt blue and carbonic acid salts, from the viewpoint of imparting higher abrasion resistance, while zinc oxide and titanium yellow are more preferred from the viewpoint of imparting sufficiently low Moh's hardness and even higher abrasion resistance.

The amount of inorganic filler added is not particularly restricted, but it is preferably in the range of 0.002 to 70 parts by mass or 0.002 to 50 parts by mass of the inorganic filler with respect to 100 parts by mass of the thermoplastic resin. Limiting the amount of inorganic filler added to within this range can increase the handleability of the resin composition.

The heat stabilizer is preferably an antioxidant (such as a hindered phenol-based antioxidant) from the viewpoint of increased thermal stability of the resin composition.

Examples of hindered phenol-based antioxidants include, but are not limited to, the following: n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate) and triethylene glycol-bis-(3-(3-t-butyl-5-methyl-4-hydroxyphenyl)-propionate).

Examples of hindered phenol-based antioxidants also include, but are not limited to, tetrakis-(methylene-3-(3',5'-di-t-butyl-4'-hydroxyphenyl)propionatemethane, 3,9-bis(2-(3-(3-t-butyl-4-hydroxy-5-methylphenyl)propionyloxy)-1,1-dimethylethyl)-2,4,8,10-tetraoxaspiro(5,5)undecane, N,N'-bis-3-(3',5'-di-t-butyl-4-hydroxyphenol)propionyl hexamethylenediainie, N,N'-tetramethylenebis-3-(3'-methyl-5'-t-butyl-4-hydroxyphenol)propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4-triazole, N,N'-bis(2-(3-(3,5-di-butyl-4-hydroxyphenyl)propionyloxy)ethyl)oxyamide.

Preferred among these hindered phenol-based antioxidants are triethylene glycol-bis-(3-(3-t-butyl-5-methyl-4-hydroxyphenyl)-propionate) and tetrakis-(methylene-3-(3',5'-di-t-butyl-4'-hydroxyphenyl)propionate)methane, from the viewpoint of increased thermal stability of the molded resin.

The amount of antioxidant added is not particularly restricted, but it is preferably in the range of 0.1 to 2 parts by mass of the antioxidant, such as a hindered phenol-based antioxidant, with respect to 100 parts by mass of the thermoplastic resin (A). Limiting the amount of stabilizer added to within this range can increase the handleability of the resin composition.

The apparatus used to produce the resin composition of the embodiment is not restricted, and any commonly employed kneader may be used. Examples of such kneaders to be used include, but are not limited to, single-screw and multiscrew kneading extruders, rolls and Banbury mixers. A twin-screw extruder equipped with a reduced pressure device and a side feeder is preferred.

The flexural modulus of the resin composition, measured according to ISO179, is preferably 3000 MPa or higher, more preferably 4000 MPa or higher and even more preferably 5000 MPa or higher, from the viewpoint of obtaining satisfactory durability for a gear. The flexural modulus may also be 20,000 MPa or lower, 15,000 MPa or lower or 12,000 MPa or lower, from the viewpoint of facilitating production of the resin composition.

In a resin composition according to one aspect, for the frictional coefficient measured at a linear speed of 50 mm/sec, a reciprocal distance of 50 mm, a temperature of 23° C., a humidity of 50% and a load of 19.8 N using a multipurpose test piece fabricated according to ISO 294-3, a reciprocating friction wear tester and a SUS304 test sphere with a diameter of 5 mm as a partner material, the frictional coefficient ratio (II) is preferably 0.8 or lower, as the ratio of the value (II) for the resin composition with respect to the value (I) of a composition with the same composition as the resin composition except for containing no cellulose nanofibers (B). The resin composition of the embodiment has excellent surface smoothness when molded as a molded resin, due to the cellulose nanofibers (B). The frictional coefficient ratio fluctuates depending on the specific composition of the resin composition (for example, a larger content ratio of cellulose nanofibers (B) tends to lower the frictional coefficient ratio). The frictional coefficient ratio is preferably 0.8 or lower, or 0.7 or lower, or 0.5 or lower, from the viewpoint of obtaining excellent surface smoothness. According to one aspect, the frictional coefficient ratio is 0.05 or higher, 0.1 or higher or 0.2 or higher, for example.

The resin composition may be provided in a variety of different forms. Specifically, it may be in the form of resin pellets, sheets, fiber, plates or rods, with the form of resin pellets being more preferred for easier post-working and easier transport. The preferred form of pellets may be round, elliptical or cylindrical, depending on the system used for cutting during extrusion. Pellets cut by the method known as "underwater cutting" are usually round, pellets cut by the method known as "hot cutting" are usually round or elliptical, and pellets cut by the method known as "strand cutting" are usually cylindrical. The preferred size for round pellets is 1 mm to 3 mm, as the diameter of the pellets. The preferred diameter for cylindrical pellets is 1 mm to 3 mm, and the preferred length is 2 mm to 10 mm. The diameter and length are preferably above the specified lower limits from the viewpoint of operational stability during extrusion, and they are preferably lower than the specified upper limits from the viewpoint of seizing in the molding machine in post-working.

The following methods are specific examples of methods for producing a molded resin.

(1) A method of using a single-screw or twin-screw extruder for melt kneading of a mixture of a thermoplastic resin, cellulose nanofibers and surface treatment agent and extrusion into a strand form, and cooling solidification in a water bath to obtain molded pellets.

(2) A method of using a single-screw or twin-screw extruder for melt kneading of a mixture of a thermoplastic resin, cellulose nanofibers and surface treatment agent and extrusion into a rod-like or tubular form and cooling to obtain an extrusion molded article.

(3) A method of using a single-screw or twin-screw extruder for melt kneading of a mixture of a thermoplastic resin, cellulose nanofibers and surface treatment agent and extrusion with a T-die to obtain a molded sheet or film.

The following methods are specific examples of methods for melt kneading a mixture of the thermoplastic resin, cellulose nanofibers and surface treatment agent.

(1) A method of melt kneading together the thermoplastic resin, the cellulose nanofibers mixed in the desired proportion, and the surface treatment agent mixed powder.

(2) A method of melt kneading the thermoplastic resin and if necessary the surface treatment agent, and then adding the cellulose nanofiber powder mixed in the desired proportion and if necessary the surface treatment agent, and melt kneading the mixture.

(3) A method of melt kneading the thermoplastic resin, the cellulose nanofibers mixed in the desired proportion, the surface treatment agent mixed powder and water, and then mixing the cellulose nanofibers mixed in the desired proportion and water, and if necessary the surface treatment agent, and melt kneading them together.

(4) A method of melt kneading the thermoplastic resin and if necessary the surface treatment agent, and then adding the thermoplastic resin mixed in the desired proportion, the cellulose nanofibers, the surface treatment agent mixed powder and water, and melt kneading the mixture.

(5) A method of melt kneading with the additions of (1) to (4) above, divided at the top and sides in any desired proportion, using a single-screw or twin-screw extruder.

<Arithmetic mean surface roughness Sa of gear sliding surface>

The gear of the embodiment has an arithmetic mean surface roughness Sa of 3.0 μm or smaller on the sliding surface with other gears. Such a low arithmetic mean surface roughness Sa is advantageous for high slidability (and therefore silent properties) and high durability of the gear. The arithmetic mean surface roughness Sa is the value obtained by measurement according to ISO25178, and it can be obtained by expanding the arithmetic mean surface roughness Ra on the plane. The arithmetic mean surface roughness Ra is the value obtained by measuring the roughness curve on the surface of the molded resin gear (the gear surface can be identified by a person skilled in the art based on the shape of the resin gear), according to JISB0031, extracting a reference length (a) in the direction of the mean line of the roughness curve, using the direction of the mean line of the extracted section as the X-axis and the direction of vertical magnification as the Y-axis, and with the roughness curve represented as y=ƒ(x), expressing the value determined by the following formula (2), in micrometers (μm).

[Mathematical Formula 1]

$$Ra = \frac{1}{a}\int_0^a \{f(x)\}dx \quad (2)$$

The arithmetic mean surface roughness Sa is the expansion of the arithmetic mean surface roughness Ra on the plane, and it is represented by the following formula (3).

[Mathematical Formula 2]

$$Sa = \frac{1}{a}\int\int_a |z(x, y)|dxdy \quad (3)$$

The upper limit for the arithmetic mean surface roughness Sa is preferably 0.9 μm, more preferably 0.8 μm, even more preferably 0.7 μm and most preferably 0.6 μm. The lower limit for the arithmetic mean surface roughness Sa is not particularly restricted, but it is preferably 0.1 μm, for example, from the viewpoint of easier production. The surface roughness can be measured using a commercially available microscope apparatus such as a confocal microscope (for example, OPTELICS® H1200 by Lasertec Corp.).

<Voids>

According to one aspect, there are preferably few voids in the gear. When voids are present, concentration of stress takes place with the void portions as origins under the load of the gear teeth, potentially becoming rupture origins with repeated fatigue. The voids tend to increase in size with a large gear module size formed by injection molding. The presence of voids can be confirmed by splitting the gear in half in the direction perpendicular to the teeth, and observing the cross-section and any micro voids. For example, it can be measured using a confocal microscope (for example, OPTELICS® H1200 by Lasertec Corp.). The sizes of the micro voids can also be confirmed. The upper limit for the maximum sizes of the voids (for the purpose of the present disclosure this is defined as the maximum circle equivalent diameter of voids observed in the entire cross-section of the gear) is preferably 2.0 μm, more preferably 1.0 μm, even more preferably 0.5 μm and most preferably 0.4 μm. While an absence of voids is preferred, or when present their maximum size is preferably small, the maximum size of voids may be 0.01 μm or greater, for example, from the viewpoint of practical durability.

The number of voids in the gear is preferably small, being preferably no more than 10, more preferably no more than 8 and even more preferably no more than 5 per 100 mm² of the cross-section. From the viewpoint of practical durability, the number of voids may be one or more, for example, per 100 mm² of the cross-section.

<Dimensional Change with Water Absorption>

For a gear, the dimensional change with water absorption (hereunder also referred to as "equilibrium water absorption dimensional change"), with absorption of water in a state of equilibrium (exposure in 80° C. hot water for 24 hours, followed by holding for 120 hours under conditions of 80° C., 57% relative humidity) is preferably no greater than 3%. In an environment of practical use, lower dimensional change will make it less likely for large force to be exerted on specific teeth of the gear (less stress concentration), tending to improve the durability. The upper limit for the equilibrium water absorption dimensional change is preferably 3%, more preferably 2.5%, even more preferably 2% and most preferably 1%. The lower limit for the equilibrium water absorption dimensional change is not particularly restricted, but it may be 0.5%, for example, from the viewpoint of practical durability.

<Roundness>

The gear preferably has a roundness of 400 μm or smaller. In an environment of practical use, smaller roundness will increase the dimensional uniformity of the gear and make it less likely for large force to be exerted on specific teeth (less stress concentration), tending to improve the durability. The upper limit for the roundness is preferably 400 μm, more preferably 300 μm, even more preferably 200 m and most preferably 100 μm. The lower limit for the roundness is not particularly restricted, but it may be 1 m, for example, from the viewpoint of actual production. The roundness is the value measured by the method described under "EXAMPLES" in the present disclosure.

Since the resin composition composing the gear of this embodiment includes cellulose nanofibers with sufficiently small diameters compared to glass fibers, it has high thixotropy when in a fluid state (specifically, with the thermoplastic resin in a molten state). This is attributed to uniform shrinkage of the resin during the cooling process of injection molding, which helps reduce the surface roughness, and the number of defects such as voids inside the molded resin gear. Furthermore, since cellulose nanofibers are less oriented (have lower dispersion anisotropy) in the thermoplastic resin compared to glass fibers, shrinkage in the direction of the gear teeth is also more uniform.

In addition, the thermoplastic resin (A) of the embodiment has a relatively high molecular weight as a molding resin, so that its degree of crystallinity is low and spherocrystals are less likely to grow. In other words, it is believed that for a gear of the embodiment, spherocrystals of the thermoplastic resin (A) are uniformly dispersed inside the gear, tending to result in excellent roundness.

Since the gear of the embodiment uses cellulose nanofibers of a specific size and a thermoplastic resin with a specific molecular weight, it has the advantage of very low deviation from design dimensions and very low dimensional variation during continuous casting, despite being composed of a resin.

<Thixotropy>

The gear of the embodiment includes specific cellulose fibers, and therefore according to one aspect it exhibits thixotropy in a molten state. Defining the thixotropic index as the viscosity ratio of the thermoplastic resin (A) in the gear at shear rates of $1\ s^{-1}$ and $10\ s^{-1}$, at the melting point+25° C. (formula (4)), the thixotropic index is about 3.33 when the viscosity is 2000 Pa·s at a shear rate of $1\ s^{-1}$ and the viscosity is 600 Pa·s at a shear rate of $10\ s^{-1}$.

$$\text{Thixotropic index}=(\text{Viscosity at shear rate of }1\ s^{-1}/\text{viscosity at shear rate of }10\ s^{-1}) \quad (4)$$

The upper limit for the thixotropic index of the gear of the embodiment is not particularly restricted, but from the viewpoint of facilitating molding, it is preferably 10, more preferably 8, even more preferably 5 and most preferably 4. The lower limit for the thixotropic index according to one aspect is 1, preferably 1.3 and more preferably 2, from the viewpoint of advantages in terms of satisfactory dimensional stability with the gear of the embodiment. The thixotropy can be measured by the method described below.

A particularly preferred aspect of a gear is a gear (especially an EPS gear) which is a molded resin constructed of a resin composition comprising a thermoplastic resin (A) and cellulose nanofibers (B) with an average fiber diameter of 1000 nm or smaller, wherein:

the gear has a roundness of 400 μm or smaller, the thermoplastic resin (A) includes a polyamide resin, and the resin composition has a thixotropic index of 2 to 10 at a temperature of 25° C. higher than the melting point of the thermoplastic resin (A).

<Torque>

The gear of the embodiment also exhibits excellent durability in use environments with a high level of torque, and therefore according to one aspect, a torque of 5 N·m or higher is used. The upper limit for the torque during use of the gear of the embodiment is not particularly restricted, but from the viewpoint of durability it is preferably 100 N·m, more preferably 50 N·m and even more preferably 30 N·m. The lower limit for the torque is preferably 12 N·m and more preferably 15 N·m, from the viewpoint of obtaining an advantage in terms of satisfy durability with the gear of the embodiment.

<Operating Rotational Speed>

A gear exhibits significant variation in durability depending on the operating rotational speed of the driving source to which the gear is applied, and it tends to undergo deterioration in environments where a high operating rotational speed is used. Because the gear of the embodiment has excellent durability, it exhibits excellent performance even when applied to driving sources with higher operating rotational speeds. According to one aspect, the driving source is a motor. The upper limit for the operating rotational speed of the driving source is preferably 1000 rpm, more preferably 500 rpm, even more preferably 300 rpm and most preferably 200 rpm. The lower limit for the operating rotational speed is not particularly restricted, but from the viewpoint of obtaining an advantage in terms of satisfactory durability with the gear of the embodiment, it is preferably 10 rpm, 30 rpm, 50 rpm or 80 rpm, for example.

<Module>

The gear of the embodiment may have a module of 0.5 or greater. The module is the value of the standard circle diameter of the gear divided by the number of teeth, and it represents the size of the gear. The durability of a gear varies significantly depending on the size of the module. The gear of the embodiment exhibits excellent performance for a wide range of module designs. The upper limit for the module is preferably 25.0, more preferably 20.0, even more preferably 10.0 and most preferably 5.0. The lower limit for the module is not particularly restricted, but from the viewpoint of obtaining an advantage in terms of satisfactory durability with the gear of the embodiment, it is preferably 1.0.

<Linear Expansion Coefficient>

Since the gear of the embodiment includes cellulose nanofibers (B) with an average fiber diameter of 1000 nm or smaller, it can exhibit lower linear expansibility than a conventional resin gear. Specifically, the linear expansion coefficient of the resin composition, as a constituent material of the gear, in a temperature range of 0° C. to 60° C. is preferably 60 ppm/K or lower. The linear expansion coefficient is more preferably 50 ppm/K or lower, even more preferably 45 ppm/K or lower and most preferably 35 ppm/K or lower. The lower limit for the linear expansion coefficient is not particularly restricted, but from the viewpoint of easier production it is preferably 5 ppm/K and more preferably 10 ppm/K, for example.

<Gear Production Method>

The gear of the embodiment can be produced by melt kneading a resin composition comprising a thermoplastic resin (A), cellulose nanofibers (B) with an average fiber diameter of 1000 nm or smaller, and optionally other components, and molding the mixture into a molded resin with a specific shape.

According to one aspect, the gear of the embodiment is an injection molded article, and according to another aspect it is a machined product (preferably a product cut from a molded round bar). The injection molded article can be obtained as an article molded into any gear shape, by loading a resin composition (such as resin pellets) obtained by the method described above into an injection molding machine equipped with a die in the desired gear shape, and molding it. A product cut out from a molded round bar can be obtained as an article molded into any gear shape, by loading resin pellets into an extruder and carrying out round bar extrusion to obtain a molded round bar, and then cutting the round bar into the desired gear shape. In any such method, molding of the gear from the resin composition can be carried out as appropriate based on common technical knowledge of those skilled in the art. Injection molding or cutting out from a molded round bar will tend to result in less formation of voids even with thick molded articles, if the die surface temperature, injection speed and holding pressure are controlled. Injection molding is the more preferred molding method from the viewpoint of mass production and productivity. According to a typical aspect, the gear is a thick molded article with tooth width dimensions of 2 to 50 mm, for example.

The gear of the embodiment is preferably used after being coated in grease. The grease may be coated at least onto the surfaces that are to engage with other gears. Using grease can further improve the slidability, durability and silent properties of the gear. The grease used may be one that is known in the prior art, but from the viewpoint of obtaining excellent slidability even in environments with a wide temperature range, it preferably comprises a base oil, a thickener and an additive, and specifically:

a base oil containing 80 mass % or greater of at least one selected from the group consisting of mineral oils, poly α-olefin oils and alkylpolyphenyl ethers, a thickener, and 3 to 10 mass % of a hydrocarbon-based wax with a melting point or softening point in the range of 70 to 130° C.

Preferred examples of mineral oils include paraffinic oils and naphthenic oils.

Preferred examples of poly α-olefin oils include homogeneous compounds produced by polymerization reaction and hydrotreatment with 1-decene ($C_{10}H_{20}$) as the starting material.

Preferred examples of alkylpolyphenyl ethers include alkyldiphenyl ethers, pentaphenyl ethers, tetraphenyl ethers, monoalkyltetraphenyl ethers and dialkyltetraphenyl ethers.

Preferred examples of thickeners include calcium soaps, lithium soaps, lithium complex soaps, calcium complex soaps, aluminum complex soaps, urea, PTFE, bentone, phthalocyanine, indanthrene and silica gel.

Preferred examples of hydrocarbon-based waxes with a melting point or softening point in the range of 70 to 130° C. include polyethylene waxes and polypropylene waxes.

The amount of base oil in the grease is preferably 50 to 90 mass % and more preferably 60 to 85 mass %.

The amount of thickener in the grease is preferably 10 to 40 mass % and more preferably 20 to 30 mass %.

<Gear System>

The gear of the embodiment may be used in various ways because of its excellent mechanical strength, durability and silent properties. Without being particularly restrictive, the gear may be used as a helical gear, spur gear, internal gear, rack gear, double-helical gear, right bevel gear, helical bevel gear, spiral bevel gear, crown gear, face gear, crossed helical gear, worm gear, worn wheel gear, hypoid gear or Novikov gear. A helical gear or spur gear may be a single gear, a two-step gear or a combination gear having a construction that combines multiple steps from a driving motor, allowing deceleration without disturbing the rotation.

One aspect of the invention provides a gear system (especially an EPS system) comprising a driven gear, a driving gear that engages with the driven gear and a driving source that drives the driving gear (for example, a motor), wherein the driven gear and/or driving gear are gears of the embodiment.

Figure 2:
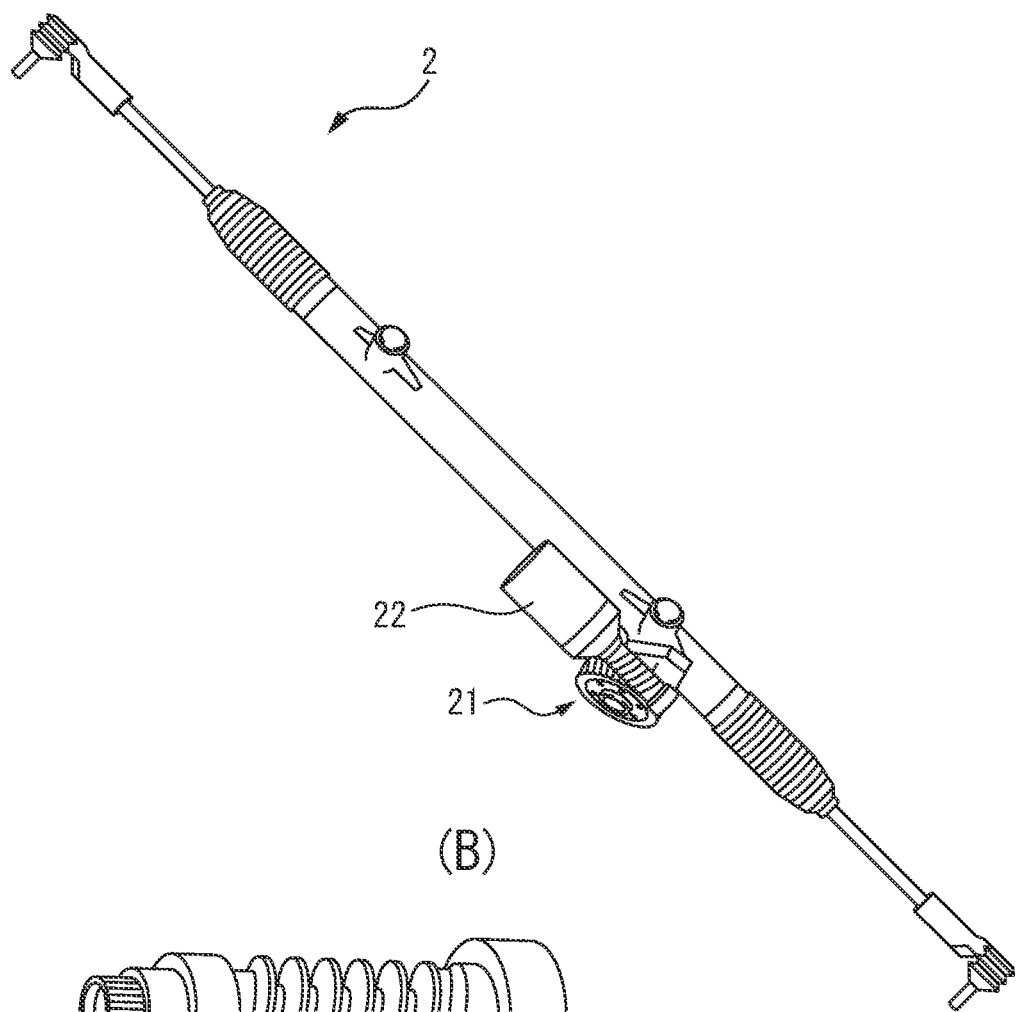
FIG. 2 is a diagram showing an example of a gear system according to one aspect of the invention.
Figure 2:
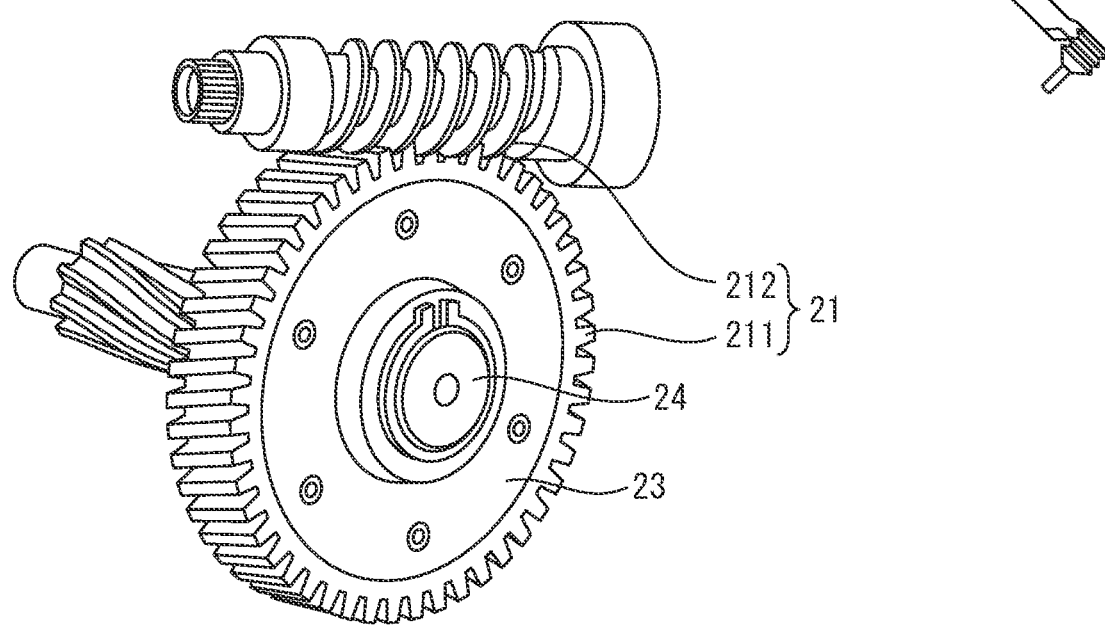

FIGS. 1 and 2 are diagrams showing an example of a gear system according to one aspect of the invention.

In FIG. 1, FIG. 1(A) shows the overall construction of the gear system 1, and FIG. 1(B) shows a more detailed view of the gear mechanism 11 in FIG. 1(A). Referring to FIG. 1, the gear system 1 comprises a gear mechanism 11, that is to be used in the steering column of a vehicle and that includes a worm wheel as the driven gear 111 and a worm as the driving gear 112, and a motor as the driving source 12.

In FIG. 2, FIG. 2(A) shows the overall construction of the gear system 2, and FIG. 2(B) shows a more detailed view of the gear mechanism 21 in FIG. 2(A). Referring to FIG. 2, the gear system 2 comprises a gear mechanism 21, that is to be used in the steering gear of a vehicle and that includes a pinion as the driven gear 211 and a rack as the driving gear 212, and a motor as the driving source 22.

Referring to FIGS. 1 and 2, the driven gear 111, 211 and/or the driving gear 112, 212 may be integrated at least on the outer circumference of a core metal. For example, the driven gear 111 shown in FIG. 1 is incorporated into the gear system 1 without a core metal, while the driven gear 211 shown in FIG. 2 is incorporated into the gear system 2 in a form integrated into the outer circumference of a core metal 23 mounted on a shaft 24. The material of the core metal may be stainless steel, iron, steel, aluminum, brass, titanium alloy, nickel alloy, copper alloy, aluminum alloy or stainless steel alloy. The gear can be integrated onto at least the outer circumference of the core metal by a method known to those skilled in the art, but it is preferably integrated by insert injection molding.

According to a preferred aspect, the gears in the gear system mutually engage via grease. Using grease can further increase the durability and silent properties of the gear system. Preferred examples of grease are those mentioned above.

According to one aspect, the gear mechanism of the gear system is a rack and pinion mechanism composed of a rack and pinion (as shown in FIG. 2, for example), or a worm gear mechanism composed of a worm and worm wheel (as shown in FIG. 1, for example). A pinion and worn wheel constitute an ordinary cylindrical gear (similar to the driven gear 111, 211 shown in FIGS. 1 and 2), and in order to exhibit satisfactory mechanical strength, dimensional precision and surface smoothness it is particularly important for the gear system to have satisfactory slidability and durability. According to one aspect, at least the pinion or worm wheel is a gear of the embodiment, from the viewpoint of obtaining high slidability and high durability.

For both the pinion and won wheel, the ratio of the total tooth depth of the gear teeth (that is, the distance between the tooth bases and tooth points) with respect to the circular pitch (that is, the spacing between teeth) may be 1.0 to 20, 1.5 to 15 or 2.0 to 13, for example.

For both the pinion and worm wheel, the ratio of the gear circular pitch with respect to the tooth width (that is, the length in the axial direction of the teeth) may be 1.0 to 3.0, 1.3 to 2.8 or 1.5 to 2.5, for example.

For both the pinion and worm wheel, the gear pressure angle (that is, the angle formed between the radius line of the gear at a point on the tooth surface and the tangent line to the tooth form) may be 10° to 30°, 13° to 28° or 15° to 25°, for example.

For both the pinion and worm wheel, when the gear is integrated into the core metal, the ratio of the outer diameter of the core metal with respect to the circle diameter of the gear tooth tips, may be 0.02 to 0.98, 0.1 to 0.9 or 0.3 to 0.7, for example.

For both the pinion and worm wheel, when the gear is integrated into the core metal, the ratio of the outer diameter of the core metal with respect to the circle diameter of the gear tooth base, may be 0.01 to 0.99, 0.1 to 0.9 or 0.3 to 0.7, for example.

For both the pinion and worn wheel, when the gear is integrated into the core metal, the ratio of the outer diameter of the core metal with respect to the circle diameter of the gear pitch circle diameter, may be 0.01 to 0.99, 0.1 to 0.9 or 0.3 to 0.7, for example.

The torque on each of the pinion and worm wheel may be 5 to 100 N·m, 8 to 50 N·m or 15 to 30 N·m, for example.

<Use of Gear and Gear System>

The gear of the embodiment can be applied in an EPS system for an automobile or electric car, for example, from the viewpoint of allowing remarkably excellent durability, and maintaining silent properties according to one aspect, compared to a conventional gear. Electric cars include, but are not limited to, senior citizen four-wheeled vehicles, motorcycles and electric two-wheel vehicles.

Because of its excellent slidability and durability, the gear of the embodiment can be used in a cam, slider, lever, arm, clutch, felt clutch, idler gear, pulley, roller, roller, key stem, key top, shutter, reel, shaft, joint, shaft, bearing, guide, outsert molding resin part, insert molding resin part, chassis, tray or side plate, for example.

EXAMPLES

The present invention will now be further explained by examples, with the understanding that these examples are in no way limitative on the invention.

<Starting Materials and Evaluation Methods>

The starting materials and evaluation methods used will now be explained.

<Thermoplastic Resin (A)>

The starting materials listed in Table 1 were used.

TABLE 1

| | | Trade name | Mn | Supplier | Trademark |
|---|---|---|---|---|---|
| a-1 | PA6-1 | 1013B | 13,000 | Ube Industries, Ltd. | UBE NYLON |
| a-2 | PA6-2 | 1022B | 22,000 | Ube Industries, Ltd. | UBE NYLON |
| a-3 | PA6-3 | 1030B | 30,000 | Ube Industries, Ltd. | UBE NYLON |
| a-4 | PA66-1 | 1500 | 28,000 | Asahi Kasei Corp. | LEONA ™ |
| a-5 | PA66-2 | 1700 | 48,000 | Asahi Kasei Corp. | LEONA ™ |
| a-6 | POM | 4520 | 75,000 | Asahi Kasei Corp. | TENAC ™ |

<Molecular Weight Measurement of Polyamide-Based Resin>

The molecular weight of the polyamide-based resin was measured by GPC (gel permeation chromatography) under the following conditions.
Apparatus: Eco Sec by Tosoh Corp.
Column: TSKgel Super GMH-M, 2 columns
TSKgel Super G1000H
Oven: 40° C.
Eluent: HFIP (TFANa, 4.848 g/kg)
Flow rate: sample: 0.5 ml/min, reference: 0.25 mL/min
Sample amount: 25 µl, 3 mg/ml
Detector: RI
Calibration curve: PMMA (polymethyl methacrylate)

<Molecular Weight Measurement of Polyacetal Resin>

The molecular weight of the polyacetal resin was measured by GPC under the following conditions.
Apparatus: Eco Sec by Tosoh Corp.
Column: TSKgel Super GMH-M, 2 columns
TSKgel Super G1000H
Oven: 40° C.
Eluent: HFIP
Flow rate: sample: 0.5 ml/min, reference: 0.25 mL/min
Sample amount: 25 µl, 3 mg/mil
Detector: RI
Calibration curve: PMMA (polymethyl methacrylate)

<Cellulose Nanofibers (B) with Average Fiber Diameter of 1000 nm or Smaller>

(b-1) CNF-1

After cutting linter pulp, an autoclave was used to heat it for 3 hours in hot water at 120° C. or higher to remove the hemicellulose portion and obtained refined pulp, which was pressed and beaten into highly chopped fibers and fibrils to a solid content of 1.5 mass % in purified water, and then defibrated with a high-pressure homogenizer (10 times at an operating pressure of 85 MPa) at the same concentration to obtain defibrated cellulose. For the beating treatment, a disc refiner was used for 2.5 hours of treatment with a high-cutting beating blade (hereunder referred to as "cutting blade"), and then a high-defibrating beating blade (hereunder referred to as "defibrating blade") was used for another 2 hours of beating to obtain CNF-1.

(b-2) CNF-2

CNF-2 was obtained by the method described in International Patent Publication No. WO2017/159823, [0108], Example 1.

(b-3) CNF-3

After cutting linter pulp, an autoclave was used to heat it for 3 hours in hot water at 120° C. or higher to remove the hemicellulose portion and obtained refined pulp, which was pressed and beaten into highly chopped fibers and fibrils to a solid content of 1.5 wt % in purified water, and then defibrated with a high-pressure homogenizer (10 times at an operating pressure of 85 MPa) at the same concentration to obtain defibrated cellulose. For the beating treatment, a disc refiner was used for 4 hours of treatment with a high-cutting beating blade (hereunder referred to as "cutting blade"), and then a high-defibrating beating blade (hereunder referred to as "defibrating blade") was used for another 4 hours of beating to obtain CNF-3.

<Degree of Polymerization of Cellulose Nanofibers (B)>

This was measured by a reduced relative viscosity method using a copper-ethylenedianine solution, as specified in Crystalline Cellulose Verification Test (3) of "Japanese Pharmacopeia, 14th Edition (Hirokawa Shoten)".

<Crystalline Form and Crystallinity of Cellulose Nanofibers (B)>

An X-ray diffraction device (Multipurpose X-ray diffraction device by Rigaku Corp.) was used to measure the diffraction image by a powder method (ordinary temperature), and the degree of crystallinity was calculated by the Segal method. The crystalline form was also measured from the obtained X-ray diffraction image.

<LD of Cellulose Nanofibers (B)>

A 1 mass % concentration purified water suspension of the cellulose nanofibers (B) was prepared and dispersed with a high-shear homogenizer (for example, an "Excel ED-7 Autohomogenizer", trade name of Nippon Seiki Co., Ltd., processing conditions: rotational speed=15,000 rpm×5 minutes) to produce an aqueous dispersion which was diluted with purified water to 0.1 to 0.5 mass %, and this was cast onto mica and air-dried, the ratio (L/D) was determined for the long diameter (L) and short diameter (D) of a particle image, obtained by measurement with an atomic force microscope (AFM), and the value was converted to the average value for 100 to 150 particles.

<Average Fiber Diameter of Cellulose Nanofibers (B)>

The cellulose nanofibers (B) were kneaded as a 40 mass % solid in a planetary mixer ("5DM-03-R", trade name of Shinagawa Machinery Works Co., Ltd., hook-type stirring blade) for 30 minutes at 126 rpm, room temperature, ordinary pressure. Next, a purified water suspension was prepared to a 0.5 mass % solid content, a high-shear homogenizer ("Excel ED-7 Autohomogenizer", trade name of Nippon Seiki Co., Ltd. treatment conditions: rotational speed=15,000 rpm×5 minutes) was used for dispersion, and centrifugal separation was carried out (centrifugation for 10 minutes with a "Model 6800 Centrifugal Separator", trade name of Kubota Corp., Rotor type Model RA-400, under treatment conditions of centrifugal force: 39,200 m$^2$/s, obtaining the resulting supernatant, and further centrifuging it at 116,000 m$^2$/s for 45 minutes). The supernatant liquid after centrifugation was used to measure the 50% cumulative particle diameter (volume-average particle size) in the volume frequency particle size distribution obtained by a laser diffraction/scattering method-based particle size distribution meter ("LA-910", trade name of Horiba, Ltd., ultrasonic treatment for 1 minute, refractive index: 1.20), and the value was used as the average fiber diameter.

<Evaluating Degree of Chemical Modification (DS Mean Degree of Substitution)>

The degree of chemical modification of the cellulose nanofibers (B) was evaluated by drying the cellulose nanofibers and forming a porous sheet, and then measuring the infrared spectroscopy spectrum of the porous sheet by the ATR-IR method, using a Fourier transform infrared spectrometer (FT/IR-6200 by JASCO Corp.). Infrared spectroscopy measurement was carried out under the following conditions.

(Measuring Conditions for Infrared Spectroscopy)
  Number of scans: 64 times,
  wavenumber resolution: 4 cm$^{-1}$,
  measuring wavenumber range: 4000 to 600 cm$^{-1}$,
  ATR crystal: diamond,
  incident angle: 45°

The IR index was calculated from the obtained IR spectrum using the following formula (5).

IR index=$H1730/H1030$      (5)

In formula (5), H1730 and H1030 are the absorbances at 1730 cm$^{-1}$ and 1030 cm$^{-1}$ (absorption bands for C—O stretching vibration of the cellulose backbone chain). Each absorbance value is the value where absorbance=0 was defined for the baseline that was a line connecting 1900 cm$^{-1}$ and 1500 cm$^{-1}$ or a line connecting 800 cm- and 1500 cm$^{-1}$, respectively.

The average degree of substitution (DS) was calculated from the IR index using the following formula (6).

DS=4.13×IR index      (6)

(c-2) BLAUNON RCW-20 (CAS No. 61788-85-0, static surface tension: 42.4 mN/m, dynamic surface tension: 52.9 mN/m), by Aoki Oil Industrial Co., Ltd.
Boiling point at ordinary pressure: >100° C.
(c-3) SUPERFLEX 300 by Daiichi Kogyo Co., Ltd.
(c-4) PEG20,000 by Sanyo Chemical Industries, Ltd.

<Molecular Weight Measurement of Surface Treatment Agent (C)>

The molecular weight of the surface treatment agent was measured by HPLC (high performance liquid chromatography) under the following conditions.

[HPLC Measurement]
Apparatus: HP-1260 (Agilent Technologies)
Column: TSKgel ODS-80 Ts (Tosoh Corp.)
Mobile phase: Solvent gradient with water/acetonitrile mobile phase
Detector: Evaporative light scattering detector (ELSD)
Measuring temperature: 40° C.
Flow rate: 1 mL/min
Sample concentration: 1 mg/mL
Injection rate: 10 μL <Cloud Point of Surface Treatment Agent (C)>

For a solid at ordinary temperature, it was heated at above the melting point to melting and then dissolved in water for use as the sample.
Apparatus: SV-10A by A&D Co., Ltd.
Measuring concentrations: 0.5 mass %, 1.0 mass %, 5 mass %
Measuring temperature: 0 to 90° C.

When a cloud point was not exhibited by this method, a visualizable sealed glass container was sealed. The temperature was then increased and the point at which the precipitated aqueous solution became cloudy was visually confirmed and recorded as the cloud point.

<HLB Value of Surface Treatment Agent (C)>

For (c-1), the Griffin method was used to determine the HLB value according to the following formula.

HLB value=20×(total formula weight of hydrophilic groups/molecular weight)

(In the formula, the formula weight of hydrophilic groups is the formula weight of polyethylene oxide segments.)

<Measurement of Static Surface Tension of Surface Treatment Agent (C)>

Using each surface treatment agent, the static surface tension was measured by the Wilhelmy method using an automatic surface tension measuring apparatus (for

TABLE 2

| | Average fiber diameter (nm) | Crystallinity (%) | Crystalline form | L/D | Polymerization degree | Cutting blade (hr) | Defibrating blade (hr) | DS substitution |
|---|---|---|---|---|---|---|---|---|
| b-1 CNF-1 | 90 | 80 | Type I | 450 | 450 | 2.5 | 2.0 | 0 |
| b-2 CNF-2 | 80 | 78 | Type I | 200 | 300 | — | — | 0.8 |
| b-3 CNF-3 | 30 | 80 | Type I | 300 | 300 | 4 | 4 | 0 |

<Surface Treatment Agent (C)>
(c-1) In a 2 L autoclave there were placed 47 parts by mass of polyethylene oxide (Mn 1000) and 0.6 part by mass of KOH as a catalyst, and after nitrogen exchange, 100 parts by mass of polypropylene oxide (Mn 1050) was added and successively introduced over a period of 4 hours at 160° C. Upon completion of the reaction, the mixture was neutralized with 1.2 parts by mass of lactic acid to obtain c-1. The obtained c-1 had Mn 3100, a cloud point of 55° C., and HLB 6.5.

example, a "Model CBVP-Z", trade name of Kyowa Interface Science Co., Ltd., with use of accessory glass cell). Since the surface treatment agents used in the Examples and Comparative Examples were liquid at ordinary temperature, they were charged in to a height of 7 mm to 9 mm from the bottom of the accessory stainless steel dish up to the liquid level, and after adjusting the temperature to 25° C.±1° C., measurement was performed and calculation was made by the following formula. γ=(P−mg+shμg)/L cos θ. Here, P: balancing force, in: plate mass, g: gravitational constant, L:

plate circumferential length, θ: contact angle between plate and liquid, s: plate cross-sectional area, h: sunken depth from liquid level (until forces balanced), ρ: liquid density (1, since the surface treatment agents used in the Examples and Comparative Examples had densities of 1±0.4 g/mL).

For solids at ordinary temperature, they were heated to their melting point or above for melting and then adjusted to a temperature of melting point+5° C., and the surface tension was measured by the Wilhelmy method described above.

<Measurement of Dynamic Surface Tension of Surface Treatment Agent (C)>

Each surface treatment agent was used for measurement of the dynamic surface tension with a dynamic surface tension meter (Theta Science Model t-60, product name of Eko Instruments, probe (capillary TYPE I (made of PEEK resin), single mode)) by the maximum bubble pressure method, using an air bubble generation cycle of 10 Hz. Each surface treatment agent used in the Examples and Comparative Examples was dissolved or dispersed in ion-exchanged water to 5 mass % to prepare a measuring liquid, and 100 mL of the solution or dispersion was charged into a 100 mL-volume glass beaker and adjusted to a temperature of 25° C.±1° C., and the subsequently measured value was used. The dynamic surface tension was calculated by the following formula. σ=ΔP·τ/2. Here, σ: dynamic surface tension, ΔP: differential pressure (maximum pressure−minimum pressure), r: capillary radius.

<Metal Ion Component (D)>

(d-1) Copper(I) iodide: trade name: Copper(I) Iodide by Wako Pure Chemical Industries, Ltd.

(d-2) Potassium iodide: trade name: Potassium Iodide by Wako Pure Chemical Industries, Ltd.

(d-3) Calcium stearate: trade name: Calcium Stearate by Sakai Chemical Industry Co., Ltd.

<Sliding Agent Component (E)>

(e-1) Wax: trade name: UNICID 700 (melting point: 110° C.) by Baker-Petrolite Corp.

(e-2) Ethylene bisstearylamide, trade name: ARMOWAX EBS (melting point: 145° C.) by Lion Corp.

<(F) Glass Fibers>

The starting materials listed in Table 3 were used.

TABLE 3

| | | Average fiber diameter | Trade name | Supplier |
|---|---|---|---|---|
| f-1 | GF-1 | 6.5 | ECS03T-289DE | Nippon Electric Glass Co., Ltd. |
| f-2 | GF-2 | 10 | JAFT756 | Asahi Fiber Glass Co., Ltd. |
| f-3 | GF-3 | 13 | ECS03T-651P | Nippon Electric Glass Co., Ltd. |

<Production Conditions>

Using a twin-screw extruder (TEM-26SS extruder by Toshiba Machine Co., Ltd. (L/D=48, vented)), and setting the cylinder temperature to 260° C. for polyamide 6, 290° C. for polyamide 66 and 200° C. for a polyoxymethylene-based material, components (A) and (B), and also component (C) and/or component (D) when used, were mixed in a batch and supplied to a quantitative feeder through the main throat section of the extruder, and the resin kneaded blend was extruded into a strand form under conditions with an extrusion output of 15 kg/h and a screw rotational speed of 250 rpm, and then quenched in a strand bath and cut with a strand cutter to obtain resin composition pellets.

<Molding Conditions and Multipurpose Test Piece>

An injection molding machine was used for molding of a multipurpose test piece conforming to ISO294-3, from resin composition pellets obtained under the production conditions described above.

Polyamide-based material: Conditions conforming to JIS K6920-2

Polyoxymethylene-based material: Conditions conforming to JIS K7364-2

Since polyamide-based materials undergo changes due to moisture absorption, the materials were stored in an aluminum moisture-proof bag immediately after casting to minimize moisture absorption.

<Evaluation Conditions and Multipurpose Test Piece>

The multipurpose test piece obtained under <Molding conditions and multipurpose test piece> above was measured for tensile yield strength and tensile breaking elongation according to ISO527 and for flexural modulus and flexural strength according to ISO179.

<Aging Test>

A GPH-102 by Espec Corp. was used for an exposure test of the multipurpose test piece in an atmosphere at 150° C. The exposed sample was stored in an aluminum bag and the tensile yield strength was measured according to ISO527. The strength retention during this time was evaluated as the number of days that 80% of the tensile yield strength was retained, based on the multipurpose test piece at 0 days after exposure as 100%.

<Thixotropic Index>

The multipurpose test piece obtained under <Molding conditions and multipurpose test piece> above was measured for viscoelasticity while melting under the following test conditions.

Apparatus: ARES G2 by TA Instruments, Japan

Measuring temperature: Resin melting point+25° C. (for example, 250° C. for PA6)

Shear rate: 1.0 to 40 s$^{-1}$ 25 mm/40 mm parallel plates were used with a gap of 1 mm.

The thixotropic index was calculated from the measurement results according to the following formula (7).

$$\text{Thixotropic index} = (\text{Viscosity at shear rate of } 1\ s^{-1} / \text{viscosity at shear rate of } 10\ s^{-1}) \quad (7)$$

A higher value was judged to be higher thixotropy.

<Frictional Coefficient and Abrasion Loss>

The multipurpose test piece obtained under <Molding conditions and multipurpose test piece> above was subjected to a sliding test using a reciprocating friction wear tester (Model AFT-15MS by Toyo Precision Parts Mfg. Co., Ltd.) and a SUS304 test piece (5 mm-diameter sphere) as the partner material, with a linear speed of 50 mm/sec, a reciprocal distance of 50 mm, a temperature of 23° C., and 50% humidity. The frictional coefficient used was the value obtained after the following test conditions. The abrasion loss was measured as the abrasion loss of the sample after the sliding test (abraded cross-sectional area) using a confocal microscope (OPTELICS® H1200, Lasertec Corp.). The abraded cross-sectional area was the average value of measurement with n=4, rounding to the first decimal place. The measured locations were locations 12.5 mm from the edges of the wear marks, at equal spacings. A lower numerical value for the abraded cross-sectional area was evaluated as being more excellent abrasion properties.

Test conditions: Load: 19.6 N (for Example I), 9.8 N (for Example II), number of passes: 10,000

<Linear Expansion Coefficient>

Measurement was performed according to ISO11359-2, in a measuring temperature range of −10 to 80° C., using a 4 mm long, 4 mm wide, 10 mm length rectangular solid sample cut out with a precision cutting saw from the center section of each multipurpose test piece obtained under <Molding conditions and multipurpose test piece> above, and the expansion coefficients between 0° C. and 60° C. were calculated.

<Frictional Coefficient Ratio>

The frictional coefficient ratio was calculated according to the following formula (8), based on the frictional coefficient obtained by the measurement of <Frictional coefficient and abrasion loss> above.

$$\text{Frictional coefficient ratio} = \text{Reinforced resin composition/non-reinforced resin composition} \quad (8)$$

(In the formula, "reinforced resin composition" is the resin composition comprising glass fibers or cellulose nanofibers prepared in the Example or Comparative Example, and "non-reinforced resin composition" is a composition for comparison, having the same composition as the reinforced resin composition except for not containing glass fibers or cellulose nanofibers.)

For example, using the frictional coefficient of 0.65 for the non-reinforced resin composition of Comparative Example 4 (using 1022B as the thermoplastic resin) and the frictional coefficient of 0.15 for the CNF reinforced resin composition of Example 3 (using 1022B as the thermoplastic resin) yields the following by formula (8):

$$\text{Frictional coefficient ratio} = 0.15/0.65 = 0.23,$$

and therefore the frictional coefficient is notably reduced by addition of CNF.

It can therefore be judged that a lower numerical value for the frictional coefficient ratio corresponds to a greater reducing effect on the frictional coefficient and more excellent slidability of the molded article.

<Dimensional Change with Water Absorption>

The multipurpose test piece obtained under "Molding conditions and multipurpose test piece) above was brought to a state of equilibrium (exposure to 80° C. hot water for 24 hours, followed by holding for 120 hours under conditions of 80° C., 57% relative humidity), after which the outer diameter dimension was measured with a digital precision caliper by Mitsutoyo Corp. before and after water absorption, and calculation was performed as Equilibrium water absorption dimensional change (%)=(dimension after water absorption)/(dimension before water absorption)×100. The state before water absorption is the state after the multipurpose test piece immediately after molding has been stored in an aluminum bag and restored to ordinary temperature.

<Molding of Injection-Molded Gear>

For Example I, resin composition pellets obtained under the production conditions described above were used in injection molding using an injection molding machine (trade name: "α50i-A injection molding machine") by Fanuc Corporation, with a cylinder temperature of 260° C. for the polyamide 6-based material, 290° C. for the polyamide 66-based material and 200° C. for the polyoxymethylene-based material, under injection conditions with a die temperature of 80° C., a maximum injection pressure of 120 MPa, an injection time of 10 seconds and a cooling tune of 60 seconds, to obtain a worm wheel gear having a module of 3.0, 50 teeth, a tooth thickness of 5 nm and a tooth width of 15 mm. The polyamide-based material, which undergoes changes due to moisture absorption, was stored in an aluminum moisture-proof bag immediately after casting to minimize moisture absorption.

<Continuous Moldability of Injection Molding Gears>

For Example I, ten gears were arbitrarily selected among gears obtained under the same molding conditions as in <Molding of injection-molded gear> above, and the gear tooth tip circle diameter of each was measured (total of 25 locations). The average value was calculated for each of the 25 gear tooth tip circle diameters, and the degree of fluctuation between the continuously molded 10 gears was calculated.

Excellent: Degree of fluctuation of 100 µm, continuous moldability judged to be excellent.

Good: Degree of fluctuation of >100 µm and 150 m, continuous moldability judged to be satisfactory.

Acceptable: Degree of fluctuation of >150 µm and 200 µm, continuous moldability judged to be less than satisfactory.

Poor: Degree of fluctuation of >200 m, continuous moldability judged to be inferior.

<Molding of Round Bar-Molded Gear>

For Example I, resin composition pellets obtained under the production conditions described above were supplied to a 30 mm single-screw solid extrusion molding machine having a pick-up device and a water-cooling zone at the extruder die section, and the cylinder temperature was set to 280° C. for the polyamide 6-based material, 320° C. for the polyamide 66-based material and 230° C. for the polyoxymethylene-based material, for solid extrusion of a round bar with a diameter of 90 mm. In order to reduce sink marks and micro void generation in the extruded body, the pick-up device was driven toward the die side so that the extrusion speed was 3 mm/min. The obtained round bar was cut and molded into the same gear as under <Molding conditions and injection-molded gear>. The polyamide-based material, which undergoes changes due to moisture absorption, was stored in an aluminum moisture-proof bag immediately after casting to minimize moisture absorption.

<Molding Conditions and Gear Molding A>

For Example II, resin composition pellets obtained under the production conditions described above were used in injection molding using an injection molding machine (trade name: "α50i-A injection molding machine") by Fanuc Corporation, with a cylinder temperature of 250° C. for the polyamide-based material and 190° C. for the polyoxymethylene-based material, under injection conditions with a die temperature of 80° C., a maximum injection pressure of 120 MPa, an injection time of 10 seconds and a cooling time of 60 seconds, to obtain a spur gear having a module of 0.8, 50 teeth, and a tooth width of 5 mm. The polyamide-based material, which undergoes changes due to moisture absorption, was stored in an aluminum moisture-proof bag immediately after casting to minimize moisture absorption. Two types of die surfaces were used, mirror finished and texture finished. The arithmetic mean surface roughness Ra of the mirror-finished die surface was 0.03, and the arithmetic mean surface roughness Ra of the texture-finished die surface was 2.0.

<Molding Conditions and Gear Molding B>

For Example II, resin composition pellets obtained under the production conditions described above were used in injection molding using an injection molding machine (trade name: "α50i-A injection molding machine") by Fanuc Corporation, with a cylinder temperature of 250° C. for the polyamide-based material and 190° C. for the polyoxymethylene-based material, under injection conditions with a die temperature of 80° C., a maximum injection pressure of 120 MPa, an injection time of 10 seconds and a cooling time of 60 seconds, to obtain a spur gear having a module of 0.8, 50 teeth, and a tooth width of 12 mm. The polyamide-based material, which undergoes changes due to moisture absorption, was stored in an aluminum moisture-proof bag immediately after casting to minimize moisture absorption. Two types of die surfaces were used, mirror-finished and texture-finished. The arithmetic mean surface roughness Ra of the mirror-finished die surface was 0.03, and the arithmetic mean surface roughness Ra of the texture-finished die surface was 2.0.

<Molding Conditions and Gear Molding C>

For Example II, resin composition pellets obtained under the production conditions described above were used in injection molding using an injection molding machine (trade name: "α50i-A injection molding machine") by Fanuc Corporation, with a cylinder temperature of 250° C. for the polyamide-based material and 190° C. for the polyoxymethylene-based material, under injection conditions with a die temperature of 80° C., a maximum injection pressure of 120 MPa, an injection time of 10 seconds and a cooling time of 60 seconds, to obtain a spur gear having a module of 1.5, 50 teeth, and a tooth width of 12 mm. The polyamide-based material, which undergoes changes due to moisture absorption, was stored in an aluminum moisture-proof bag immediately after casting to minimize moisture absorption. Two types of die surfaces were used, mirror-finished and texture-finished. The arithmetic mean surface roughness Ra of the mirror-finished die surface was 0.03, and the arithmetic mean surface roughness Ra of the texture-finished die surface was 2.0.

<Annealing Treatment>

Spur gears obtained by <Molding of injection-molded gear> and <Molding of round bar-molded gear> (for Example I) or by <Molding conditions and gear molding A>, <Molding conditions and gear molding B> and <Molding conditions and gear molding C> (for Example II) were heat treated using a GPH-102 by Espec Corp., at 130° C. for 1 hour for the polyamide-based material (conditions A) or 140° C. for 5 hours for the polyoxymethylene-based material (conditions B).

<Arithmetic Mean Surface Roughness Sa of Gear Sliding Surface>

Using a spur gear obtained by the <Molding of injection-molded gear> and <Molding of round bar-molded gear> followed by <Annealing treatment> described above (for Example I) or a spur gear obtained by <Molding conditions and gear molding A>, <Molding conditions and gear molding B> and <Molding conditions and gear molding C>, or a spur gear after the annealing of the <Annealing treatment> described above (for Example II), five arbitrary teeth were cut out of a single spur gear, and the surface roughness (arithmetic mean surface roughness Sa) was measured according to ISO25178 in the area of a 100 μm square section at the center section in the in-plane direction of the surface of each tooth. The number average value was calculated as Sa for the five measured teeth (i.e. measurement with n=5 for each spur gear, n=1 for each tooth). The surface roughness was measured using a confocal microscope (OPTELICS® H1200 by Lasertec Corp.).

<Measurement of Gear Roundness>

The roundness of the spur gear after the <Molding of injection-molded gear>, <Molding of round bar-molded gear> and <Annealing treatment> described above was measured under the following conditions.

Using a roundness cylindrical shape meter (Round Test RA-400 by Mitsutoyo Corp.), the outer peripheral shape of the molded gear was measured, representing the error as μm according to the LSC method (a method defining error as the difference in radius between a circumscribed circle and an inscribed circle concentric with the circle where the sum of squares of deviation was minimal, based on the least-squares center method), and the total pitch error (μm) of the gear was recorded as the roundness. A smaller numerical value can be judged as higher roundness.

<Gear Durability Test>

For Example I, a worm wheel gear obtained by the <Molding of injection-molded gear> and <Molding of round bar-molded gear> described above was set in a gear durability tester by Toshiba Machine Co., Ltd., combining the resin worm wheel gear with a worm. The worm wheel gear was the driving side and the worn was the driven side. The meshing sections were coated with grease (MULTEMP CPL by Kyodo Yushi Co., Ltd.) and were rotated by hand to completely spread the grease onto the worn and worm wheel gear. The gear on the driving side was then rotated under the following conditions and the time until breakage of the gear (durability time) was measured.

Durability test: Temperature: 23° C., humidity: 50%, torque: 25 N/m, rotational speed: 30 rpm After one rotation in one direction and back, it was rotated in the opposite direction after an interval of 10 seconds.

Grease: MULTEMP CPL
Base oil (ester-based synthetic oil): 60 to 70 mass %
Thickener (urea derivative): 10 to 20 mass %
Extreme-pressure agent (polytetrafluoroethylene): 15 to 25 mass %
Other (antioxidant): ≤5 mass %

For Example II, a spur gear obtained by <Molding conditions and gear molding A>, <Molding conditions and gear molding B> and <Molding conditions and gear molding C> described above was set in a gear durability tester by Toshiba Machine Co., Ltd., in combination with a gear of the same material. One gear was the driving side while the other gear was the driven side. The gear on the driving side was then rotated under the following conditions and the time until breakage of the gear (durability time) was measured.

Durability test A: Torque: 5 N/m, rotational speed: 1000 rpm
Durability test B: Torque: 5 N/m, rotational speed: 2000 rpm
Durability test C: Torque: 15 N/m, rotational speed: 1000 rpm
Durability test D: Torque: 20 N/m, rotational speed: 1000 rpm For durability test A, the dimensional change with water absorption was measured in the same manner as <Dimensional change with water absorption> above.

<Evaluation of Silent Properties>

For Example II, the silent properties were evaluated during the <Gear durability test>. A microphone was set at a location 50 mm from the gear shaft at the driving side, and a noise meter (conforming to JIS C1502) was used for measurement of the noise level for 1 minute at a time point 60 minutes after start of the gear durability test, evaluating the measurement on the following scale.

Excellent: Maximum noise level of <70 dB
Good: Maximum noise level of ≥70 dB and <75 dB
Acceptable: Maximum noise level of ≥75 dB and <85 dB
Poor: Maximum noise level of ≥85 dB <Molding Conditions and Round Bar Gear Molding>

For Example II, resin composition pellets obtained under the production conditions described above were supplied to a 30 nm single-screw solid extrusion molding machine having a pick-up device and a water-cooling zone at the extruder die section, and the cylinder temperature was set to 280° C. for the polyamide-based material and 230° C. for the polyoxymethylene-based material, for solid extrusion of a round bar with a diameter of 60 mm. In order to reduce sink marks and micro void generation in the extruded body, the pick-up device was driven toward the die side so that the extrusion speed was 3 mm/min. The obtained round bar was cut and molded into the same gear as under <Molding conditions and gear molding A>. The polyamide-based material, which undergoes changes due to moisture absorption, was stored in an aluminum moisture-proof bag immediately after casting to minimize moisture absorption.

<Observation of Voids>

For Example II, a gear obtained by <Molding conditions and gear molding A> was used as an injection-molded gear and a gear obtained by <Molding conditions and round bar gear molding> was used as a round bar cut gear, and each gear was cut in half in the direction perpendicular to the teeth, the cross-section was observed, and the presence or absence of micro voids was confirmed. A confocal microscope (OPTELICS® H1200, product of Lasertec Corp.) was used for the observation. For samples in which micro voids were observed, the sizes of the void-generated regions were measured and expressed as numerical values representing the circle equivalent diameters of the generated regions. The maximum among the observed voids was recorded.

Example I

Examples 1 to 9 and Comparative Examples 1 to 12

Resin compositions were obtained by the method described under <Production conditions> above. They were molded and then evaluated according to the evaluation methods described above. The results are listed in Tables 4 and 5.

For Example 5-1 and Example 6-1, the obtained molded articles were held at 150° C. under a $N_2$ stream and allowed to stand for 72 hours. After 72 hours, heating was completed and the articles were allowed to cool to room temperature. They were then evaluated by the evaluation methods described above.

TABLE 4

| | | | | Example 1 | Comp. Example 1 | Comp. Example 2 | Comp. Example 3 | Example 1 | Comp. Example 4 | Comp. Example 5 |
|---|---|---|---|---|---|---|---|---|---|---|
| Composition | (A) | a-1 | wt % | | 99.93 | 74.93 | 74.93 | 73.93 | | |
| | | a-2 | wt % | | | | | | 99.93 | 74.93 |
| | (B) | b-1 | wt % | | | | | 25 | | |
| | | b-2 | wt % | | | | | | | |
| | (F) | f-1 | wt % | | | 25 | | | | 25 |
| | | f-2 | wt % | | | | 25 | | | |
| | (C) | c-1 | wt % | | | | | 1 | | |
| | (D) | d-1 | wt % | | 0.02 | 0.02 | 0.02 | 0.02 | 0.02 | 0.02 |
| | | d-2 | wt % | | 0.05 | 0.05 | 0.05 | 0.05 | 0.05 | 0.05 |
| Mechanical properties of multipurpose test piece | Flexural modulus | | MPa | | 2750 | 7750 | 7750 | 7800 | 2800 | 7750 |
| | Flexural strength | | MPa | | 108 | 241 | 242 | 258 | 110 | 244 |
| | Thixotropic index | | [—] | | 1.05 | 1.18 | 1.17 | 2.56 | 1.06 | 1.23 |
| | Frictional coefficient | | [—] | | 0.68 | 0.58 | 0.62 | 0.18 | 0.65 | 0.55 |
| | Frictional coefficient ratio | | [—] | | — | 0.85 | 0.85 | 0.85 | — | 0.85 |
| | Abrasion loss | | [µm] | | 245 | 25 | 20 | 18 | 230 | 21 |
| | Dimensional change with water absorption | | % | | 103.2 | 103.1 | 102.8 | 102 | 103 | 102.5 |
| Gear properties of gear test piece | Injection-molded gear | Arithmetic mean surface roughness Sa | [µm] | | 0.3 | 3.8 | 4.8 | 0.4 | 0.4 | 3.5 |
| | | Roundness | [µm] | | 285 | 453 | 486 | 246 | 257 | 423 |
| | | Durable Time | Time | | 0.1 | 24 | 28 | 35 | 0.2 | 122 |
| | | Continuous moldability | [Excellent, Good, Acceptable, Poor] | | Poor | Poor | Poor | Good | Poor | Acceptable |
| | Round bar cut gear | Arithmetic mean surface roughness Sa | [µm] | | 4.2 | 62 | 7.8 | — | 3.8 | 5.8 |
| | | Roundness | [µm] | | 468 | 842 | 891 | — | 453 | 782 |
| | | Durable Time | Time | | 0.1 | 34 | 37 | — | 0.2 | 85 |

| | | | | Example 1 | Comp. Example 6 | Example 2 | Example 3 | Example 4 |
|---|---|---|---|---|---|---|---|---|
| Composition | (A) | a-1 | wt % | | | | | |
| | | a-2 | wt % | | 74.93 | 74 | 73.93 | 73.93 |
| | (B) | b-1 | wt % | | | 25 | 25 | |
| | | b-2 | wt % | | | | | 25 |
| | (F) | f-1 | wt % | | | | | |
| | | f-2 | wt % | | 25 | | | |
| | (C) | c-1 | wt % | | | 1 | 1 | 1 |
| | (D) | d-1 | wt % | | 0.02 | | 0.02 | 0.02 |
| | | d-2 | wt % | | 0.05 | | 0.05 | 0.05 |
| Mechanical properties of | Flexural modulus | | MPa | | 7800 | 7850 | 7850 | 7800 |
| | Flexural strength | | MPa | | 251 | 261 | 262 | 254 |

TABLE 4-continued

| | | | | | | | |
|---|---|---|---|---|---|---|---|
| multipurpose test piece | Thixotropic index | [—] | | 1.28 | 2.93 | 3.02 | 3.45 |
| | Frictional coefficient | [—] | | 0.58 | 0.15 | 0.15 | 0.14 |
| | Frictional coefficient ratio | [—] | | 0.89 | 0.23 | 0.23 | 0.21 |
| | Abrasion loss | [μm] | | 18 | 15 | 15 | 13 |
| | Dimensional change with water absorption | % | | 102.6 | 102 | 102 | 101 |
| Gear properties of gear test piece | Injection-molded gear | Arithmetic mean surface roughness Sa | [μm] | 53 | 0.3 | 0.3 | 0.4 |
| | | Roundness | [μm] | 453 | 235 | 235 | 218 |
| | | Durable Time | Time | 152 | 182 | 182 | 195 |
| | | Continuous moldability | [Excellent, Good, Acceptable, Poor] | Acceptable | Good | Good | Excellent |
| | Round bar cut gear | Arithmetic mean surface roughness Sa | [μm] | 6.2 | 1.3 | 1.3 | 2.2 |
| | | Roundness | [μm] | 832 | 345 | 345 | 334 |
| | | Durable Time | Time | 75 | 123 | 123 | 138 |

TABLE 5

| | | | | Example I | Comp. Example 7 | Comp. Example 8 | Example 5 | Example 5-1 | Comp. Example 9 | Comp. Example 10 | Example 6 |
|---|---|---|---|---|---|---|---|---|---|---|---|
| | (A) | a-3 | wt % | | 99.93 | 74.93 | 73.93 | 73.93 | | | |
| | | a-4 | wt % | | | | | | 99.93 | 74.93 | 73.93 |
| | | a-5 | wt % | | | | | | | | |
| | | a-6 | wt % | | | | | | | | |
| | (B) | b-1 | wt % | | | | | | | | |
| | | b-2 | wt % | | | | 25 | 25 | | | 25 |
| | (F) | f-1 | wt % | | | 25 | | | | | |
| | | f-2 | wt % | | | | | | | 25 | |
| | | f-3 | wt % | | | | | | | | |
| | (C) | c-1 | wt % | | | | 1 | 1 | | | 1 |
| | (D) | d-1 | wt % | | 0.02 | 0.02 | 0.02 | 0.02 | 0.02 | 0.02 | 0.02 |
| | | d-2 | wt % | | 0.05 | 0.05 | 0.05 | 0.05 | 0.05 | 0.05 | 0.05 |
| | | d-3 | wt % | | 1.06 | 1.23 | 3.54 | 3.56 | 1.06 | 1.23 | 3.1 |
| Mechanical properties of multipurpose test piece | | Flexural modulous | MPa | | 2850 | 7740 | 7840 | 7850 | 2850 | 7800 | 7900 |
| | | Flexural strength | MPa | | 112 | 242 | 267 | 272 | 113 | 272 | 257 |
| | | Thixotropic index | [—] | | 1.06 | 1.23 | 3.54 | 3.56 | 1.06 | 1.23 | 3.1 |
| | | Frictional coefficient | [—] | | 0.72 | 0.65 | 0.14 | 0.14 | 0.7 | 0.64 | 0.13 |
| | | Frictional coefficient ratio | [—] | | | 0.9 | 0.19 | 0.19 | — | 0.91 | 0.18 |
| | | Abrasion loss | [μm] | | 250 | 21 | 12 | 11 | 300 | 50 | 11 |
| | | Dimensional change with water adsorption | % | | 102.5 | 102.5 | 101.5 | 101.5 | 102.5 | 102.5 | 101.5 |
| Gear properties of gear test piece | Injection-molded gear | Arithmetic mean surface roughness Sa | [μm] | | 0.4 | 3.6 | 0.4 | 0.5 | 0.4 | 5.5 | 0.4 |
| | | Roundness | [μm] | | 227 | 419 | 215 | 220 | 315 | 534 | 268 |
| | | Durable Time | Time | | 0.25 | 155 | 213 | 250 | 0.25 | 175 | 192 |
| | | Continuous moldability | [Excellent, Good, Acceptable, Poor] | | Poor | Acceptable | Excellent | Excellent | Poor | Acceptable | Excellent |
| | Round bar cut gear | Arithmetic mean surface roughness Sa | [μm] | | 4.2 | 6.3 | 2.3 | 2.5 | 4.3 | 5.9 | 2.4 |
| | | Roundness | [μm] | | 487 | 835 | 386 | 378 | 478 | 924 | 375 |
| | | Durable Time | Time | | 0.25 | 78 | 124 | 156 | 0.25 | 64 | 165 |

| | | | | Example I | Example 6-1 | Example 7 | Comp. Example 11 | Comp. Example 12 | Example 8 | Example 9 |
|---|---|---|---|---|---|---|---|---|---|---|
| | (A) | a-3 | wt % | | | | | | | |
| | | a-4 | wt % | | 73.93 | | | | | |
| | | a-5 | wt % | | | 73.93 | | | | |
| | | a-6 | wt % | | | | 99.95 | 74.95 | 73.95 | 73.95 |
| | (B) | b-1 | wt % | | | | | | 25 | |
| | | b-2 | wt % | | 25 | 25 | | | | 25 |
| | (F) | f-1 | wt % | | | | | | | |
| | | f-2 | wt % | | | | | | | |
| | | f-3 | wt % | | | | | 25 | | |
| | (C) | c-1 | wt % | | 1 | 1 | | | 1 | 1 |

TABLE 5-continued

|  |  |  |  |  |  |  |  |  |  |
|---|---|---|---|---|---|---|---|---|---|
|  | (D) | d-1 | wt % | 0.02 | 0.02 |  |  |  |  |
|  |  | d-2 | wt % | 0.05 | 0.05 |  |  |  |  |
|  |  | d-3 | wt % | 3.12 | 3.65 | 1.05 | 1.34 | 3.35 | 3.86 |
| Mechanical | Flexural modulous |  | MPa | 7950 | 7900 | 2550 | 8300 | 8050 | 8050 |
| properties of | Flexural strength |  | MPa | 258 | 258 | 85 | 212 | 202 | 208 |
| multipurpose | Thixotropic index |  | [—] | 3.12 | 3.65 | 1.05 | 1.34 | 3.35 | 3.86 |
| test piece | Frictional coefficient |  | [—] | 0.13 | 0.14 | 0.31 | 0.48 | 0.15 | 0.16 |
|  | Frictional coefficient ratio |  | [—] | 0.18 | — | — | 1.55 | 0.48 | 0.52 |
|  | Abrasion loss |  | [µm] | 9 | 7 | 5 | 35 | 4 | 3 |
|  | Dimensional change with water adsorption |  | % | 101.5 | 101.5 | 100.1 | 100.1 | 100.1 | 100.1 |
| Gear properties of gear test piece | Injection-molded gear | Arithmetic mean surface roughness Sa | [µm] | 0.5 | 0.4 | 0.3 | 5.3 | 0.3 | 0.3 |
|  |  | Roundness | [µm] | 275 | 237 | 278 | 687 | 348 | 389 |
|  |  | Durable Time | Time | 201 | 217 | 0.25 | 219 | 245 | 256 |
|  |  | Continuous moldability | [Excellent, Good, Acceptable, Poor] | Excellent | Excellent | Poor | Acceptable | Good | Excellent |
|  | Round bar cut gear | Arithmetic mean surface roughness Sa | [µm] | 2.5 | 2.8 | 4.8 | 6.4 | 2.8 | 2.6 |
|  |  | Roundness | [µm] | 368 | 364 | 352 | 832 | 345 | 367 |
|  |  | Durable Time | Time | 174 | 182 | 0.25 | 95 | 182 | 193 |

As clearly seen by the measurement results shown in Tables 4 and 5, the gears of the invention exhibited high flexural strength and flexural modulus, and a low frictional coefficient. The molded articles reinforced with CNF had lower frictional coefficient ratios than the molded articles reinforced with glass, and superior slidability. In particular, the gears of the invention exhibited high durability as injection-molded gears and round bar cut gears, and exhibited excellent durability which was equivalent or superior to that of the gears reinforced with glass.

Example II

Examples 1 to 13 and Comparative Examples 1 to 4

Polyamide-based resin compositions were obtained by the method shown in Tables 6 and 7. They were then molded and evaluated according to the evaluation methods described above. The results are listed in Tables 6 and 7.

TABLE 6

| Example II |  |  |  | Comp. Example 1 | Comp. Example 2 | Comp. Example 3 | Comp. Example 4 | Example 1 |
|---|---|---|---|---|---|---|---|---|
| Composition | (A) | a-1 | phr | 100 | 100 | 100 | 100 | 100 |
|  |  | a-6 | phr |  |  |  |  |  |
|  | (B) | b-1 | phr |  |  |  |  | 11.5 |
|  |  | b-2 | phr |  |  |  |  |  |
|  |  | b-3 | phr |  |  |  |  |  |
|  | (F) | f-2 | phr |  |  | 11.5 | 11.5 |  |
|  |  | f-3 | phr |  |  |  |  |  |
|  | (C) | c-2 | phr |  |  |  |  |  |
|  |  | c-3 | phr |  |  |  |  |  |
|  |  | c-4 | phr |  |  |  |  |  |
|  | (D) | d-1 | phr |  |  |  |  |  |
|  |  | d-2 | phr |  |  |  |  |  |
|  |  | d-3 | phr |  |  |  |  |  |
|  | (E) | e-1 | phr |  |  |  |  |  |
|  |  | e-2 | phr |  |  |  |  |  |
| Mechanical properties of multipurpose test piece | Tensile strength |  | MPa | 76 | — | 105 | — | 80 |
|  | Tensile breaking elongation |  | % | 25 | — | 3 | — | 3 |
|  | Tensile yield |  | Present/absent | Present | — | Absent | — | Present |
|  | Flexural modulus |  | MPa | 2800 | — | 4500 | — | 3725 |
|  | Aging test |  | Days | 3 | — | 3 | — | 3 |
|  | Abrasion loss |  | [µm] | 230 | — | 180 | — | 80 |
|  | Dimensional change with water absorption |  | % | 102 | — | 102.5 | — | 102 |
|  | Linear expansion coefficient |  | ppm/κ | 80 | — | 65 | — | 60 |

| Example II |  |  |  | Example 2 | Example 3 | Example 4 |
|---|---|---|---|---|---|---|
| Composition | (A) | a-1 | phr | 100 | 100 | 100 |
|  |  | a-6 | phr |  |  |  |
|  | (B) | b-1 | phr | 12 | 12 | 12 |
|  |  | b-2 | phr |  |  |  |

TABLE 6-continued

|  |  |  |  |  |  |  |  |
|---|---|---|---|---|---|---|---|
|  | (F) | b-3 | phr |  |  |  |  |
|  |  | f-2 | phr |  |  |  |  |
|  |  | f-3 | phr |  |  |  |  |
|  | (C) | c-2 | phr |  | 1.7 | 1.7 |  |
|  |  | c-3 | phr |  |  |  | 1.7 |
|  |  | c-4 | phr |  |  |  |  |
|  | (D) | d-1 | phr |  |  |  |  |
|  |  | d-2 | phr |  |  |  |  |
|  |  | d-3 | phr |  |  |  |  |
|  | (E) | e-1 | phr |  |  |  |  |
|  |  | e-2 | phr |  |  |  |  |
| Mechanical properties of multipurpose test piece | Tensile strength | | MPa | 85 | 85 | 100 |  |
| | Tensile breaking elongation | | % | 9 | 9 | 12 |  |
| | Tensile yield | | Present/absent | Present | Present | Present |  |
| | Flexural modulus | | MPa | 3725 | 3725 | 3800 |  |
| | Aging test | | Days | 3 | 3 | 3 |  |
| | Abrasion loss | | [μm] | 50 | 50 | 45 |  |
| | Dimensional change with water absorption | | % | 101.5 | 101.5 | 101.5 |  |
| | Linear expansion coefficient | | ppm/κ | 45 | 45 | 42 |  |

| Gear properties of gear test piece | Gear molding die surface | | Mirror surface/grainy | Mirror surface | Mirror surface | Mirror surface | Minor surface |
| | Annealing treatment | | Yes/No | No | Yes | No | Yes |
| | | | A/B | — | A | — | A |
| | Gear durability test A | Arithmetic mean surface roughness Sa | [μm] | 0.4 | 0.5 | 3 | 4 |
| | Injection-molded gear A | Dimensional change with water absorption | % | 101.8 | — | 1023 | — |
| | | Durable Time | Time | 15 | 17 | 45 | 37 |
| | | Silent properties | [Excellent, Good, Acceptable, Poor] | Excellent | Good | Acceptable | Acceptable |
| | Gear durability test B | Arithmetic mean surface roughness Sa | [μm] | 0.4 | 0.5 | 3 | 4 |
| | Injection-molded gear B | Durable Time | Time | 23 | 26 | 61 | 48 |
| | | Silent properties | [Excellent, Good, Acceptable, Poor] | Good | Good | Poor | Poor |
| | Gear durability test C | Arithmetic mean surface roughness Sa | [μm] | 0.4 | 0.5 | 4 | 5 |
| | Injection-molded gear C | Durable Tune | Time | 29 | 32 | 85 | 70 |
| | | Silent properties | [Excellent, Good, Acceptable, Poor] | Good | Good | Poor | Poor |
| | Gear durability test D | Arithmetic mean surface roughness Sa | [μm] | 0.4 | 0.5 | 4 | 5 |
| | Injection-molded gear C | Durable Time | Time | 24 | 30 | 75 | 64 |
| | | Silent properties | [Excellent, Good, Acceptable, Poor] | Acceptable | Acceptable | Poor | Poor |
| | Voids | Round bar cut gear | Present/absent [μm] | Absent — | Absent — | Present 0.5 | Present 1.5 |
| | | Injection-molded gear A | Present/absent [μm] | Absent — | Absent — | Absent — | Absent — |

| Gear properties of gear test piece | Gear molding die surface | | Mirror surface | Mirror surface | Grainy | Mirror surface |
| | Annealing treatment | | No | No | No | No |
| | | | — | — | — | — |
| | Gear durability test A | Arithmetic mean surface roughness Sa | 0.4 | 0.4 | 1.5 | 0.4 |
| | Injection-molded gear A | Dimensional change with water absorption | 102.2 | 101.2 | 1013 | 101.2 |

TABLE 6-continued

|  |  |  | | | | |
|---|---|---|---|---|---|---|
| | | Durable Time | 55 | 65 | 45 | 69 |
| | | Silent properties | Good | Excellent | Acceptable | Excellent |
| | Gear durability test B | Arithmetic mean surface roughness Sa | 0.5 | 0.5 | 1.5 | 0.5 |
| | Injection-molded gear B | Durable Time | 90 | 100 | 68 | 104 |
| | | Silent properties | Good | Good | Acceptable | Good |
| | Gear durability test C | Arithmetic mean surface roughness Sa | 0.5 | 0.5 | 1.8 | 0.5 |
| | Injection-molded gear C | Durable Tune | 115 | 135 | 100 | 145 |
| | | Silent properties | Good | Good | Acceptable | Good |
| | Gear durability test D | Arithmetic mean surface roughness Sa | 0.5 | 0.5 | 1.8 | 0.5 |
| | Injection-molded gear C | Durable Time | 110 | 130 | 95 | 142 |
| | | Silent properties | Good | Good | Acceptable | Good |
| | Voids | Round bar cut gear | Absent — | Absent — | Absent — | Absent — |
| | | Injection-molded gear A | Absent — | Absent — | Absent — | Absent — |

TABLE 7

| Example II | | | | Example 5 | Example 6 | Example 7 | Example 8 | Example 9 |
|---|---|---|---|---|---|---|---|---|
| Composition | (A) | a-1 | phr | 100 | 100 | 100 | 100 | 100 |
| | | a-6 | phr | | | | | |
| | (B) | b-1 | phr | 12 | 12 | | | 12 |
| | | b-2 | phr | | | | 12 | |
| | | b-3 | phr | | | 12 | | |
| | (F) | f-2 | phr | | | | | |
| | | f-3 | phr | | | | | |
| | (C) | c-2 | phr | | | | | |
| | | c-3 | phr | | | | | |
| | | c-4 | phr | 1.7 | 1.7 | 1.7 | 1.7 | 1.7 |
| | (D) | d-1 | phr | | | | | 0.015 |
| | | d-2 | phr | | | | | |
| | | d-3 | phr | | | | | |
| | (E) | e-1 | phr | | | | | |
| | | e-2 | phr | | | | | |
| Mechanical properties of multipurpose test piece | Tensile strength | | MPa | 105 | 105 | 100 | 110 | 110 |
| | Tensile breaking elongation | | % | 8 | 8 | 8 | 8 | 8 |
| | Tensile yield | | Present/absent | Present | Present | Present | Present | Present |
| | Flexural modulus | | MPa | 3800 | 3800 | 3800 | 3800 | 3800 |
| | Aging test | | Days | 3 | 3 | 3 | 3 | 35 |
| | Abrasion loss | | [μm] | 40 | 40 | 40 | 40 | 35 |
| | Dimensional change with water absorption | | % | 100.5 | 100.5 | 100.5 | 100.5 | 100.5 |
| | Linear expansion coefficient | | ppm/K | 40 | 40 | 35 | 32 | 38 |

| Example II | | | | Example 10 | Example 11 | Example 12 | Example 13 |
|---|---|---|---|---|---|---|---|
| Composition | (A) | a-1 | phr | 100 | 100 | 100 | 100 |
| | | a-6 | phr | | | | |
| | (B) | b-1 | phr | 12 | 12 | 12 | 12 |
| | | b-2 | phr | | | | |
| | | b-3 | phr | | | | |
| | (F) | f-2 | phr | | | | |
| | | f-3 | phr | | | | |
| | (C) | c-2 | phr | | | | |
| | | c-3 | phr | | | | |
| | | c-4 | phr | 1.7 | 1.7 | 1.7 | 1.7 |
| | (D) | d-1 | phr | | 0.015 | 0.015 | 0.015 |
| | | d-2 | phr | 0.015 | | | |
| | | d-3 | phr | | | | |
| | (E) | e-1 | phr | | 3.6 | | |
| | | e-2 | phr | | | 3.6 | 3.6 |

TABLE 7-continued

| | | | | | | | | | | | |
|---|---|---|---|---|---|---|---|---|---|---|---|
| Mechanical properties of multipurpose test piece | Tensile strength | MPa | 110 | 110 | 110 | 110 | | | | | |
| | Tensile breaking elongation | % | 8 | 8 | 8 | 8 | | | | | |
| | Tensile yield | Present/absent | Present | Present | Present | Present | | | | | |
| | Flexural modulus | MPa | 3800 | 3800 | 3800 | 3800 | | | | | |
| | Aging test | Days | 35 | 35 | 35 | 35 | | | | | |
| | Abrasion loss | [μm] | 35 | 30 | 30 | 30 | | | | | |
| | Dimensional change with water absorption | % | 100.5 | 100.5 | 100.5 | 100.5 | | | | | |
| | Linear expansion coefficient | ppm/K | 38 | 35 | 35 | 35 | | | | | |
| Gear properties of gear test piece | Gear molding die surface | Mirror surface/grainy | Mirror surface | Mirror surface | Mirror surface | Mirror surface | Mirror surface | Mirror surface | Mirror surface | Mirror surface | Mirror surface |
| | Annealing treatment | Yes/No | No | Yes | No | No | No | No | No | No | No |
| | | A/B | — | A | — | — | — | | | | |
| | Gear durability test A Injection-molded gear A | Arithmetic mean surface roughness Sa | [μm] | 0.4 | 0.4 | 0.4 | 0.4 | 0.4 | 0.4 | 0.4 | 0.4 | 0.4 |
| | | Dimensional change with water absorption | % | 100.5 | 100.4 | 100.4 | 100.4 | 100.4 | 100.4 | 100.4 | 100.4 | 100.4 |
| | | Durable Time | Time | 75 | 78 | 72 | 80 | 78 | 78 | 82 | 84 | 84 |
| | | Silent properties | [Excellent, Good, Fair, Poor] | Excellent | Excellent | Excellent | Excellent | Excellent | Excellent | Excellent | Excellent | Excellent |
| | Gear durability test B Injection-molded gear B | Arithmetic mean surface roughness Sa | [μm] | 0.5 | 0.5 | 0.5 | 0.5 | 0.5 | 0.5 | 0.5 | 0.5 | 03 |
| | | Durable Tune | Time | 113 | 117 | 109 | 121 | 120 | 120 | 125 | 125 | 126 |
| | | Silent properties | [Excellent, Good, Fair, Poor] | Good | Good | Good | Good | Good | Good | Excellent | Excellent | Excellent |
| | Gear durability test C Injection-molded gear C | Arithmetic mean surface roughness Sa | [μm] | 0.5 | 0.5 | 0.5 | 0.5 | 0.5 | 0.5 | 0.5 | 0.5 | 0.5 |
| | | Durable Time | Time | 154 | 167 | 149 | 163 | 175 | 176 | 180 | 180 | 185 |
| | | Silent properties | [Excellent, Good, Fair, Poor] | Good | Good | Good | Good | Good | Good | Excellent | Excellent | Excellent |
| | Gear durability test D Injection-molded gear C | Arithmetic mean surface roughness Sa | [μm] | 0.5 | 0.5 | 0.5 | 0.5 | 0.5 | 0.5 | 0.5 | 0.5 | 0.5 |
| | | Durable Time | Time | 149 | 163 | 145 | 157 | 169 | | | | |
| | | Silent properties | [Excellent, Good, Fair, Poor] | Good | Good | Good | Good | Good | | | | |
| | Voids | Round bar cut gear | Present/absent | Absent | Absent | Absent | Absent | Absent | | | | |
| | | | [μm] | — | — | — | — | — | | | | |
| | | Injection-molded gear A | Present/absent | Absent | Absent | Absent | Absent | Absent | | | | |
| | | | [μm] | — | — | — | — | — | | | | |

TABLE 7-continued

|  |  |  |  |  |  |  |
|---|---|---|---|---|---|---|
|  | Injection-molded gear C | Durable Time Silent properties | 170 Good Absent | 173 Excellent Absent | 173 Excellent Absent | 176 Excellent Absent |
|  | Voids | Round bar cut gear Injection-molded gear A | Absent — | Absent — | Absent — | Absent — |

Examples 14 to 17 and Comparative Examples 5 to 8

Polyacetal-based resin compositions were obtained by the method shown in Table 8. They were then molded and evaluated according to the evaluation methods described above. The results are listed in Table 8.

TABLE 8

|  |  |  |  | Comp. Example 5 | Comp. Example 6 | Comp. Example 7 | Comp. Example 8 | Example 14 |
|---|---|---|---|---|---|---|---|---|
|  |  | Example II |  |  |  |  |  |  |
| Composition | (A) | a-1 | phr |  |  |  |  |  |
|  |  | a-6 | phr | 100 | 100 | 100 | 100 | 100 |
|  | (B) | b-1 | phr |  |  |  |  | 12 |
|  |  | b-2 | phr |  |  |  |  |  |
|  |  | b-3 | phr |  |  |  |  |  |
|  | (F) | f-2 | phr |  |  |  |  |  |
|  |  | f-3 | phr |  |  | 11.5 | 11.5 |  |
|  | (C) | c-2 | phr |  |  |  |  |  |
|  |  | c-3 | phr |  |  |  |  |  |
|  |  | c-4 | phr |  |  |  |  | 1.7 |
|  | (D) | d-1 | phr |  |  |  |  |  |
|  |  | d-2 | phr |  |  |  |  |  |
|  |  | d-3 | phr |  |  |  |  |  |
|  | (E) | e-1 | phr |  |  |  |  |  |
|  |  | e-2 | phr |  |  |  |  |  |
| Mechanical properties of multipurpose test piece | Tensile strength | MPa |  | 63 | — | 85 | — | 102 |
|  | Tensile breaking elongation | % |  | 30 | — | 2 | — | 10 |
|  | Tensile yield | Present/absent |  | Present | — | Present | — | Present |
|  | Flexural modulus | MPa |  | 2500 | — | 4500 | — | 3950 |
|  | Aging test | Days |  | ≥40 | — | ≥40 | — | ≥40 |
|  | Abrasion loss | [μm] |  | 5 | — | 35 | — | 3 |
|  | Dimensional change with water absorption | % |  | 100.1 | — | 100.1 | — | 100.1 |
|  | Linear expansion coefficient | ppm/κ |  | 100 | — | 60 | — | 48 |

|  |  |  |  | Example 15 | Example 16 | Example 17 |
|---|---|---|---|---|---|---|
|  |  | Example II |  |  |  |  |
| Composition | (A) | a-1 | phr |  |  |  |
|  |  | a-6 | phr | 100 | 100 | 100 |
|  | (B) | b-1 | phr | 12 | 12 | 12 |
|  |  | b-2 | phr |  |  |  |
|  |  | b-3 | phr |  |  |  |
|  | (F) | f-2 | phr |  |  |  |
|  |  | f-3 | phr |  |  |  |
|  | (C) | c-2 | phr |  |  |  |
|  |  | c-3 | phr |  |  |  |
|  |  | c-4 | phr | 1.7 | 1.7 | 1.7 |
|  | (D) | d-1 | phr |  |  |  |
|  |  | d-2 | phr |  |  |  |
|  |  | d-3 | phr |  | 0.15 |  |
|  | (E) | e-1 | phr |  |  | 3.6 |
|  |  | e-2 | phr |  |  |  |

TABLE 8-continued

| | | | | | | | | | | | |
|---|---|---|---|---|---|---|---|---|---|---|---|
| | Mechanical properties of multipurpose test piece | Tensile strength | MPa | — | 102 | | 101 | | | | |
| | | Tensile breaking elongation | % | — | 10 | | 10 | | | | |
| | | Tensile yield | Present/absent | — | Present | | Present | | | | |
| | | Flexural modulus | MPa | — | 3950 | | 3900 | | | | |
| | | Aging test | Days | — | ≥40 | | ≥40 | | | | |
| | | Abrasion loss | [μm] | — | 3 | | 3 | | | | |
| | | Dimensional change with water absorption | % | — | 100.1 | | 100.1 | | | | |
| | | Linear expansion coefficient | ppm/κ | — | 45 | | 47 | | | | |
| Gear properties of gear test piece | Gear molding die surface | | Mirror surface/grainy | Mirror surface | Mirror surface | Mirror surface | Mirror surface | Mirror surface | Mirror surface | Mirror surface | Mirror surface |
| | Annealing treatment | | Yes/No | No | Yes | No | Yes | No | Yes | No | No |
| | | | A/B | — | B | — | B | — | B | — | — |
| | Gear durability test A | Arithmetic mean surface roughness Sa | [μm] | 0.3 | 0.3 | 5 | 6 | 0.4 | 0.5 | 0.4 | 0.4 |
| | Injection-molded gear A | Dimensional change with water absorption | % | 100.1 | — | 100.1 | — | 100.1 | — | 100.1 | 100.1 |
| | | Durable Time | Time | 20 | 22 | 59 | 45 | 85 | 95 | 87 | 88 |
| | | Silent properties | [Excellent, Good, Fair, Poor] | Excellent | Good | Acceptable | Poor | Excellent | Good | Excellent | Good |
| | Gear durability test B | Arithmetic mean surface roughness Sa | [μm] | 0.3 | 0.3 | 5 | 6 | 0.4 | 0.5 | 0.4 | 0.4 |
| | Injection-molded gear B | Durable Time | Time | 29 | 32 | 89 | 67 | 135 | 143 | 138 | 140 |
| | | Silent properties | [Excellent, Good, Fair, Poor] | Excellent | Good | Poor | Poor | Excellent | Good | Excellent | Excellent |
| | Gear durability test C | Arithmetic mean surface roughness Sa | [μm] | 0.3 | 0.3 | 6 | 7 | 0.4 | 0.5 | 0.4 | 0.4 |
| | Injection-molded gear C | Durable Time | Time | 40 | 44 | 118 | 90 | 170 | 190 | 174 | 176 |
| | | Silent properties | [Excellent, Good, Fair, Poor] | Excellent | Good | Poor | Poor | Excellent | Good | Excellent | Excellent |
| | Gear durability test D | Arithmetic mean surface roughness Sa | [μm] | 0.3 | 0.3 | 6 | 7 | 0.4 | 0.5 | 0.4 | 0.4 |
| | Injection-molded gear C | Durable Time | Time | 37 | 40 | 110 | 83 | 162 | 183 | 167 | 168 |
| | | Silent properties | [Excellent, Good, Fair, Poor] | Excellent | Good | Poor | Poor | Excellent | Good | Excellent | Excellent |
| | Voids | Round bar cut gear | Present/absent [μm] | Absent — | Absent — | Present 1.0 | Present 2.0 | Absent — | Absent — | Absent — | Absent — |
| | | Injection-molded gear A | Present/absent [μm] | Absent — | Absent — | Present 2.0 | Present 2.5 | Absent — | Absent — | Absent — | Absent — |

INDUSTRIAL APPLICABILITY

According to one aspect, the gear of the invention is especially useful in fields such as automobile mechanism components, which require excellent continuous moldability for practical use and both high slidability and high durability. According to another aspect, the gear of the invention is useful in the field of automobile mechanism components, which has a particular requirement for durability and silent properties.

The invention claimed is:

1. A gear which is a molded resin constructed of a resin composition comprising a thermoplastic resin (A) and cellulose nanofibers (B) with an average fiber diameter of 1000 nm or smaller, wherein:
   the gear has a roundness of 400 μm or smaller,
   the thermoplastic resin (A) includes a polyamide resin, and
   the resin composition has a thixotropic index of 2 to 10 at a temperature of 25° C. higher than the melting point of the thermoplastic resin (A).

2. The gear according to claim 1, which is an EPS (electric power steering) gear.

3. The gear according to claim 1, which is an injection molded article.

4. The gear according to claim 1, which is a machined article.

5. The gear according to claim 4, which is an article cut from a molded round bar.

6. A gear system comprising:
   a gear mechanism constructed of a driven gear and a driving gear that engages with the driven gear, and
   a driving source that drives the driving gear,
   wherein the driven gear and/or the driving gear are gears according to claim 1.

7. The gear system according to claim 6, which is an EPS (electric power steering) gear system.

8. The gear system according to claim 6, wherein:
   the gear mechanism is a rack and pinion mechanism constructed of a rack and pinion, or a worm gear mechanism constructed of a worm and worm wheel, and
   the pinion or worm wheel is a gear according to claim 1.

9. The gear system according to claim 8, wherein the pinion or worm wheel has a gear tooth total tooth depth/circular pitch ratio of 1.0 to 20.

10. The gear system according to claim 8, wherein the pinion or worm wheel has a gear tooth total tooth depth/tooth width ratio of 1.0 to 3.0.

11. The gear system according to claim 6, wherein:

the driven gear and the driving gear engage each other via grease, where the grease comprises:

a base oil containing 80 mass % or greater of at least one selected from the group consisting of mineral oils, poly α-olefin oils and alkylpolyphenyl ethers, a thickener, and 3 to 10 mass % of a hydrocarbon-based wax with a melting point or softening point in the range of 70 to 130° C.

12. A gear system comprising:

a gear mechanism constructed of a driven gear and a driving gear that engages with the driven gear, and a driving source that drives the driving gear, wherein:

the gear mechanism is a worm gear mechanism constructed of a worm and worm wheel, the worm wheel is a gear which is an injection molded compact of a resin composition comprising a thermoplastic resin (A) and cellulose nanofibers (B) with an average fiber diameter of 1000 nm or smaller, the worm wheel has a roundness of 400 μm or smaller, the thermoplastic resin (A) includes a polyamide resin, and the resin composition has a thixotropic index of 2 to 10 at a temperature of 25° C. higher than the melting point of the thermoplastic resin (A).

13. The gear system according to claim 12, which is an EPS (electric power steering) gear system.

* * * * *